(12) United States Patent
Zhang et al.

(10) Patent No.: US 12,193,023 B2
(45) Date of Patent: Jan. 7, 2025

(54) ANTENNA PANEL STATUS INDICATION METHOD AND APPARATUS

(71) Applicant: HUAWEI TECHNOLOGIES CO., LTD., Guangdong (CN)

(72) Inventors: Di Zhang, Shenzhen (CN); Kunpeng Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 437 days.

(21) Appl. No.: 17/672,413

(22) Filed: Feb. 15, 2022

(65) Prior Publication Data

US 2022/0174719 A1   Jun. 2, 2022

Related U.S. Application Data

(63) Continuation of application No. PCT/CN2020/105298, filed on Jul. 28, 2020.

(30) Foreign Application Priority Data

Aug. 16, 2019  (CN) ......................... 201910760419.X

(51) Int. Cl.
*H04W 72/23* (2023.01)
*H04W 52/02* (2009.01)
*H04W 72/542* (2023.01)

(52) U.S. Cl.
CPC ....... *H04W 72/23* (2023.01); *H04W 52/0216* (2013.01); *H04W 72/542* (2023.01)

(58) Field of Classification Search
CPC ............ H04W 72/23; H04W 72/542; H04W 52/0216; H04W 52/0245; H04W 36/0058; H04W 24/10; H04B 7/063; H04B 7/0691; H04B 7/06956; H04B 7/0626; H04B 7/0632; H04B 17/327; H04B 17/336; H04L 1/0026; H04L 1/0031; H04L 1/0027

See application file for complete search history.

(56) References Cited

U.S. PATENT DOCUMENTS

| | | |
|---|---|---|
| 2015/0280806 A1 | 10/2015 | Jalali |
| 2019/0159203 A1 | 5/2019 | Kim et al. |
| 2020/0358585 A1* | 11/2020 | Ryu ...................... H04W 72/21 |

FOREIGN PATENT DOCUMENTS

| | | |
|---|---|---|
| CN | 102289922 A | 12/2011 |
| CN | 102479312 A | 5/2012 |
| CN | 103680197 A | 3/2014 |

(Continued)

OTHER PUBLICATIONS

Jianlin, "Working Principle of Antenna Manual Automatic Exchanger," Innovation and Application of Science and Technology, No. 1, 2015, 2 pages (with English abstract).

(Continued)

*Primary Examiner* — Farid Seyedvosoghi
(74) *Attorney, Agent, or Firm* — Fish & Richardson P.C.

(57) ABSTRACT

This application provides example antenna panel status indication methods and apparatuses. One example method includes sending first antenna panel status information, where the first antenna panel status information indicates a status of at least one antenna panel. Response information of the first antenna panel status information can then be received. It can then be determined, based on the response information, that the status of the at least one antenna panel takes effect.

19 Claims, 27 Drawing Sheets

(56) References Cited

FOREIGN PATENT DOCUMENTS

| | | | |
|---|---|---|---|
| CN | 104969223 | A | 10/2015 |
| CN | 106532246 | A | 3/2017 |
| CN | 109217881 | A | 1/2019 |
| CN | 109983797 | A | 7/2019 |
| CN | 111586858 | A | 8/2020 |
| EP | 3322105 | A1 | 5/2018 |
| WO | 2018112439 | A1 | 6/2018 |
| WO | 2018232294 | A1 | 12/2018 |

OTHER PUBLICATIONS

Office Action issued in Chinese Application No. 201910760419.X on Oct. 11, 2021, 15 pages (with English translation).
PCT International Search Report and Written Opinion issued in International Application No. PCT/CN2020/105298 on Sep. 29, 2020, 17 pages (with English translation).
Huawei, HiSilicon, "Enhancements on Multi-Beam Operation," 3GPP TSG RAN WG1 Meeting #97, R1-1906030, Reno, USA, May 13-17, 2019, 10 pages.
Huawei, HiSilicon, "Enhancements on Multi-Beam Operation," 3GPP TSG RAN WG1 Meeting #96bis, R1-1903971, Xi'an, China, Apr. 8-12, 2019, 11 pages.
Huawei, HiSilicon, "Discussion on Panel Activation/Deactivation Status," 3GPP TSG RAN WG1 Meeting #97, R1-1907531, Reno, USA, May 13-17, 2019, 2 pages.
Office Action issued in Chinese Application No. 201910760419.X on Apr. 19, 2022, 6 pages.
Extended European Search Report issued in European Application No. 20854166.4 on Sep. 8, 2022, 10 pages.

\* cited by examiner

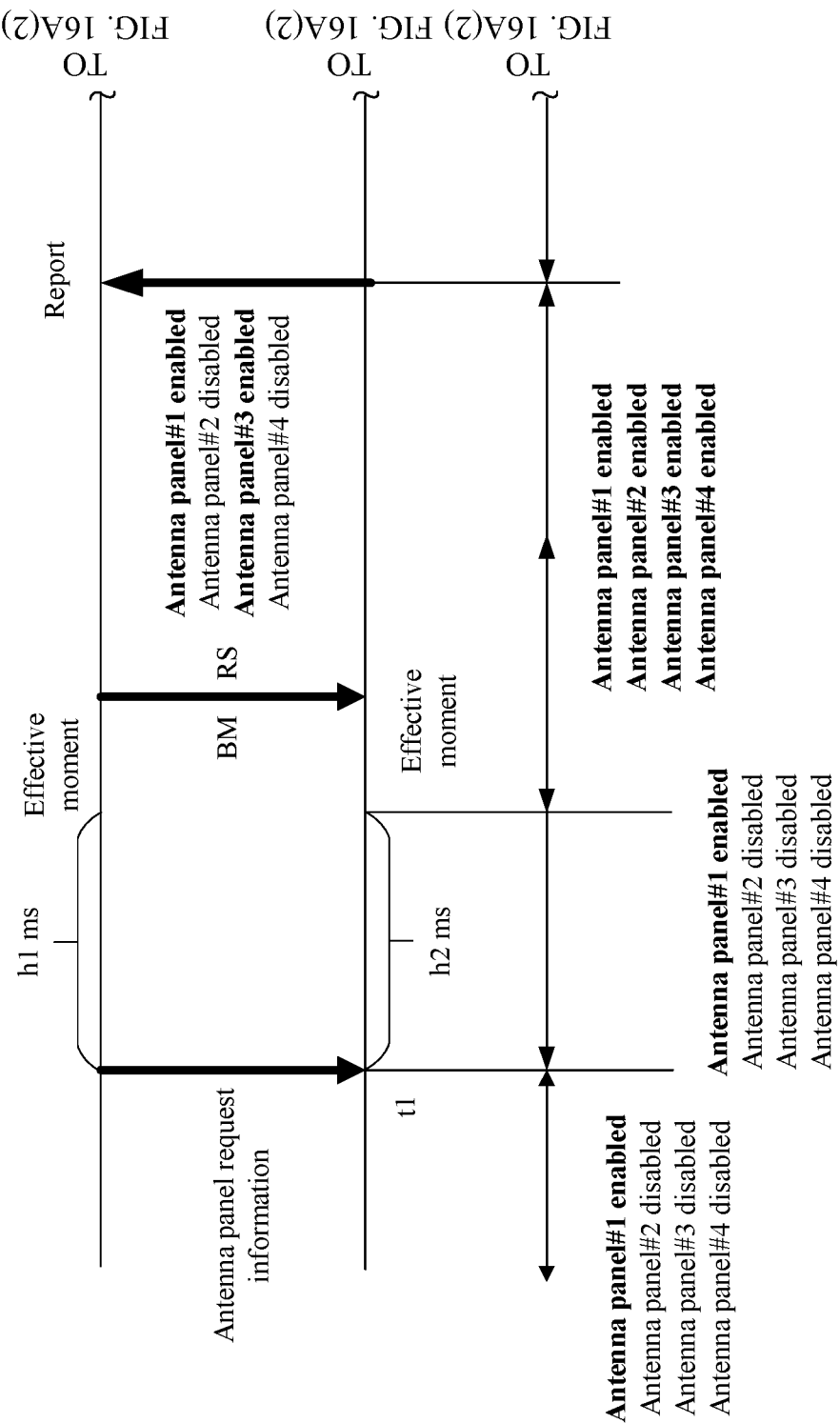
FIG. 16A(1)

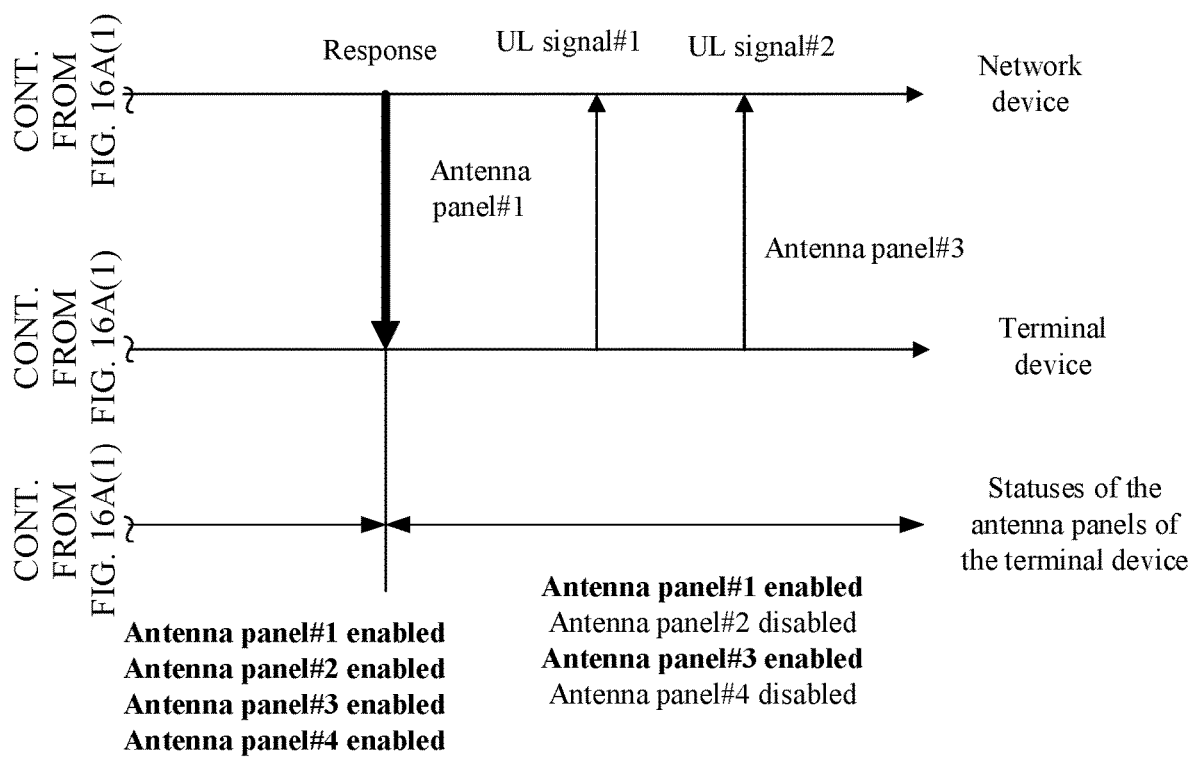
FIG. 16A(2)

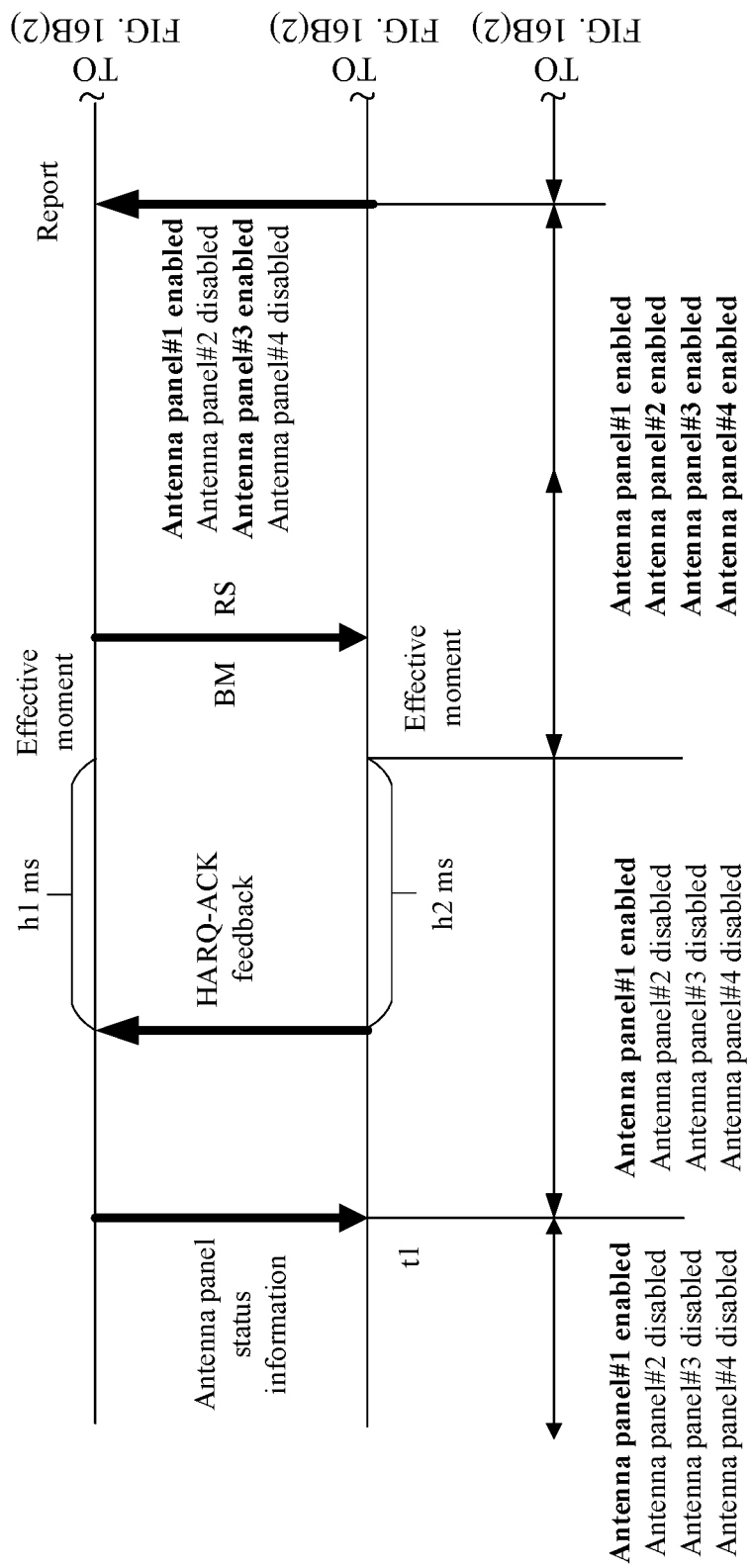
FIG. 16B(1)

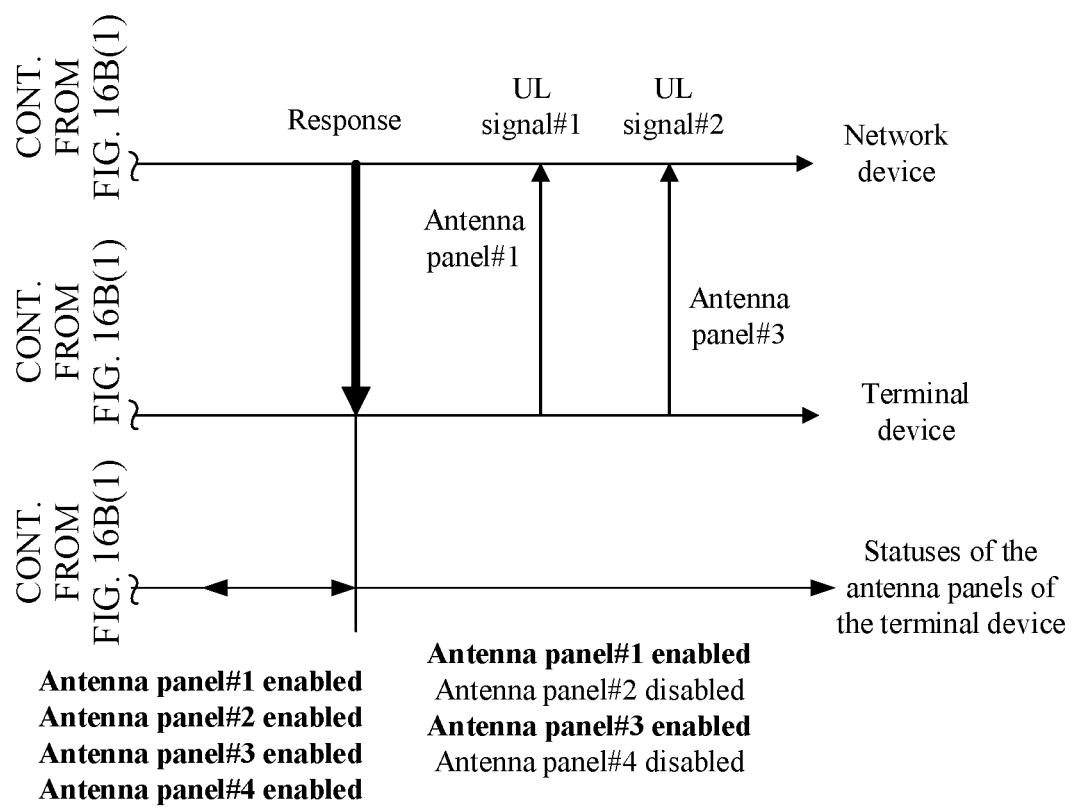
FIG. 16B(2)

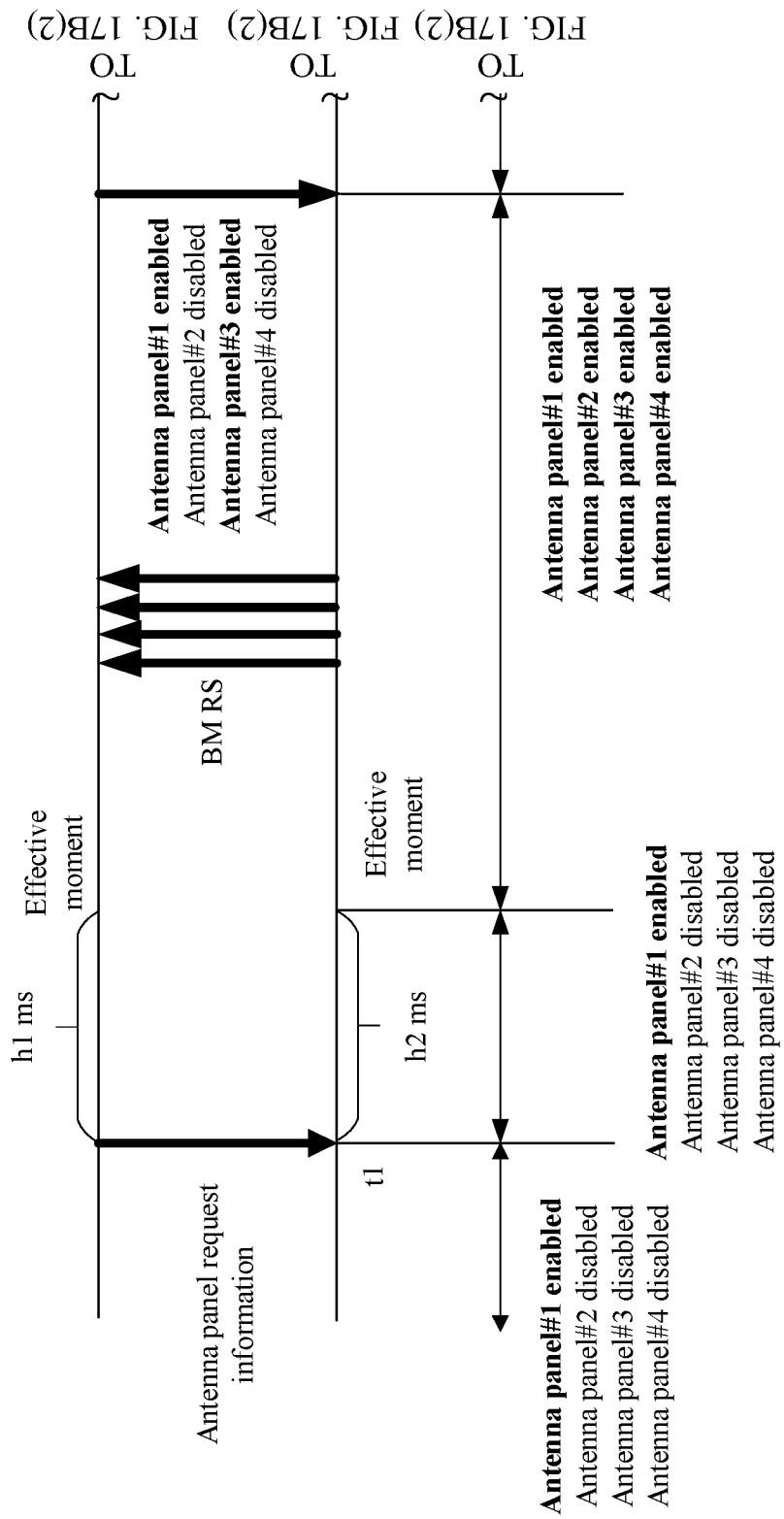
FIG. 17A(1)

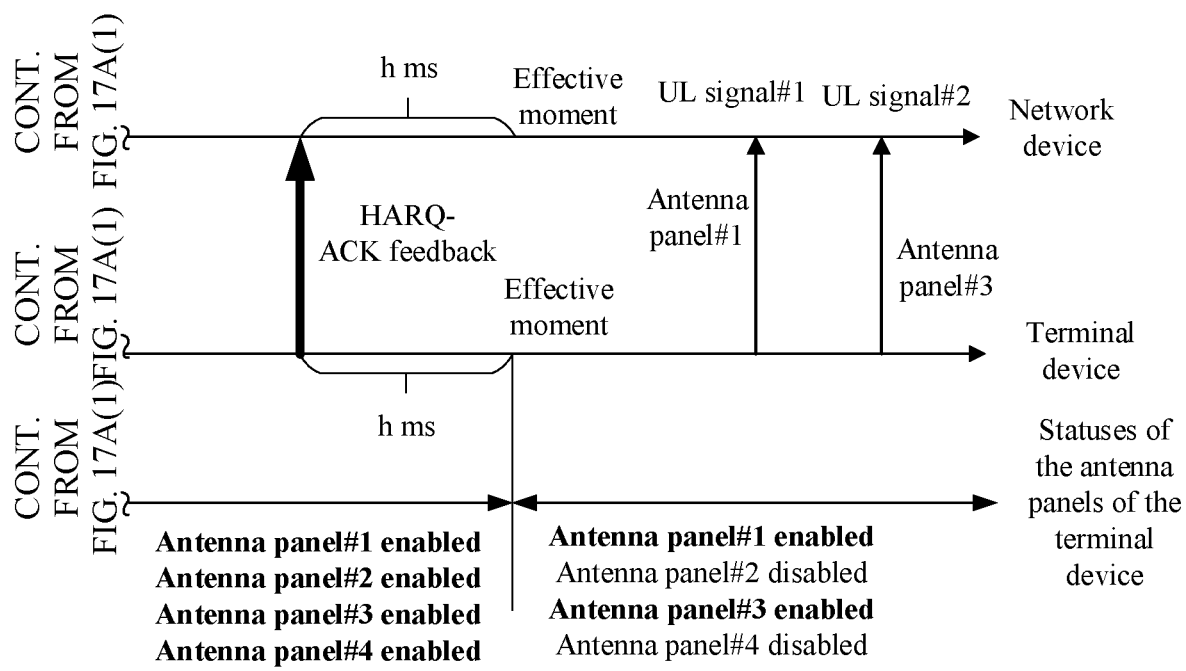
FIG. 17A(2)

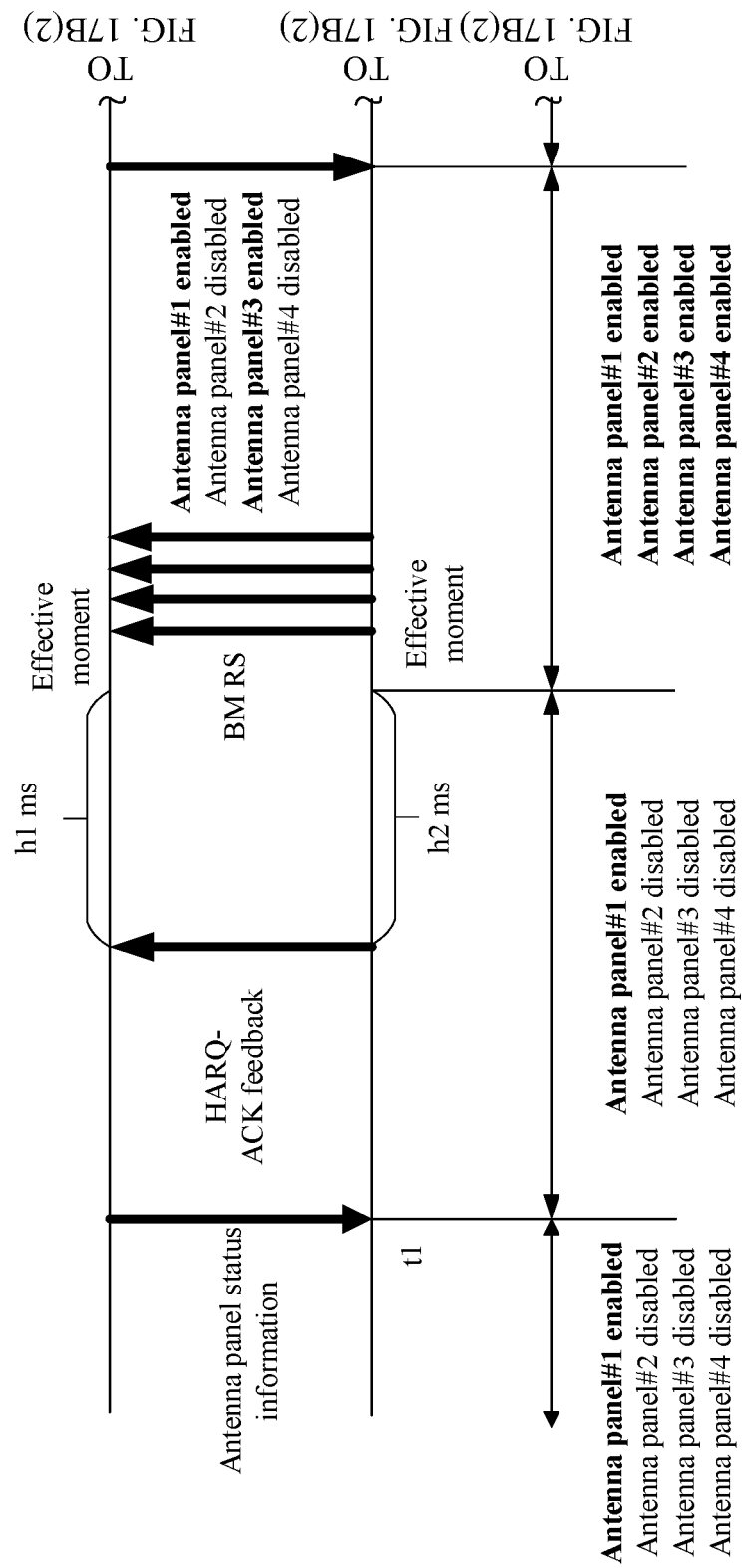
FIG. 17B(1)

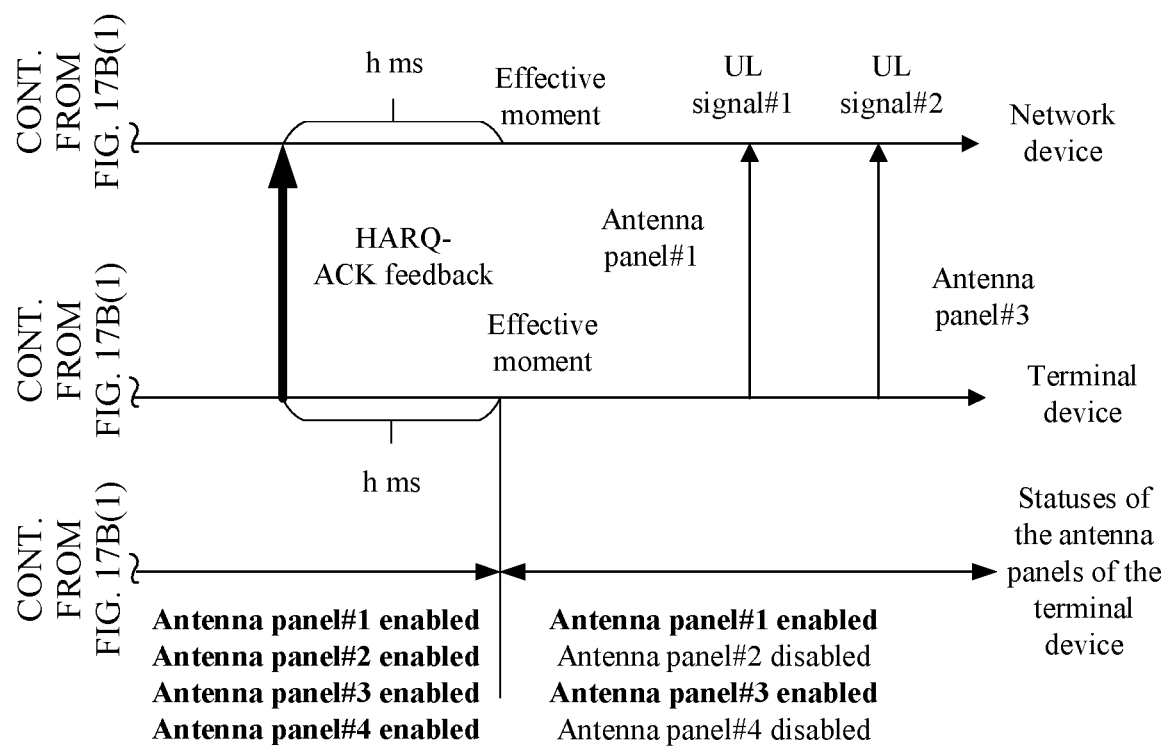
FIG. 17B(2)

ANTENNA PANEL STATUS INDICATION METHOD AND APPARATUS

CROSS-REFERENCE TO RELATED APPLICATIONS

This application is a continuation of International Application No. PCT/CN2020/105298, filed on Jul. 28, 2020, which claims priority to Chinese Patent Application No. 201910760419.X, filed on Aug. 16, 2019. The disclosures of the aforementioned applications are hereby incorporated by reference in their entireties.

TECHNICAL FIELD

This application relates to the field of communications technologies, and in particular, to an antenna panel status indication method and apparatus, a chip, a computer-readable storage medium, a computer program product, and the like.

BACKGROUND

In a new radio (new radio, NR) system, one terminal device may have a plurality of antenna panels (panels), and each antenna panel may correspond to one or more beams. A status of the panel includes an active state and an inactive state. The active state may also be understood as a power-on state of the panel. That is, because the panel is in a state of ready for transmission, a preparation time (μs level) required for transmission by using the panel is relatively short. The inactive state may be understood as a power-off state of the panel. That is, because the panel is not in a state of ready for transmission, if the panel is used for transmission, activation is required before transmission. Therefore, a relatively long preparation time (2 to 3 μs level) is required.

When a network device schedules signal/channel transmission, if a panel in an inactive state is scheduled, a terminal device needs to first activate the panel in the inactive state, thereby causing a transmission delay. Currently, the terminal device may report a status of the panel to the network device, or the network device may indicate the status of the panel of the terminal device, so that the network device and the terminal device have a consistent understanding of the status of the panel of the terminal device. In this way, the network device does not need to always schedule signal/channel transmission based on a maximum delay.

However, after the terminal device reports the status of the panel, a specific time at which the network device schedules signal/channel transmission based on reported status information of the panel is not defined. As a result, the network device and the terminal device have different understandings of the status of the panel of the terminal device in a specific period of time. This further causes a problem that a signal/channel cannot be transmitted or signal/channel transmission quality is poor in the time period.

Correspondingly, after the network device indicates the status of the panel of the terminal device, a specific time at which the network device can schedule signal/channel transmission based on the reported status information of the panel is not defined. As a result, the network device and the terminal device have different understandings of the status of the panel of the terminal device in a specific period of time. This further causes a problem that a signal/channel cannot be transmitted or signal/channel transmission quality is poor in the time period.

SUMMARY

Embodiments of this application provide an antenna panel status indication method and apparatus, a chip, a computer-readable storage medium, a computer program product, and the like, so as to resolve a problem that a signal/channel cannot be transmitted or signal/channel transmission quality is relatively poor within a period of time due to a currently inconsistent understanding of a status of a panel of a terminal device between a network device and the terminal device.

According to a first aspect, an embodiment of this application provides an antenna panel status indication method. The method may be applied to a terminal device or a chip or chipset in the terminal device. The method includes: sending first antenna panel status information, where the first antenna panel status information indicates a status of at least one antenna panel; receiving response information of the first antenna panel status information; and determining, based on the response information, that the status of the antenna panel takes effect. In this embodiment of this application, after receiving the panel status information, a network device sends the response information to the terminal device and determines that the status information takes effect. After receiving the response information of the panel status information, the terminal device determines that the status indicated by the status information takes effect. In this manner, the terminal device and the network device can be aligned in the status of the panel, so that the following problem can be avoided: A signal/channel cannot be transmitted, or performance of signal/channel transmission is poor because the network device cannot receive the first antenna panel status information, the terminal device and the network device are not aligned in the status of the panel, and the network device still schedules signal/channel transmission based on previous antenna panel status information.

In a possible design, the status of the antenna panel may include at least one of a first state and a second state. The first state may be an active state, and the second state is an inactive state; the first state may be an enabled state, and the second state is a disabled state; the first state may be a power-on state, and the second state is a power-off state; or the first state may be a state that can be used for transmission, and the second state is a state that cannot be used for transmission.

In a possible design, the first antenna panel status information may include N bits, N is a quantity of the at least one antenna panel, the $i^{th}$ bit is used to indicate a status of the $i^{th}$ antenna panel in the at least one antenna panel, and i={0, 1, 2, . . . , N}. In the foregoing design, one bit in the first antenna panel status information indicates a status of one antenna panel, so that the network device can accurately determine a status of a corresponding antenna panel based on the bits in the first antenna panel status information.

In a possible design, the first antenna panel status information may indicate the status of the at least one antenna panel by using a status value. In the foregoing design, indication by using the status value may reduce a quantity of bits of the first antenna panel status information, so that signaling overheads can be reduced.

In a possible design, the first antenna panel status information may indicate, by using the status value, switching of the at least one antenna panel between the first state and the second state. Compared with a manner in which the first antenna panel status information indicates statuses of all the antenna panels, the foregoing design in which the first antenna panel status information indicates switching of an antenna panel between the first state and the second state can further reduce signaling overheads.

In a possible design, the response information may be indication information indicating that the first antenna panel status information is successfully transmitted. In the foregoing design, after determining that the network device successfully receives the first antenna panel status information, the terminal device determines that the first antenna panel status information takes effect, so that moments at which the terminal device and the network device determine that the first antenna panel status information takes effect are consistent, and the terminal device and the network device have a consistent understanding of the status of the antenna panel of the terminal device. In this way, signal/channel transmission accuracy can be improved.

In a possible design, the response information may be indication information indicating the terminal device to transmit a signal by using an antenna panel, and the antenna panel is an antenna panel that is indicated by the first antenna panel status information and changes from the second state to the first state. In the foregoing design, the network device uses the newly activated antenna panel indicated by the first antenna panel status information to transmit a signal/channel. This indicates that the network device has received the first antenna panel status information. Therefore, the terminal device can determine, based on the indication information, that the network device successfully receives the first antenna panel status information.

In a possible design, the response information may be indication information indicating the terminal device to send an uplink signal/channel by using power information of an antenna panel, and the antenna panel is an antenna panel that is indicated by the first antenna panel status information and changes from the second state to the first state. In the foregoing design, the network device uses the power information of the newly activated antenna panel indicated by the first antenna panel status information to transmit a signal/channel. This indicates that the network device has received the first antenna panel status information. Therefore, the terminal device can determine, based on the indication information, that the network device successfully receives the first antenna panel status information.

In a possible design, the determining, based on the response information, that the at least one state takes effect may be determining, based on the response information, that an antenna panel in the first state is in the first state.

In a possible design, the determining, based on the response information, that the at least one state takes effect may be determining, based on the response information, that an antenna panel in the second state is in the second state.

In a possible design, the determining, based on the response information, that the at least one state takes effect may be determining, based on the response information, that an antenna panel in the first state is in the first state, and an antenna panel in the second state is in the second state.

In a possible design, before the first antenna panel status information is sent, K reference signals may be received by using M antenna panels, where K is an integer greater than or equal to 1, and M is an integer greater than or equal to 1. A measurement result is obtained based on the K reference signals, and the first antenna panel status information is determined based on the measurement result. In the foregoing design, before the first antenna panel status information is sent, the relatively accurate first antenna panel status information can be obtained by receiving the reference signals for measurement.

In a possible design, after the first antenna panel status information is determined based on the measurement result, the M antenna panels may be restored to states before the K reference signals are received. In the foregoing design, the M antenna panels are restored to the states before the K reference signals are received, so that a problem that power consumption is relatively large because all the antenna panels are enabled can be avoided, and power consumption can be reduced.

In a possible design, after the first antenna panel status information is determined based on the measurement result, an antenna panel in the first state in the M antenna panels may be kept in the first state. In the foregoing design, the antenna panel in the active state that is indicated in the first antenna panel status information is kept in the enabled state, so that when the first antenna panel status information takes effect, a delay caused by re-enabling the antenna panel can be avoided, and therefore a delay may be further reduced.

In a possible design, the first antenna panel status information may be used to request measurement on the antenna panel. According to the foregoing design, when the terminal device finds that current antenna panel performance is poor or radiation to a human body is relatively large, the network device may be requested to configure reference signals for the terminal device to remeasure the antenna panel.

In a possible design, the response information may be indication information indicating that the first antenna panel status information is successfully transmitted. In the foregoing design, the terminal device may determine, upon receiving the response information, that the network device has received the first antenna panel status information, so as to avoid that the terminal device and the network device have different understandings of a status of a current antenna panel.

In a possible design, the response information may be control information indicating a reference signal. In the foregoing design, after the network device sends the control information indicating the reference signal, it indicates that the network device has received the first antenna panel status information. Therefore, after receiving the control information, the terminal device may determine that the network device has received the first antenna panel status information.

In a possible design, the control information may be radio resource control (radio resource control, RRC) or media access control control element (media access control control element, MAC CE) signaling, or downlink control information (downlink control information, DCI).

In a possible design, the determining, based on the response information, that the at least one state takes effect may be determining, based on the response information, that the at least one antenna panel changes from the second state to the first state. In the foregoing design, when the first antenna panel status information is used to request to measure an antenna panel, the terminal device may enable, by default, an antenna panel in the inactive state, so as to obtain a better antenna panel.

In a possible design, after the first antenna panel status information of the antenna panel is sent, L reference signals may be received by using H antenna panels, where L is an integer greater than or equal to 1, and H is an integer greater than or equal to 1. A measurement result is obtained based on the L reference signals, and second antenna panel status information is determined based on the measurement result, where the second antenna panel status information includes status information of at least one antenna panel. The second antenna panel status information is sent. In the foregoing design, after requesting the network device to configure the reference signals, the terminal device may learn, by measuring the reference signal by using the antenna panels, an antenna panel with relatively good communication quality, and send the second antenna panel status information, so that the terminal device can report relatively accurate or more favorable antenna panel status information for signal/channel transmission to the network device.

In a possible design, after the first antenna panel status information is sent, detection of the response information may be started after a preset time period. In the foregoing design, power consumption of the terminal device can be effectively reduced.

In a possible design, a time length of the preset time period may be related to a time interval between a moment of receiving reference signals and a moment of sending the first antenna panel status information. In the foregoing design, the time length of the preset time period is determined based on the time interval between the moment of receiving the reference signals and the moment of sending the first antenna panel status information, so that the terminal device can accurately detect response information while reducing power consumption and a delay caused by switching the antenna panel.

In a possible design, if the time interval between the moment of receiving the reference signals and the moment of sending the first antenna panel status information is greater than a threshold, the preset time period may be T1; or if the time interval between the moment of receiving the reference signals and the moment of sending the first antenna panel status information is less than or equal to the threshold, the preset time period may be T2, where T1 may be greater than T2. In the foregoing design, if the time interval between the moment of receiving the reference signals and the moment of sending the first antenna panel status information is relatively large, the terminal device disables some antenna panels to reduce power consumption. In this case, the terminal device receives the response information after waiting for a relatively long time. Alternatively, the network device sends the response information after waiting for a relatively long time, so as to reserve a time for the terminal device to switch the antenna panel status. If the time interval between the moment of receiving the reference signals and the moment of sending the first antenna panel status information is relatively short, to reduce an antenna panel switching delay, the terminal device may maintain a current antenna panel status, and wait for a relatively short time, and then the network device can schedule an antenna panel in the first state indicated by the first antenna panel status information to transmit a signal/channel, thereby improving transmission performance.

In a possible design, the time length of the preset time period may be related to a state change delay of the antenna panel.

In a possible design, a quantity of antenna panels indicated by the first antenna panel status information may be sent by the terminal device to the network device. For example, the terminal device may send, to the network device by using channel state information, the quantity of antenna panels indicated by the antenna panel status information. The channel state information may refer to information that includes layer 1 (L1)-reference signal received power (reference signal received power, RSRP) or an L1-signal to interference plus noise ratio (signal to interference plus noise ratio, SINR). Alternatively, the information about the quantity of antenna panels may be sent to the network device by using information other than the channel state information.

In a possible design, the channel state information may include the information used to indicate the quantity of antenna panels (which may be referred to as antenna panel quantity information).

According to a second aspect, an embodiment of this application provides an antenna panel status indication method. The method may be applied to a network device or a chip or chipset in the network device. The method includes: receiving first antenna panel status information, where the first antenna panel status information indicates a status of at least one antenna panel; sending response information of the first antenna panel status information; and determining that the status indicated by the first antenna panel status information takes effect. In this embodiment of this application, after receiving the panel status information, the network device sends the response information to a terminal device and determines that the status information takes effect. After receiving the response information of the panel status information, the terminal device determines that the status indicated by the status information takes effect. In this manner, the terminal device and the network device can be aligned in the status of the panel, so that the following problem can be avoided: A signal/channel cannot be transmitted, or performance of signal/channel transmission is poor because the network device cannot receive the first antenna panel status information, the terminal device and the network device are not aligned in the status of the panel, and the network device still schedules signal/channel transmission based on previous antenna panel status information.

In a possible design, the status of the antenna panel may include at least one of a first state and a second state. The first state may be an active state, and the second state is an inactive state; the first state may be an enabled state, and the second state is a disabled state; the first state may be a power-on state, and the second state is a power-off state; or the first state may be a state that can be used for transmission, and the second state is a state that cannot be used for transmission.

In a possible design, the first antenna panel status information may include N bits, N is a quantity of the at least one antenna panel, the $i^{th}$ bit is used to indicate a status of the $i^{th}$ antenna panel in the at least one antenna panel, and i={0, 1, 2, . . . , N}. In the foregoing design, one bit in the first antenna panel status information indicates a status of one antenna panel, so that the network device can accurately determine a status of a corresponding antenna panel based on the bits in the first antenna panel status information.

In a possible design, the first antenna panel status information may indicate the status of the at least one antenna panel by using a status value. In the foregoing design, indication by using the status value may reduce a quantity of bits of the first antenna panel status information, so that signaling overheads can be reduced.

In a possible design, the first antenna panel status information may indicate, by using the status value, switching of the at least one antenna panel between the first state and the second state. Compared with a manner in which the first antenna panel status information indicates statuses of all the antenna panels, the foregoing design in which the first antenna panel status information indicates switching of an antenna panel between the first state and the second state can further reduce signaling overheads.

In a possible design, the response information may be indication information indicating that the first antenna panel status information is successfully transmitted. In the foregoing design, after determining that the network device successfully receives the first antenna panel status information, the terminal device determines that the first antenna panel status information takes effect, so that moments at which the terminal device and the network device determine that the first antenna panel status information takes effect are consistent, and the terminal device and the network device have a consistent understanding of the status of the antenna panel of the terminal device. In this way, signal/channel transmission accuracy can be improved.

In a possible design, the response information may be indication information indicating the terminal device to transmit a signal by using an antenna panel, and the antenna panel is an antenna panel that is indicated by the first antenna panel status information and changes from the second state to the first state. In the foregoing design, the network device uses the newly activated antenna panel indicated by the first antenna panel status information to transmit a signal/channel. This indicates that the network device has received the first antenna panel status information. Therefore, the terminal device can determine, based on the indication information, that the network device successfully receives the first antenna panel status information.

In a possible design, the response information may be indication information indicating the terminal device to send an uplink signal/channel by using power information of an antenna panel, and the antenna panel is an antenna panel that is indicated by the first antenna panel status information and changes from the second state to the first state. In the foregoing design, the network device uses the power information of the newly activated antenna panel indicated by the first antenna panel status information to perform uplink transmission. This indicates that the network device has received the first antenna panel status information. Therefore, the terminal device can determine, based on the indication information, that the network device successfully receives the first antenna panel status information.

In a possible design, determining that the at least one state takes effect may refer to determining that an antenna panel in the first state is in the first state, and the antenna panel can be scheduled to transmit a signal without a delay or with a low delay.

In a possible design, determining that the at least one state takes effect may refer to determining that an antenna panel in the second state is in the second state, and the antenna panel cannot be scheduled to transmit a signal without a delay or with a low delay.

In a possible design, determining, based on the response information, that the at least one state takes effect may refer to determining, based on the response information, that an antenna panel in the first state is in the first state, and an antenna panel in the second state is in the second state, the antenna panel in the first state can be scheduled to transmit a signal without a delay or with a low delay, and the antenna panel in the second state cannot be scheduled to transmit a signal without a delay or with a low delay.

In a possible design, before the first antenna panel status information is received, K reference signals may be sent, where K is an integer greater than or equal to 1. In the foregoing design, before the terminal device sends the first antenna panel status information, the network device sends the reference signals to the terminal device, so that the terminal device can obtain the relatively accurate first antenna panel status information through measurement based on the reference signals.

In a possible design, the first antenna panel status information may be used to request measurement on the antenna panel. According to the foregoing design, when the terminal device finds that current antenna panel performance is poor or radiation to a human body is relatively large, the network device may be requested to configure reference signals for the terminal device to remeasure the antenna panel.

In a possible design, the response information may be indication information indicating that the first antenna panel status information is successfully transmitted. In the foregoing design, the terminal device may determine, upon receiving the response information, that the network device has received the first antenna panel status information, so as to avoid that the terminal device and the network device have different understandings of a status of a current antenna panel.

In a possible design, the response information may be control information indicating a reference signal. In the foregoing design, after the network device sends the control information indicating the reference signal, it indicates that the network device has received the first antenna panel status information. Therefore, after receiving the control information, the terminal device may determine that the network device has received the first antenna panel status information.

In a possible design, the control information may be RRC or MAC CE signaling or DCI signaling.

In a possible design, determining that at least one state takes effect may refer to sending a reference signal.

In a possible design, after the first antenna panel status information is received, L reference signals may be sent, where L is an integer greater than or equal to 1. Second antenna panel status information is received, where the second antenna panel status information includes status information of at least one antenna panel. In the foregoing design, when the terminal device requests measurement on the antenna panel, the network device may configure the reference signals for the terminal device, so that the terminal device can learn, by measuring the reference signals by using the antenna panel, an antenna panel with relatively good communication quality, and send the second antenna panel status information. In this way, the terminal device can report relatively accurate or more favorable antenna panel status information for signal/channel transmission to the network device.

In a possible design, the response information of the first antenna panel status information may be sent after a preset time period. According to the foregoing design, the network device may reserve a time for enabling or disabling an antenna panel for the terminal device.

In a possible design, a time length of the preset time period may be related to a time interval between a moment of receiving reference signals and a moment of sending the first antenna panel status information. In the foregoing design, the time length of the preset time period is determined based on the time interval between the moment of receiving the reference signals and the moment of sending the first antenna panel status information, so that the terminal device can accurately detect response information while reducing power consumption and a delay caused by switching the antenna panel.

In a possible design, if the time interval between the moment of receiving the reference signals and the moment of sending the first antenna panel status information is greater than a threshold, the preset time period may be T1; or if the time interval between the moment of receiving the reference signals and the moment of sending the first antenna panel status information is less than or equal to the threshold, the preset time period may be T2, where T1 may be greater than T2. In the foregoing design, if the time interval between the moment of receiving the reference signals and the moment of sending the first antenna panel status information is relatively large, the terminal device disables some antenna panels to reduce power consumption. In this case, the terminal device receives the response information after waiting for a relatively long time. Alternatively, the network device sends the response information after waiting for a relatively long time, so as to reserve a time for the terminal device to switch the antenna panel status. If the time interval between the moment of receiving the reference signals and the moment of sending the first antenna panel status information is relatively short, to reduce an antenna panel switching delay, the terminal device may maintain a current antenna panel status, and wait for a relatively short time, and then the network device can schedule an antenna panel in the first state indicated by the first antenna panel status information to transmit a signal/channel, thereby improving transmission performance.

In a possible design, the time length of the preset time period may be related to a state change delay of the antenna panel.

In a possible design, a quantity of antenna panels indicated by the first antenna panel status information may be sent by the terminal device to the network device. For example, the terminal device may send, to the network device by using channel state information, the quantity of antenna panels indicated by the antenna panel status information, where the channel state information may refer to information including L1-RSRP or an L1-SINR. Alternatively, the information about the quantity of antenna panels may be sent to the network device by using information other than the channel state information.

In a possible design, the channel state information may include the information used to indicate the quantity of antenna panels (which may be referred to as antenna panel quantity information).

According to a third aspect, an embodiment of this application provides an antenna panel status indication method. The method may be applied to a terminal device or a chip or chipset in the terminal device. The method includes: receiving first antenna panel status information, and determining, after a preset time period, that a status of an antenna panel takes effect, where the first antenna panel status information indicates a status of at least one antenna panel. In this embodiment of this application, after a network device sends the first antenna panel status information to the terminal device, the network device and the terminal device determine, after preset time periods, that the status indicated by the first antenna panel status information takes effect. In this manner, the terminal device and the network device may be aligned in the status of the panel. In this way, the following problem can be avoided: A signal/channel cannot be transmitted or signal/channel transmission performance is relatively poor because the terminal device does not have time to update the status of the panel, and the network device schedules signal/channel transmission based on the new antenna panel status.

In a possible design, the status of the antenna panel may include at least one of a first state and a second state. The first state may be an active state, and the second state is an inactive state; the first state may be an enabled state, and the second state is a disabled state; the first state may be a power-on state, and the second state is a power-off state; or the first state may be a state that can be used for transmission, and the second state is a state that cannot be used for transmission.

In a possible design, the first antenna panel status information may include N bits, N is a quantity of the at least one antenna panel, the $i^{th}$ bit is used to indicate a status of the $i^{th}$ antenna panel in the at least one antenna panel, and $i=\{0, 1, 2, \ldots, N\}$. In the foregoing design, one bit in the first antenna panel status information indicates a status of one antenna panel, so that the network device can accurately determine a status of a corresponding antenna panel based on the bits in the first antenna panel status information.

In a possible design, the first antenna panel status information may indicate the status of the at least one antenna panel by using a status value. In the foregoing design, indication by using the status value may reduce a quantity of bits of the first antenna panel status information, so that signaling overheads can be reduced.

In a possible design, the first antenna panel status information may indicate, by using the status value, switching of the at least one antenna panel between the first state and the second state. Compared with a manner in which the first antenna panel status information indicates statuses of all the antenna panels, the foregoing design in which the first antenna panel status information indicates switching of an antenna panel between the first state and the second state can further reduce signaling overheads.

In a possible design, determining that the status of the antenna panel takes effect may refer to determining that an antenna panel in the first state is in the first state.

In a possible design, determining that the status of the antenna panel takes effect may refer to determining that an antenna panel in the second state is in the second state.

In a possible design, determining that the status of the antenna panel takes effect may refer to determining that an antenna panel in the first state is in the first state, and an antenna panel in the second state is in the second state.

In a possible design, the first antenna panel status information may be used to request measurement on the antenna panel. According to the foregoing design, the network device may request the terminal device to measure the antenna panel. When the network device finds that uplink transmission signal quality is poor, the terminal device may be requested to measure the antenna panel, so that signal/channel transmission quality can be improved.

In a possible design, determining that the status of the antenna panel takes effect may refer to determining that at least one antenna panel changes from the second state to the first state. In the foregoing design, when the first antenna panel status information is used to request to measure the antenna panel, the terminal device may enable, by default, an antenna panel in the inactive state.

In a possible design, a start moment of the preset time period may be a moment of receiving the first antenna panel status information, or the start moment of the preset time period may be a moment of sending feedback information, where the feedback information is a hybrid automatic repeat request (hybrid automatic repeat request, HARQ)-acknowledgment (ACK) feedback of the first antenna panel status information. In the foregoing design, the network device may determine that the terminal device receives the first antenna panel status information, so that the network device and the terminal device have a consistent understanding of the first antenna panel status information.

In a possible design, after the first antenna panel status information is received, a HARQ-ACK feedback of the first antenna panel status information may be sent.

In a possible design, a time length of the preset time period may be related to a state change delay of the antenna panel. In the foregoing design, before the network device schedules the antenna panel indicated by the first antenna panel status information to transmit a signal, a sufficient preparation time for switching the antenna panel can be reserved for the terminal device.

In a possible design, after it is determined that the status of the antenna panel takes effect, P antenna panels may be used to send L reference signals, and second antenna panel status information is received, where L is a positive integer greater than or equal to 1, and P is an integer greater than 0. The second antenna panel status information includes status information of at least one antenna panel. In the foregoing design, the terminal device may send the reference signals after receiving the first antenna panel status information, so that the network device can obtain the second antenna panel status information through measurement. In the foregoing design, for uplink transmission, because the network device can obtain more accurate interference information and scheduling information, a better antenna panel can be obtained by measuring uplink signals by the network device, so that better signal transmission performance can be obtained. The measurement of the uplink signals by the network device can further guide downlink transmission (for example, a TDD scenario).

In a possible design, after it is determined that the status of the antenna panel takes effect, K reference signals may be received by using Q antenna panels, where K is a positive integer greater than or equal to 1, and Q is an integer greater than 0. A measurement result is obtained based on the K reference signals, and third antenna panel status information is determined based on the measurement result, where the third antenna panel status information includes status information of at least one antenna panel. The third antenna panel status information is sent. In the foregoing design, the terminal device may further measure the antenna panel, so that the network device and the terminal device can obtain relatively accurate antenna panel status information.

In a possible design, the response information may be RRC signaling, MAC CE signaling, or DCI signaling.

According to a fourth aspect, an embodiment of this application provides an antenna panel status indication method. The method may be applied to a network device or a chip or chipset in the network device. The method includes: sending first antenna panel status information, where the first antenna panel status information indicates a status of at least one antenna panel, and determining, after a preset time period, that the status of the antenna panel takes effect. In this embodiment of this application, after the network device sends the first antenna panel status information to a terminal device, the network device and the terminal device determine, after preset time periods, that the status indicated by the first antenna panel status information takes effect. In this manner, the terminal device and the network device may be aligned in the status of the panel. In this way, the following problem can be avoided: A signal/channel cannot be transmitted or signal/channel transmission performance is relatively poor because the terminal device does not have time to update the status of the panel, and the network device schedules signal/channel transmission based on the new antenna panel status.

In a possible design, the status of the antenna panel may include at least one of a first state and a second state. The first state may be an active state, and the second state is an inactive state; the first state may be an enabled state, and the second state is a disabled state; the first state may be a power-on state, and the second state is a power-off state; or the first state may be a state that can be used for transmission, and the second state is a state that cannot be used for transmission.

In a possible design, the first antenna panel status information may include N bits, N is a quantity of the at least one antenna panel, the $i^{th}$ bit is used to indicate a status of the $i^{th}$ antenna panel in the at least one antenna panel, and i={0, 1, 2, ..., N}. In the foregoing design, one bit in the first antenna panel status information indicates a status of one antenna panel, so that the network device can accurately determine a status of a corresponding antenna panel based on the bits in the first antenna panel status information.

In a possible design, the first antenna panel status information may indicate the status of the at least one antenna panel by using a status value. In the foregoing design, indication by using the status value may reduce a quantity of bits of the first antenna panel status information, so that signaling overheads can be reduced.

In a possible design, the first antenna panel status information may indicate, by using the status value, switching of the at least one antenna panel between the first state and the second state. Compared with a manner in which the first antenna panel status information indicates statuses of all the antenna panels, the foregoing design in which the first antenna panel status information indicates switching of an antenna panel between the first state and the second state can further reduce signaling overheads.

In a possible design, determining that the status of the antenna panel takes effect may refer to determining that an antenna panel in the first state is in the first state.

In a possible design, determining that the status of the antenna panel takes effect may refer to determining that an antenna panel in the second state is in the second state.

In a possible design, determining that the status of the antenna panel takes effect may refer to determining that an antenna panel in the first state is in the first state, and an antenna panel in the second state is in the second state.

In a possible design, the first antenna panel status information may be used to request measurement on the antenna panel. According to the foregoing design, the network device may request the terminal device to measure the antenna panel.

In a possible design, determining that the status of the antenna panel takes effect may refer to preparing to send or receive reference signals. In the foregoing design, when the first antenna panel status information is used to request to measure the antenna panel, the terminal device may enable, by default, an antenna panel in the inactive state.

In a possible design, a start moment of the preset time period may be a moment at which the first antenna panel status information is sent, or a start moment of the preset time period may be a moment at which feedback information is received, where the feedback information is a HARQ-ACK feedback of the first antenna panel status information.

In a possible design, after the first antenna panel status information is sent, a HARQ-ACK feedback of the first antenna panel status information may be received.

In a possible design, a time length of the preset time period may be related to a state change delay of the antenna panel.

In a possible design, after it is determined that the status of the antenna panel takes effect, L reference signals may be received, where L is a positive integer greater than or equal to 1. A measurement result is obtained based on the L reference signals, and second antenna panel status information is determined based on the measurement result, where the second antenna panel status information includes status information of at least one antenna panel. The second antenna panel status information is sent. In the foregoing design, the terminal device may send the reference signals after receiving the first antenna panel status information, so that the network device can obtain the second antenna panel status information through measurement.

In a possible design, after it is determined that the status of the antenna panel takes effect, K reference signals may be sent, and third antenna panel status information is received, where K is a positive integer greater than or equal to 1. The third antenna panel status information includes status information of at least one antenna panel. In the foregoing design, the terminal device may further measure the antenna panel, so that the network device and the terminal device can obtain relatively accurate antenna panel status information.

In a possible design, the response information may be MAC CE signaling, or may be DCI signaling.

According to a fifth aspect, an embodiment of this application provides an antenna panel status indication method. The method may be applied to a terminal device or a chip or chipset in the terminal device. The method includes: receiving first antenna panel status information, where the first antenna panel status information indicates a status of at least one antenna panel; sending L reference signals by using P antenna panels; and receiving second antenna panel status information, where L is a positive integer greater than or equal to 1, and P is an integer greater than 0. The second antenna panel status information includes status information of at least one antenna panel. In this embodiment of this application, after a network device sends the first antenna panel status information to the terminal device, the terminal device may send the reference signals, so that the network device can obtain the second antenna panel status information through measurement. It may also be understood as: When the network device finds that uplink transmission signal quality is poor, the network device may first request antenna panel measurement or indicate another antenna panel (that is, send the first antenna panel status information). The terminal device may choose to use some antenna panels to send reference signals. The network device selects, by measuring the reference signals, an antenna panel with good quality from antenna panels available to the terminal device, and indicates the antenna panel to the terminal device by using the second antenna panel status information. In this method, quality of signal/channel transmission can be improved, a case in which a signal cannot be transmitted or transmission quality is poor is avoided, and a link can be updated in a timely manner.

In a possible design, the status of the antenna panel may include at least one of a first state and a second state. The first state may be an active state, and the second state is an inactive state; the first state may be an enabled state, and the second state is a disabled state; the first state may be a power-on state, and the second state is a power-off state; or the first state may be a state that can be used for transmission, and the second state is a state that cannot be used for transmission.

In a possible design, the first antenna panel status information may include N bits, N is a quantity of the at least one antenna panel, the $i^{th}$ bit is used to indicate a status of the $i^{th}$ antenna panel in the at least one antenna panel, and i={0, 1, 2, . . . , N}. In the foregoing design, one bit in the first antenna panel status information indicates a status of one antenna panel, so that the network device can accurately determine a status of a corresponding antenna panel based on the bits in the first antenna panel status information.

In a possible design, the first antenna panel status information may indicate the status of the at least one antenna panel by using a status value. In the foregoing design, indication by using the status value may reduce a quantity of bits of the first antenna panel status information, so that signaling overheads can be reduced.

In a possible design, the first antenna panel status information may indicate, by using the status value, switching of the at least one antenna panel between the first state and the second state. Compared with a manner in which the first antenna panel status information indicates statuses of all the antenna panels, the foregoing design in which the first antenna panel status information indicates switching of an antenna panel between the first state and the second state can further reduce signaling overheads.

In a possible design, the first antenna panel status information may be used to request measurement on the antenna panel. According to the foregoing design, the network device may request the terminal device to measure the antenna panel.

According to a sixth aspect, an embodiment of this application provides an antenna panel status indication method. The method may be applied to a network device or a chip or chipset in the network device. The method includes: sending first antenna panel status information, where the first antenna panel status information indicates a status of at least one antenna panel; receiving L reference signals, where L is a positive integer greater than or equal to 1; obtaining a measurement result based on the L reference signals, and determining second antenna panel status information based on the measurement result, where the second antenna panel status information includes status information of at least one antenna panel; and sending the second antenna panel status information. In this embodiment of this application, after the network device sends the first antenna panel status information to a terminal device, the terminal device may send the reference signals, so that the network device can obtain the second antenna panel status information through measurement. It may also be understood as: When the network device finds that uplink transmission signal quality is poor, the network device may first request antenna panel measurement or indicate another antenna panel (that is, send the first antenna panel status information). The terminal device may choose to use some antenna panels to send reference signals. The network device selects, by measuring the reference signals, an antenna panel with good quality from antenna panels available to the terminal device, and indicates the antenna panel to the terminal device by using the second antenna panel status information. In this method, quality of signal/channel transmission can be improved, a case in which a signal cannot be transmitted or transmission quality is poor is avoided, and a link can be updated in a timely manner.

In a possible design, the status of the antenna panel may include at least one of a first state and a second state. The first state may be an active state, and the second state is an inactive state; the first state may be an enabled state, and the second state is a disabled state; the first state may be a power-on state, and the second state is a power-off state; or the first state may be a state that can be used for transmission, and the second state is a state that cannot be used for transmission.

In a possible design, the first antenna panel status information may include N bits, N is a quantity of the at least one antenna panel, the $i^{th}$ bit is used to indicate a status of the $i^{th}$ antenna panel in the at least one antenna panel, and i={0, 1, 2, . . . , N}. In the foregoing design, one bit in the first antenna panel status information indicates a status of one antenna panel, so that the network device can accurately determine a status of a corresponding antenna panel based on the bits in the first antenna panel status information.

In a possible design, the first antenna panel status information may indicate the status of the at least one antenna panel by using a status value. In the foregoing design, indication by using the status value may reduce a quantity of bits of the first antenna panel status information, so that signaling overheads can be reduced.

In a possible design, the first antenna panel status information may indicate, by using the status value, switching of the at least one antenna panel between the first state and the second state. Compared with a manner in which the first antenna panel status information indicates statuses of all the antenna panels, the foregoing design in which the first antenna panel status information indicates switching of an antenna panel between the first state and the second state can further reduce signaling overheads.

In a possible design, the first antenna panel status information may be used to request measurement on the antenna panel. According to the foregoing design, the network device may request the terminal device to measure the antenna panel.

According to a seventh aspect, an embodiment of this application provides an antenna panel status indication method. The method may be applied to a terminal device or a chip or chipset in the terminal device. The method includes: receiving first antenna panel status information, where the first antenna panel status information indicates a status of at least one antenna panel; receiving K reference signals by using Q antenna panels, where K is a positive integer greater than or equal to 1, and Q is an integer greater than 0; obtaining a measurement result based on the K reference signals, and determining third antenna panel status information based on the measurement result, where the third antenna panel status information includes status information of at least one antenna panel; and sending the third antenna panel status information. In this embodiment of this application, after a network device sends the first antenna panel status information to the terminal device, the terminal device may further measure the antenna panel, so that the network device and the terminal device can obtain relatively accurate antenna panel status information.

In a possible design, the status of the antenna panel may include at least one of a first state and a second state. The first state may be an active state, and the second state is an inactive state; the first state may be an enabled state, and the second state is a disabled state; the first state may be a power-on state, and the second state is a power-off state; or the first state may be a state that can be used for transmission, and the second state is a state that cannot be used for transmission.

In a possible design, the first antenna panel status information may include N bits, N is a quantity of the at least one antenna panel, the $i^{th}$ bit is used to indicate a status of the $i^{th}$ antenna panel in the at least one antenna panel, and i={0, 1, 2, . . . , N}. In the foregoing design, one bit in the first antenna panel status information indicates a status of one antenna panel, so that the network device can accurately determine a status of a corresponding antenna panel based on the bits in the first antenna panel status information.

In a possible design, the first antenna panel status information may indicate the status of the at least one antenna panel by using a status value. In the foregoing design, indication by using the status value may reduce a quantity of bits of the first antenna panel status information, so that signaling overheads can be reduced.

In a possible design, the first antenna panel status information may indicate, by using the status value, switching of the at least one antenna panel between the first state and the second state. Compared with a manner in which the first antenna panel status information indicates statuses of all the antenna panels, the foregoing design in which the first antenna panel status information indicates switching of an antenna panel between the first state and the second state can further reduce signaling overheads.

In a possible design, the first antenna panel status information may be used to request measurement on the antenna panel. According to the foregoing design, the network device may request the terminal device to measure the antenna panel.

According to an eighth aspect, an embodiment of this application provides an antenna panel status indication method. The method may be applied to a network device or a chip or chipset in the network device. The method includes: sending first antenna panel status information, where the first antenna panel status information indicates a status of at least one antenna panel; and sending K reference signals, and receiving third antenna panel status information, where K is a positive integer greater than or equal to 1. The third antenna panel status information includes status information of at least one antenna panel. In this embodiment of this application, after the network device sends the first antenna panel status information to a terminal device, the terminal device may further measure the antenna panel, so that the network device and the terminal device can obtain relatively accurate antenna panel status information.

In a possible design, the status of the antenna panel may include at least one of a first state and a second state. The first state may be an active state, and the second state is an inactive state; the first state may be an enabled state, and the second state is a disabled state; the first state may be a power-on state, and the second state is a power-off state; or the first state may be a state that can be used for transmission, and the second state is a state that cannot be used for transmission.

In a possible design, the first antenna panel status information may include N bits, N is a quantity of the at least one antenna panel, the $i^{th}$ bit is used to indicate a status of the $i^{th}$ antenna panel in the at least one antenna panel, and i={0, 1, 2, . . . , N}. In the foregoing design, one bit in the first antenna panel status information indicates a status of one antenna panel, so that the network device can accurately determine a status of a corresponding antenna panel based on the bits in the first antenna panel status information.

In a possible design, the first antenna panel status information may indicate the status of the at least one antenna panel by using a status value. In the foregoing design, indication by using the status value may reduce a quantity of bits of the first antenna panel status information, so that signaling overheads can be reduced.

In a possible design, the first antenna panel status information may indicate, by using the status value, switching of the at least one antenna panel between the first state and the second state. Compared with a manner in which the first antenna panel status information indicates statuses of all the antenna panels, the foregoing design in which the first antenna panel status information indicates switching of an antenna panel between the first state and the second state can further reduce signaling overheads.

In a possible design, the first antenna panel status information may be used to request measurement on the antenna panel. According to the foregoing design, the network device may request the terminal device to measure the antenna panel. According to a ninth aspect, this application provides an antenna panel status indication apparatus. The apparatus may be a communications device, or may be a chip or a chipset in the communications device, and the communications device may be a terminal device or a network device. The apparatus may include a processing unit and a transceiver unit. When the apparatus is a communications device, the processing unit may be a processor, and the transceiver unit may be a transceiver. The apparatus may further include a storage module, and the storage module may be a memory. The storage module is configured to store instructions, and the processing unit executes the instructions stored in the storage module, to enable the terminal device to perform the corresponding functions in the first aspect, the third aspect, the fifth aspect, and the seventh aspect. Alternatively, the processing unit executes the instructions stored in the storage module, to enable the network device to execute the corresponding functions in the second aspect, the fourth aspect, the sixth aspect, and the eighth aspect. When the apparatus is a chip or a chipset in the communications device, the processing unit may be a processor, and the transceiver unit may be an input/output interface, a pin, a circuit, or the like. The processing unit executes the instructions stored in the storage module, to enable the terminal device to perform the corresponding functions in the first aspect, the third aspect, the fifth aspect, and the seventh aspect. Alternatively, the processing unit executes the instructions stored in the storage module, to enable the network device to execute the corresponding functions in the second aspect, the fourth aspect, the sixth aspect, and the eighth aspect. The storage module may be a storage module (for example, a register or a cache) in the chip or the chipset, or may be a storage module (for example, a read-only memory or a random access memory) that is in the network device and that is located outside the chip or the chipset.

According to a tenth aspect, an antenna panel status indication apparatus is provided, including a processor, a communications interface, and a memory. The communications interface is configured to transmit information, a message, and/or data between the apparatus and another apparatus. The memory is configured to store computer execution instructions. When the apparatus runs, the processor executes the computer execution instructions stored in the memory, to enable the apparatus to perform the antenna panel status indication method according to any one of the first aspect and the designs of the first aspect, any one of the second aspect and the designs of the second aspect, any one of the third aspect and the designs of the third aspect, any one of the fourth aspect and the designs of the fourth aspect, any one of the fifth aspect and the designs of the fifth aspect, any one of the sixth aspect and the designs of the sixth aspect, any one of the seventh aspect and the designs of the seventh aspect, or any one of the eighth aspect and the designs of the eighth aspect.

According to an eleventh aspect, this application further provides a computer-readable storage medium. The computer-readable storage medium stores instructions, and when the computer-readable storage medium runs on a computer, the computer is enabled to execute the antenna panel status indication method according to any one of the first aspect and the designs of the first aspect, any one of the second aspect and the designs of the second aspect, any one of the third aspect and the designs of the third aspect, any one of the fourth aspect and the designs of the fourth aspect, any one of the fifth aspect and the designs of the fifth aspect, any one of the sixth aspect and the designs of the sixth aspect, any one of the seventh aspect and the designs of the seventh aspect, or any one of the eighth aspect and the designs of the eighth aspect.

According to a twelfth aspect, this application further provides a computer program product that includes instructions, and when the computer program product runs on a computer, the computer is enabled to execute the antenna panel status indication method according to any one of the first aspect and the designs of the first aspect, any one of the second aspect and the designs of the second aspect, any one of the third aspect and the designs of the third aspect, any one of the fourth aspect and the designs of the fourth aspect, any one of the fifth aspect and the designs of the fifth aspect, any one of the sixth aspect and the designs of the sixth aspect, any one of the seventh aspect and the designs of the seventh aspect, or any one of the eighth aspect and the designs of the eighth aspect.

According to a thirteenth aspect, this application further provides a network system. The network system includes a terminal device and a network device. The terminal device may execute corresponding functions in the foregoing first aspect, and the network device may execute corresponding functions in the foregoing second aspect. Alternatively, the terminal device may execute corresponding functions in the third aspect, and the network device may execute corresponding functions in the fourth aspect. Alternatively, the terminal device may execute corresponding functions in the fifth aspect, and the network device may execute corresponding functions in the sixth aspect. Alternatively, the terminal device may execute corresponding functions in the seventh aspect, and the network device may execute corresponding functions in the eighth aspect.

According to a fourteenth aspect, an embodiment of this application provides a chip. The chip includes a memory, at least one processor, and a communications interface. The processor is coupled to the memory to read a computer program stored in the memory to execute the antenna panel status indication method according to any one of the first aspect and the designs of the first aspect, any one of the second aspect and the designs of the second aspect, any one of the third aspect and the designs of the third aspect, any one of the fourth aspect and the designs of the fourth aspect, any one of the fifth aspect and the designs of the fifth aspect, any one of the sixth aspect and the designs of the sixth aspect, any one of the seventh aspect and the designs of the seventh aspect, or any one of the eighth aspect and the designs of the eighth aspect of the embodiments of this application.

According to a fifteenth aspect, an embodiment of this application provides a chip, including a communications interface and at least one processor. The processor runs to execute the antenna panel status indication method according to any one of the first aspect and the designs of the first aspect, any one of the second aspect and the designs of the second aspect, any one of the third aspect and the designs of the third aspect, any one of the fourth aspect and the designs of the fourth aspect, any one of the fifth aspect and the designs of the fifth aspect, any one of the sixth aspect and the designs of the sixth aspect, any one of the seventh aspect and the designs of the seventh aspect, or any one of the eighth aspect and the designs of the eighth aspect.

It should be noted that "coupling" in the embodiments of this application indicates a direct combination or an indirect combination between two components.

BRIEF DESCRIPTION OF DRAWINGS

FIG. 16A(1) and FIG. 16A(2) are a schematic diagram of uplink transmission scheduling in Scenario 1 according to an embodiment of this application;

FIG. 16B(1) and FIG. 16B(2) are a schematic diagram of another uplink transmission scheduling in Scenario 1 according to an embodiment of this application;

FIG. 17A(1) and FIG. 17A(2) are a schematic diagram of uplink transmission scheduling in Scenario 2 according to an embodiment of this application;

FIG. 17B(1) and FIG. 17B(2) are a schematic diagram of another uplink transmission scheduling in Scenario 2 according to an embodiment of this application;

DESCRIPTION OF EMBODIMENTS

Figure 1:
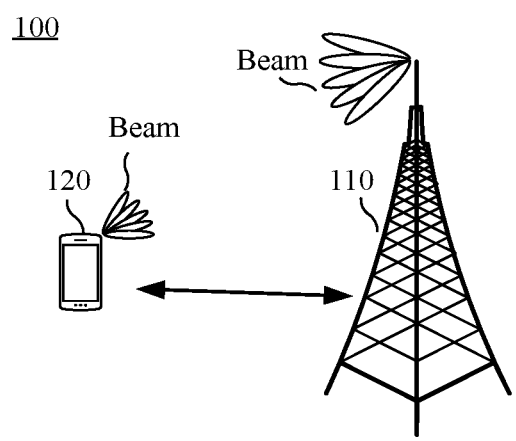
FIG. 1 is a schematic diagram of an architecture of a communications system according to an embodiment of this application.

To facilitate understanding of the embodiments of this application, the following describes terms related to the embodiments of this application.

1. Beam (Beam):

The beam is a communication resource. The beam may be a wide beam, a narrow beam, or a beam of another type. A technology for forming the beam may be a beamforming technology or another technical means. The beamforming technology may be specifically a digital beamforming technology, an analog beamforming technology, or a hybrid digital/analog beamforming technology. Different beams may be considered as different resources. Same information or different information may be sent by using different beams. Optionally, a plurality of beams having same or similar communication features may be considered as one beam. One beam may include one or more antenna ports, configured to transmit a data channel, a control channel, a sounding signal, and the like. For example, a transmit beam may be distribution of signal strength formed in different directions in space after a signal is transmitted through an antenna, and a receive beam may be distribution of signal strength, in different directions in space, of a radio signal received from an antenna. It may be understood that, one or more antenna ports forming one beam may also be considered as one antenna port set.

Beams may be classified into a transmit beam and a receive beam of a network device, and a transmit beam and a receive beam of a terminal device. The transmit beam of the network device is used to describe transmit-side beamforming information of the network device, and the receive beam of the base station is used to describe receive-side beamforming information of the network device. The transmit beam of the terminal device is used to describe transmit-side beamforming information of the terminal device, and the receive beam of the terminal is used to describe receive-side beamforming information of the terminal device. In other words, the beam is used to describe beamforming information.

The beam may correspond to a time resource, a space resource, and/or a frequency domain resource.

Optionally, the beam may further correspond to a reference signal (reference signal, RS) resource (for example, a beamforming RS resource) or beamforming information.

Optionally, the beam may further correspond to information associated with an RS resource of a network device. The RS may be a channel state information-reference signal (channel state information reference Signal, CSI-RS), a synchronization signal broadcast channel block (synchronous signal/PBCH block, SS/PBCH block), which may also be referred to as an SSB, a demodulation reference signal (demodulation reference signal, DMRS), a phase tracking reference signal (phase tracking reference signal, PTRS), a tracking reference signal (tracking reference signal, TRS), or the like. The information associated with the RS resource may be an RS resource identifier, quasi-collocation (quasi-collocation, QCL) information (especially QCL of type D), or the like. The RS resource identifier is corresponding to a transmit/receive beam pair previously established during measurement based on the RS resource. The terminal may infer beam information based on the RS resource index.

Optionally, the beam may further correspond to a spatial domain filter (spatial filter or spatial domain filter) or a spatial domain transmission filter (spatial domain transmission filter).

The receive beam may be equivalent to a spatial transmission filter, a spatial domain transmission filter, a spatial domain receive filter, or a spatial receive filter. The transmit beam may be equivalent to a spatial domain filter, a spatial domain transmission filter, a spatial domain transmit filter, or a spatial transmit filter. Spatial relation parameter information may be equivalent to a spatial filter (spatial domain transmission/receive filter). Optionally, the spatial filter generally includes a spatial transmit filter and a spatial receive filter. The spatial filter may also be referred to as a spatial domain transmit filter, a spatial domain receive filter, a spatial transmission filter, a spatial domain transmission filter, or the like. A receive beam on a terminal device side and a transmit beam on a network device side each may be a downlink spatial filter, and a transmit beam on the terminal device side and a receive beam on the network device side each may be an uplink spatial filter.

2. Antenna Panel:

At least one antenna panel may be disposed on each of a network device and a terminal device. One antenna panel may correspond to a set of independent transmit links, for example, including a power amplifier and a transmit channel. One antenna panel may further correspond to a set of independent receive links, for example, including a power amplifier and a receive channel. An antenna panel used to send a signal and an antenna panel used to receive a signal may be a same antenna panel, or may be different antenna panels. One antenna panel may generate a plurality of analog beams by using a phase shifter. However, because of a working principle of the phase shifter, analog beams generated on a same antenna panel cannot be used at the same time. That is, a plurality of analog beams generated on one antenna panel can be used only in time division multiplexing, and independent analog beams generated on a plurality of antenna panels can be used at the same time. That is, a plurality of analog beams generated on a plurality of antenna panels can be used in frequency division multiplexing. A plurality of physical antennas in one antenna panel may further generate digital beams (for example, a precoder (precoder) or a precoding matrix). The digital beams may be frequency division multiplexed, space division multiplexed, or the like. In other words, an antenna panel including a plurality of antennas may support multi-layer data transmission. A plurality of layers of data may be transmitted by using one orthogonal precoding matrix. The plurality of layers of data may further be transmitted in a superimposed analog beam at a high frequency (that is, data is transmitted in a manner of combining the digital beam and the analog beam).

The antenna panel may be one or more physical antennas on the terminal device. The antenna panel (panel) may also be referred to as an antenna set, a radio transceiver unit (transceiver unit TXRU) (or referred to as a radio transceiver group), an antenna unit, an antenna group, a horizontal antenna set, a vertical antenna set, an antenna element, an antenna port set, or the like. The antenna panel may have other names. This is not limited in the embodiments of this application.

It should be further understood that in the embodiments of this application, "antenna panel" may be replaced with "antenna panel information", that is, the antenna panel may be represented by antenna panel information. The antenna panel information may be a virtual identifier of the antenna panel, or an identifier implicitly indicating a reference signal resource of the antenna panel, or an antenna port group identifier (UE antenna port group ID), or an antenna group identifier (UE antenna group ID), or a beam group identifier, a reference signal resource group identifier, or an antenna panel identifier. This is not limited in this application. It should be understood that, in the embodiments of this application, the antenna panel information may be replaced with virtual identification information of the antenna panel, identification information implicitly indicating a reference signal resource of the antenna panel, antenna port group identification information, antenna group identification information, beam group identification information, reference signal resource group identification information, or antenna panel identification information. The antenna panel information may also be referred to as another term. The embodiments of this application are not limited thereto.

It should be understood that, one piece of antenna panel information may correspond to one power control parameter and/or one timing advance (Timing advance, TA) parameter. It should be understood that the antenna panel in the present invention may be a transmit antenna panel, or may be receive antenna panel information. Optionally, the terminal device and the network device may determine one or more antenna panels, antenna port groups, or antenna groups based on one antenna panel.

It should be noted that, with continuous development of technologies, the terms in the embodiments of this application may change, but all of them shall fall within the protection scope of this application.

To make objectives, technical solutions, and advantages of the embodiments of this application clearer, the following further describes the embodiments of this application in detail with reference to accompanying drawings.

The communication method provided in this application may be applied to various communications systems, for example, the Internet of Things (internet of things, IoT), a narrow band Internet of Things (narrow band internet of things, NB-IoT), Long Term Evolution (long term evolution, LTE), a fifth generation (5G) communications system, a hybrid architecture of LTE and 5G, a 5G NR system, a new communications system emerging in future communications development, or the like. The 5G communications system described in this application may include at least one of a non-standalone (non-standalone, NSA) 5G communications system or a standalone (standalone, SA) 5G communications system. The communications system may also be a public land mobile network (public land mobile network, PLMN), a device-to-device (device-to-device, D2D) network, a machine to machine (machine to machine, M2M) network, or another network. As long as at least one communications device (for example, one communications device, two communications devices, three communications devices, or four communications devices) in the communications system has a plurality of antenna panels, and the communications device needs to use one or more antenna panels to receive and transmit data, the antenna panel status indication method provided in the embodiments of this application may be used.

FIG. 1 shows a communications system 100 applicable to the embodiments of this application. The communications system 100 is in a single carrier scenario or a carrier aggregation (carrier aggregation, CA) scenario. The communications system 100 includes a network device 110 and a terminal device 120. The network device 110 and the terminal device 120 may communicate with each other by using one or more beams.

It should be understood that one or more cells may be covered by the network device 110 in FIG. 1. When transmission of the communications system 100 is uplink transmission, the terminal device 120 is a transmit end, and the network device 110 is a receive end. When transmission of the communications system 100 is downlink transmission, the network device 110 is a transmit end, and the terminal device 120 is a receive end.

Figure 2:
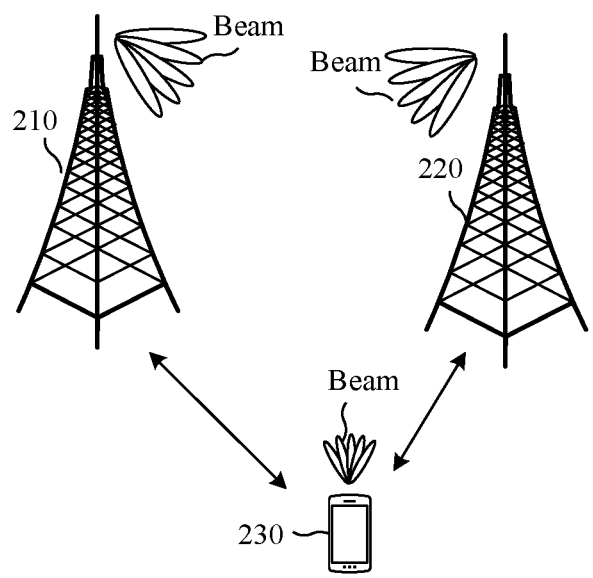
FIG. 2 is a schematic diagram of an architecture of another communications system according to an embodiment of this application.

FIG. 2 shows another communications system 200 applicable to the embodiments of this application. The communications system 200 is in a scenario of dual connectivity (dual connectivity, DC) or coordinated multipoint transmission/reception (coordinated multipoint transmission/reception, CoMP). The communications system 200 includes a network device 210, a network device 220, and a terminal device 230. The network device 210 may be a network device at initial access of the terminal device 230, and is responsible for RRC communication with the terminal device 230. The network device 220 is added during RRC reconfiguration and is used to provide additional radio resources. The terminal device 230 for which carrier aggregation (CA) is configured is connected to the network device 210 and the network device 220. A link between the network device 210 and the terminal device 230 may be referred to as a first link, and a link between the network device 220 and the terminal device 230 may be referred to as a second link.

Figure 3:
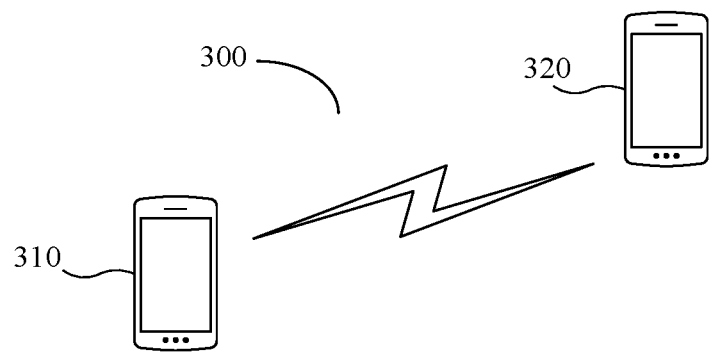
FIG. 3 is a schematic diagram of an architecture of still another communications system according to an embodiment of this application.

FIG. 3 shows still another communications system 300 applicable to the embodiments of this application. The communications system 300 is in a D2D vehicle to X (vehicle to X, V2X) scenario. The communications system 300 includes a terminal device 310 and a terminal device 320. The terminal device 310 and the terminal device 320 may perform side link communication (Side link Communication) or D2D communication.

The foregoing communications systems applicable to the embodiments of this application are merely examples for description. Communications systems applicable to the embodiments of this application are not limited thereto. For example, a quantity of network devices and a quantity of terminal devices included in the communications system may be other quantities, or a scenario with a single base station and multi-carrier aggregation, a dual-link scenario, a D2D communication scenario, or a CoMP scenario is used. CoMP may be one or more of a non-coherent joint transmission (non-coherent joint transmission, NCJT) scenario, a coherent joint transmission (coherent joint transmission, CJT) scenario, a joint transmission (joint transmission, JT) scenario, or the like.

The terminal device in the embodiments of this application is an entity on a user side that is configured to receive or transmit a signal. The terminal device may be a device that provides voice and data connectivity for a user, for example, a handheld device or a vehicle-mounted device having a wireless connection function. The terminal device may alternatively be another processing device connected to a wireless modem. The terminal device may communicate with one or more core networks through a radio access network (radio access network, RAN). The terminal device may also be referred to as a wireless terminal, a subscriber unit (subscriber unit), a subscriber station (subscriber station), a mobile station (mobile station), a mobile (mobile), a remote station (remote station), an access point (access point), a remote terminal (remote terminal), an access terminal (access terminal), a user terminal (user terminal), a user agent (user agent), a user device (user device), user equipment (user equipment), or the like. The terminal device may be a mobile terminal, for example, a mobile phone (or referred to as a "cellular" phone), and a computer that has a mobile terminal. For example, the terminal device may be a portable, pocket-sized, handheld, computer built-in, or in-vehicle mobile apparatus, which exchanges a voice and/or data with the radio access network. For example, the terminal device may alternatively be a device such as a personal communication service (personal communication service, PCS) phone, a cordless telephone set, a session initiation protocol (session initiation protocol, SIP) phone, a wireless local loop (wireless local loop, WLL) station, or a personal digital assistant (personal digital assistant, PDA). For example, common terminal devices include a mobile phone, a tablet computer, a notebook computer, a palmtop computer, a mobile internet device (mobile internet device, MID), and a wearable device such as a smartwatch, a smart band, or a pedometer. However, the embodiments of this application are not limited thereto. The terminal device in the embodiments of this application may alternatively be a terminal device or the like appearing in a future evolved PLMN. This is not limited in the embodiments of this application.

In addition, in the embodiments of this application, the terminal device may alternatively be a terminal device in an IoT system. IoT is an important part of future development of information technologies. A main technical feature of IoT is connecting a thing to a network by using a communications technology, to implement an intelligent network for interconnection between a person and a machine or between one thing and another. In the embodiments of this application, an IoT technology may implement massive connections, deep coverage, and terminal power saving by using, for example, a narrowband (narrowband) NB technology.

In addition, in the embodiments of this application, the terminal device may alternatively include a sensor such as an intelligent printer, a train detector, or a gas station. Main functions of the terminal device include collecting data (for some terminal devices), receiving control information and downlink data from a network device, sending an electromagnetic wave, and sending uplink data to a network device.

The network device in the embodiments of this application is an entity on a network side that is configured to transmit or receive a signal, may be configured to mutually convert a received over-the-air frame and an internet protocol (internet protocol, IP) packet, and serves as a router between a terminal device and a remaining part of an access network. The remaining part of the access network may include an IP network and the like. The network device may further coordinate attribute management of an air interface. The network device in the embodiments of this application may be a device in a wireless network, for example, a RAN node that connects the terminal to the wireless network. For example, the network device may be an evolved NodeB (evolved NodeB, eNB or e-NodeB) in LTE, or may be a new radio controller (new radio controller, NR controller), may be a gNodeB (gNB) in a 5G system, may be a centralized unit (centralized unit, CU), may be a new radio base station, may be a radio remote module, may be a micro base station, may be a relay (relay), may be a distributed unit (distributed unit, DU), may be a home base station, may be a transmission reception point (transmission reception point, TRP) or a transmission point (transmission point, TP), or may be any other wireless access device. This is not limited in the embodiments of this application. The network device may cover one or more cells.

Figure 4:
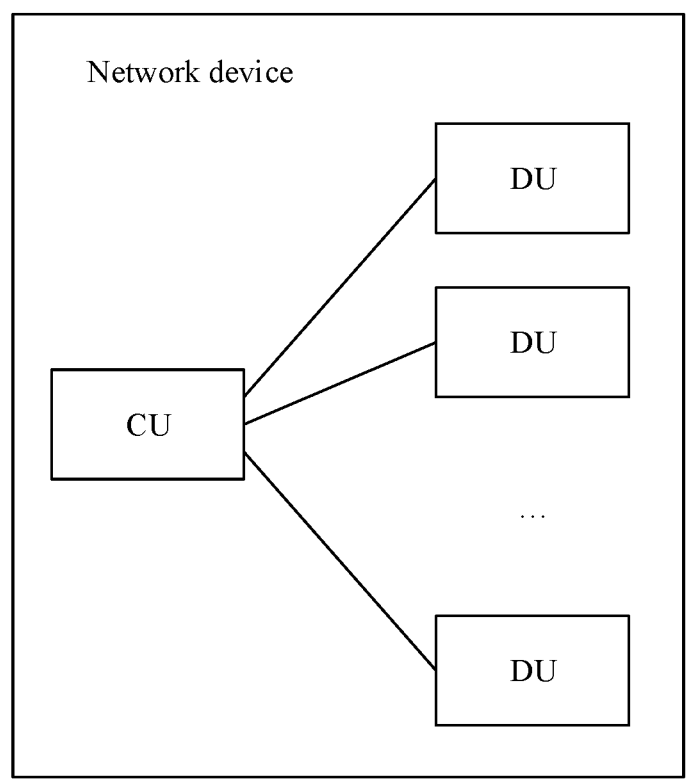
FIG. 4 is a schematic diagram of a structure of a radio access network device according to an embodiment of this application.

For example, a structure of a radio access network device in the embodiments of this application may be shown in FIG. 4. Specifically, the radio access network device may be divided into a CU and at least one DU. The CU may be configured to manage or control the at least one DU, which may also be referred to as that the CU is connected to the at least one DU. In this structure, protocol layers of the radio access network device in the communications system may be split. Some protocol layers are controlled by the CU in a centralized manner, functions of some or all of remaining protocol layers are distributed in the DU, and the CU controls the DU in a centralized manner. For example, the radio access network device is a gNB. Protocol layers of the gNB include a radio resource control (radio resource control, RRC) layer, a service data adaptation protocol (service data adaptation protocol, SDAP) layer, a packet data convergence protocol (packet data convergence protocol, PDCP) layer, a radio link control (radio link control, RLC) layer, a media access control (media access control, MAC) layer, and a physical layer. For example, the CU may be configured to implement functions of the RRC layer, the SDAP layer, and the PDCP layer, and the DU may be configured to implement functions of the RLC layer, the MAC layer, and the physical layer. Protocol stacks included in the CU and the DU are not specifically limited in the embodiments of this application.

Figure 5:
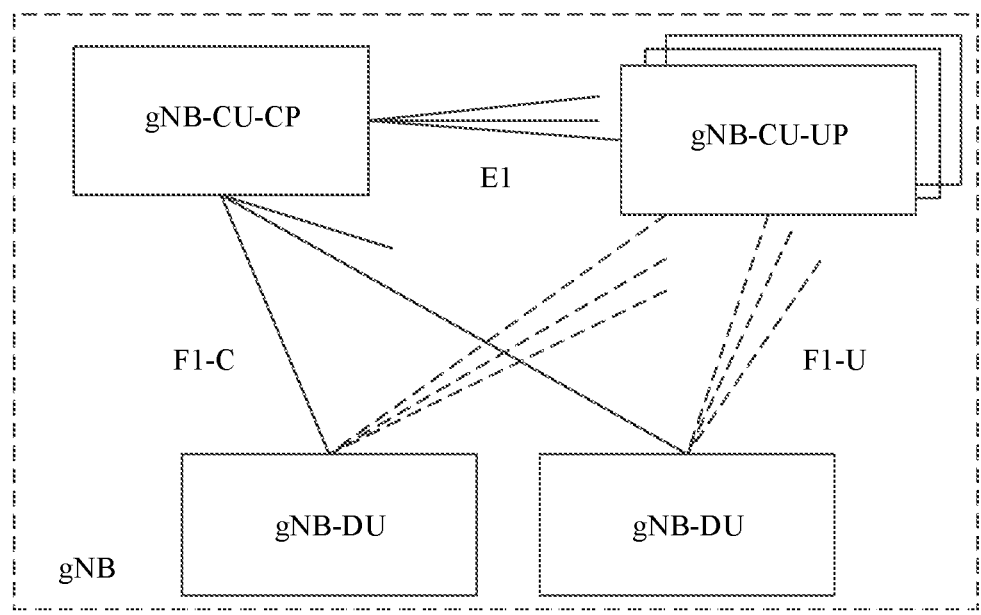
FIG. 5 is a schematic diagram of a structure of a gNB according to an embodiment of this application.

For example, the CU in the embodiments of this application may be further divided into one control plane (CU-control plane, CU-CP) network element and a plurality of user plane (CU-user plane, CU-UP) network elements. The CU-CP may be used for control plane management, and the CU-UP may be used for user plane data transmission. An interface between the CU-CP and the CU-UP may be an E1 interface. An interface between the CU-CP and the DU may be F1-C, and is used for control plane signaling transmission. An interface between the CU-UP and the DU may be F1-U, and is used for user plane data transmission. The CU-UP and the CU-UP may be connected through an Xn-U interface, to perform user plane data transmission. For example, a gNB is used as an example. A structure of the gNB may be shown in FIG. 5.

A network architecture and a service scenario described in the embodiments of this application are intended to describe the technical solutions in the embodiments of this application more clearly, and do not constitute any limitation on the technical solutions provided in the embodiments of this application. A person of ordinary skill in the art may know that with evolution of the network architecture and emergence of a new service scenario, the technical solutions provided in the embodiments of this application are also applicable to a similar technical problem.

Communications systems generally use different types of RS: One type of RS is used to estimate a channel, so that a receive signal that includes control information or data can be demodulated coherently; another type is used for channel state or channel quality measurement to schedule UEs. User equipment obtains channel state information (channel state information, CSI) based on channel quality measurement on a CSI-RS. The CSI includes at least one of a rank indicator (rank indicator, RI), a precoding matrix indicator (precoding matrix indicator, PMI), a channel quality indicator (channel quality indicator, CQI), or the like. The CSI information may be sent by the user equipment to the base station through a physical uplink control channel or a physical uplink shared channel.

With emergence of intelligent terminals, especially emergence of video services on the terminals, current spectrum resources can hardly match an explosive growth of users' capacity requirements. A high frequency band with a larger available bandwidth, especially a millimeter-wave band, gradually becomes a candidate frequency band of a next generation communications system. In addition, in a modern communications system, a multi-antenna technology is usually used to increase a capacity and coverage of the system, or improve user experience. Another advantage of using the high frequency band is that a size of a multi-antenna configuration can be greatly reduced, to facilitate site obtaining and deployment of more antennas. However, it is different from an operating band of an existing system such as an LTE system that the high frequency band causes a larger path loss, and especially, a loss in radio propagation further becomes larger due to factors such as atmosphere and vegetation.

To overcome the larger propagation loss, a signal transmission mechanism that is based on a beamforming technology is used, to compensate for the loss in a signal propagation process by using a relatively high antenna gain. Beamforming signals may include a broadcast signal, a synchronization signal, a cell specific RS, and the like.

When a signal is transmitted based on the beamforming technology, once a user moves, a direction of a beamformed beam corresponding to the transmitted signal may not match a location of the user after movement, and interruption to receiving of the signal may occur frequently. To track changes of the beamformed beam in the signal transmission process, channel quality measurement and result reporting based on the beamforming technology are introduced. The channel quality measurement may be based on a beamformed synchronization signal or a cell-specific RS. Handover of the user between different beamformed beams is more dynamic and frequent than handover between cells. Therefore, a dynamic measurement reporting mechanism is required. Optionally, similar to CSI information reporting, reporting of a channel quality result of the beamformed beam may also be sent by user equipment to a base station through a physical uplink control channel or a physical uplink shared channel.

In NR, one terminal device may have a plurality of antenna panels (panels), and each antenna panel may correspond to one or more beams.

The terminal device may be configured with one or more panels, and a status of the panel includes an active state and an inactive state. The active state may also be understood as a power-on state of the panel. That is, because the panel is in a state of being ready for transmission, a preparation time required for performing transmission by using the panel is relatively short (μs level). The inactive state may be understood as a power-off state of the panel. That is, because the panel is not in a state of being ready for transmission, if transmission needs to be performed by using the panel, the panel needs to be activated first, and then transmission is prepared. Therefore, a relatively long preparation time (2-3 μs level) is required.

Generally, the terminal device may determine whether to activate or deactivate the panel. For example, to maintain a power saving state, the terminal activates only one panel, and deactivates other panels. When receiving performance of a single panel is poor, the terminal simultaneously activates a plurality of panels for receiving data or an RS. Alternatively, when the terminal finds, based on measurement, that transmission performance of a currently activated panel decreases, for example, RSRP or an SINR decreases, or when the terminal finds that the currently activated panel causes relatively large radiation to a human body, the terminal switches the activated panel.

Figure 6:
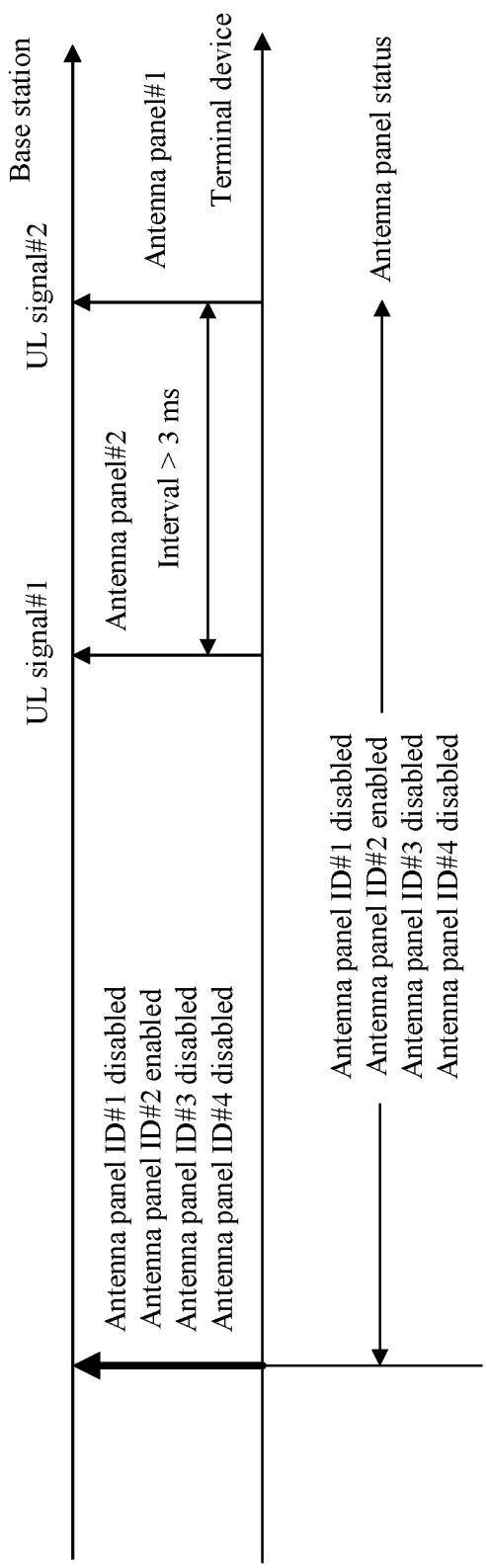
FIG. 6 is a schematic diagram of uplink transmission scheduling according to an embodiment of this application.
Figure 7:
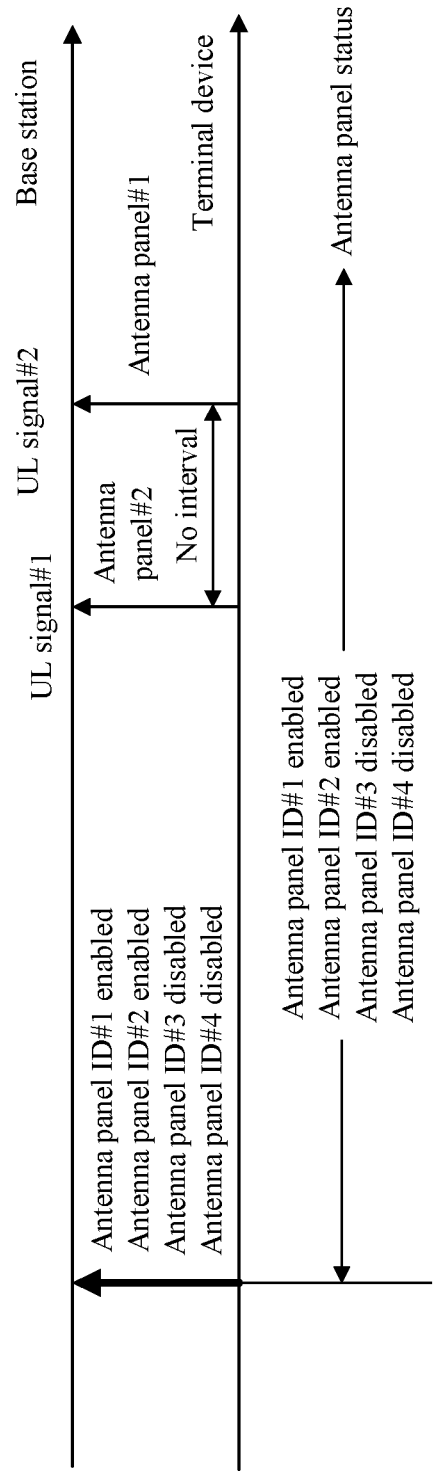
FIG. 7 is a schematic diagram of another uplink transmission scheduling according to an embodiment of this application.

When the base station schedules signal/channel transmission, if the base station schedules a panel in an inactive state of the terminal device, a panel switching/activation time needs to be reserved. It is assumed that panel 1 (antenna panel ID #1 shown in the figure; other panels are similar), panel 3, and panel 4 of the terminal device are inactive ("off" represents an inactive panel), and panel 2 is active ("on"

represents an active panel). If the base station schedules panel 2 of the terminal device to send uplink signal 1 (uplink signal, UL signal #1), and schedules panel 1 to send uplink signal 2 (UL signal #2), because the inactive panel (that is, panel 1) is scheduled in the two uplink transmissions, the base station needs to reserve a panel activation time. Therefore, there is a relatively large interval between the two uplink transmissions, as shown in FIG. 6. It is assumed that panel 3 and panel 4 of the terminal device are inactive ("off" represents an inactive panel), and panel 1 and panel 2 are active ("on" represents an active panel). If the base station schedules panel 2 of the terminal device to send uplink signal 1 (UL signal #1), and schedules panel 1 to send uplink signal 2 (UL signal #2), because the panels scheduled in the two uplink transmissions are active, the base station almost does not need to reserve a panel switching time. Therefore, an interval between the two uplink transmissions is relatively small, as shown in FIG. 7, that is, the two uplink transmissions may be considered as continuous.

Currently, the terminal device may report a status of the panel to the network device, or the network device may indicate the status of the panel of the terminal device, so that the network device and the terminal device have a consistent understanding of the status of the panel of the terminal device. In this way, the network device does not need to always schedule a signal/channel based on a maximum delay.

However, after the terminal device reports the status of the panel, a specific time at which the network device schedules signal/channel transmission based on reported status information of the panel is not defined. As a result, the network device and the terminal device have different understandings of the status of the panel of the terminal device in a specific period of time. This further causes a problem that a signal/channel cannot be transmitted or signal/channel transmission quality is poor in the time period.

Correspondingly, after the network device indicates the status of the panel of the terminal device, a specific time at which the network device can schedule signal/channel transmission based on the reported status information of the panel is not defined. As a result, the network device and the terminal device have different understandings of the status of the panel of the terminal device in a specific period of time. This further causes a problem that a signal/channel cannot be transmitted or signal/channel transmission quality is poor in the time period.

Based on this, the embodiments of this application provide four antenna panel status indication methods and apparatuses, to resolve a problem in the current technology that signal/channel transmission quality is relatively poor because the network device and the terminal device are not aligned in the antenna panel status of the terminal device. The method and the apparatus are based on a same inventive concept. Because a problem-resolving principle of the method is similar to a problem-resolving principle of the apparatus, mutual reference may be made between an implementation of the apparatus and an implementation of the method, and no repeated description is provided.

It should be understood that, in the embodiments of this application, "at least one" means one or more, and "a plurality of" means two or more. The term "and/or" describes an association relationship between associated objects, and represents that three relationships may exist. For example, A and/or B may represent the following cases: Only A exists, both A and B exist, and only B exists, where A and B may be singular or plural. The character "/" usually represents an "or" relationship between the associated objects. "At least one of the following items (pieces)" or a similar expression thereof indicates any combination of these items, including a single item (piece) or any combination of a plurality of items (pieces). For example, at least one of a, b, or c may indicate a, b, c, a and b, a and c, b and c, or a, b, and c, where a, b, and c may be singular or plural.

In addition, it should be understood that, in the descriptions of this application, terms such as "first" and "second" are only used for a purpose of distinguishing descriptions, but cannot be understood as indicating or implying relative importance, or as indicating or implying a sequence, or indicating a quantity.

It should be understood that, in the embodiments of this application, that the antenna panel status information indicates statuses of antenna panels may be understood as that the antenna panel status information indicates not only the antenna panels, but also indicates statuses corresponding to the antenna panels. Alternatively, that the antenna panel status information indicates statuses of antenna panels may be understood as that the antenna panel status information indicates the antenna panels, and statuses corresponding to the antenna panels are all the first states or all the second states (for example, the antenna panel status information may be used to indicate only antenna panels in a same state; in other words, the antenna panel status information may be used to indicate antenna panels in the first state, or the antenna panel status information may be used to indicate antenna panels in the second state). Alternatively, that the antenna panel status information indicates statuses of antenna panels may be understood as that some status bits of the antenna panel status information indicate antenna panels in the first state, and other status bits of the antenna panel status information indicate antenna panels in the second state; or some status bits of the antenna panel status information indicate antenna panels, and other status bits indicate statuses corresponding to the antenna panel status information.

It should be understood that, in the embodiments of this application, a quantity of antenna panels indicated by the antenna panel status information may be implemented in the following manners:

Manner 1: The quantity of antenna panels indicated by the antenna panel status information may be a total quantity of antenna panels included in the terminal device. For example, the terminal device has a total of N antenna panels. The N antenna panels may be N transmit antenna panels or N receive antenna panels, or the N antenna panels include transmit antenna panels and receive antenna panels. N is a positive integer greater than or equal to 1.

Manner 2: The quantity of antenna panels indicated by the antenna panel status information may be a quantity of antenna panels reported by the terminal device based on a capability of the terminal device. For example, N antenna panels are reported by the terminal device based on the capability of the terminal device. The N antenna panels may be N transmit antenna panels or N receive antenna panels, or the N antenna panels include transmit antenna panels and receive antenna panels. N is a positive integer greater than or equal to 1.

Manner 3: The quantity of antenna panels indicated by the antenna panel status information may be sent by the terminal device to the network device. For example, the terminal device may send, to the network device by using channel state information, the quantity of antenna panels indicated by the antenna panel status information. The channel state information may include information used to indicate the quantity of antenna panels (which may be referred to as antenna panel quantity information). Alternatively, the antenna panel quantity information may be sent to the network device by using information other than the channel state information. For example, the channel state information may be information including L1-RSRP or L1-SINR.

Manner 4: The quantity of antenna panels indicated by the antenna panel status information may be indicated by the network device to the terminal device by using indication information (this may be understood as: The terminal device determines, based on the indication information from the network device, the quantity of antenna panels indicated by the antenna panel status information of the terminal device).

Manner 5: The quantity of antenna panels indicated by the antenna panel status information may be predefined in a protocol.

It should be understood that the antenna panels indicated by the antenna panel status information may be transmit antenna panels of the terminal device. Alternatively, the antenna panels indicated by the antenna panel status information may be receive antenna panels of the terminal device. Alternatively, the antenna panels indicated by the antenna panel status information may be receive antenna panels of the terminal device. Alternatively, the antenna panels indicated by the antenna panel status information may be receive antenna panels of the terminal device and transmit antenna panels of the terminal device. Alternatively, the antenna panels indicated by the antenna panel status information may be transmit antenna panels of the terminal device that correspond to receive antenna panels of the terminal device. Alternatively, the antenna panels indicated by the antenna panel status information are both transmit antenna panels of the terminal device and receive antenna panels of the network device.

It should be understood that in the embodiments of this application, signal/channel refers to a signal or a channel. The signal may be an uplink signal, or may be a downlink signal, or may be a broadcast signal (for example, an SSB). The channel may be an uplink channel (for example, a physical uplink shared channel (physical uplink shared channel, PUSCH), a physical uplink control channel (physical uplink control channel, PUCCH)), or may be a downlink channel (for example, a physical downlink shared channel (physical downlink shared channel, PDSCH), or a physical downlink control channel (physical downlink control channel, PDCCH)), or may be a broadcast channel (for example, a physical broadcast channel (physical broadcast channel, PBCH)). The signal may alternatively be a reference signal (for example, an uplink reference signal: a sounding reference signal (sounding reference signal, SRS), a channel state information reference signal (channel state information reference signal, CSI-RS), a DMRS, or the like; and a downlink reference signal: a CSI-RS, a DMRS, or the like), or may be a data (data) signal, or the like.

It should be understood that in the embodiments of this application, the network device may configure a plurality of reference signals (used for measurement of a plurality of antenna panels), and the terminal device may select all or a part of the plurality of reference signals for sending. In other words, the network device may configure a plurality of reference signals corresponding to all or a part of antenna panels of the terminal device, and the terminal device may select, based on a condition of the terminal device (for example, a power amount or a human body radiation condition), all or a part of the antenna panels to send all or a part of the reference signals. For example, the network device indicates, to the terminal device, reference signal resource sets: SRS set #1, SRS set #2, SRS set #3, and SRS set #4, and the four resource sets are respectively corresponding to panel #1, panel #2, panel #3, and panel #4. Considering insufficient power, the terminal device may select all or a part of reference signals in SRS set #1 and SRS set #2 for sending.

In the embodiments of this application, the network device may configure and send a plurality of reference signals (used for measurement of a plurality of antenna panels), and the terminal device may select all antenna panels or some antenna panels to receive the plurality of reference signals.

In other words, the network device may configure and send a plurality of reference signals corresponding to all or a part of the antenna panels of the terminal device, and the terminal device may select, based on a condition of the terminal device (for example, a power amount or a human body radiation condition), all or a part of the antenna panels to receive all or a part of the reference signals. For example, the network device configures and sends reference signal resource sets: CSI-RS set #1, CSI-RS set #2, CSI-RS set #3, and CSI-RS set #4 to the terminal device, and the four resource sets are respectively corresponding to panel #1, panel #2, panel #3, and panel #4. Considering insufficient power, the terminal device may select panel #1 to receive all or a part of reference signals in CSI-RS set #1, and uses panel #2 to receive all or a part of reference signals in CSI-RS set #2.

In this application, the status indicated by the first antenna panel status information may include only the first state, or the status indicated by the first antenna panel status information may include only the second state, or the status indicated by the first antenna panel status information may include the first state and the second state. The first state may be a state in which the antenna panel is ready for transmission, and the network device may schedule a panel in the first state with a low delay (or even without a delay) to transmit a signal/channel. For example, the first state may be referred to as an active state, an enabled state, a power-on state, a state that can be used for transmission, or the like. The second state may be a state in which the antenna panel is not ready for transmission, and the network device cannot schedule a panel in the second state with a low delay (or even no delay) to transmit a signal/channel. For example, the second state may be referred to as an inactive state, a disabled state, a power-off state, a state that cannot be used for transmission, or the like. For ease of description, in the embodiments of this application, the first state is referred to as an active state, and the second state is referred to as an inactive state.

Optionally, a quantity of antenna panels indicated by the first antenna panel status information may be less than or equal to a quantity of antenna panels that the terminal device has.

In addition, the antenna panel in this application may be an antenna panel used for sending, an antenna panel used for receiving, or an antenna panel used for sending and receiving.

It should be noted that "transmission" in this application may refer to sending or receiving between the terminal device and the network device. It should be understood that "transmission" may be replaced with "communication". For example, transmission may refer to sending by the terminal device and receiving by the network device, or receiving by the terminal device and sending by the network device.

The following specifically describes two antenna panel status indication methods provided in this application with reference to the accompanying drawings.

Embodiment 1

Figure 8:
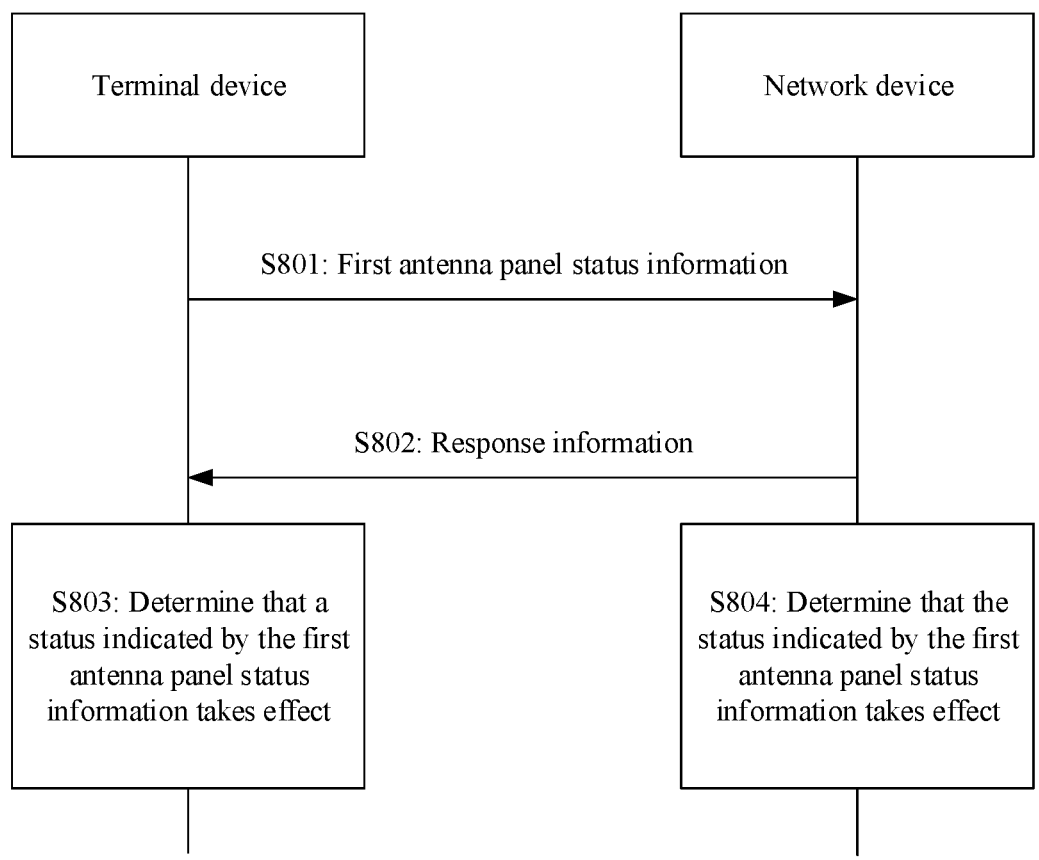
FIG. 8 is a schematic diagram of an antenna panel status indication method according to an embodiment of this application.

FIG. 8 shows an antenna panel status indication method according to an embodiment of this application. The method may be applied to the communications system shown in FIG. 1, FIG. 2, or FIG. 3. Specifically, the method may be applied to a communications device, or may be applied to a chip or a chipset of the communications device. The following uses a communications device as an example for description. The antenna panel status indication method may specifically include the following steps.

S801: A terminal device sends first antenna panel status information, where the first antenna panel status information indicates a status of at least one antenna panel (panel). Correspondingly, a peer device receives the first antenna panel status information. The peer device may be a network device, or may be a terminal device in a D2D scenario. In this embodiment of this application, that the peer device is the network device is used as an example for description.

The first antenna panel status information may indicate the status of the at least one panel in a direct indication manner, or may indicate the status of the at least one panel in an indirect indication manner. For example, the first antenna panel status information indicates statuses of N panels, where N is an integer greater than 0. It should be understood that when the first antenna panel status information directly indicates a status of a panel, the first antenna panel status information may indicate only the status, but does not indicate the antenna panel. That is, a specific panel corresponding to the status is not specifically indicated. Alternatively, when the first antenna panel status information directly indicates a status of a panel, the first antenna panel status information may indicate both the antenna panel and the status of the antenna panel. The indirect indication of the status of the at least one panel by the first antenna panel status information may be general indication, rather than specific indication of a status of a specific panel. Alternatively, the indirect indication of the status of the at least one panel by the first antenna panel status information may be indication of statuses of some default panels.

The following describes an implementation in which the first antenna panel status information directly indicates the statuses of the N panels. In the manner in which the first antenna panel status information directly indicates the statuses of the N panels, the first antenna panel status information may be referred to as antenna panel status (panel status) information. For ease of description, in the implementation in which the first antenna panel status information directly indicates the statuses of the N panels, the first antenna panel status information is referred to as panel status information.

In an implementation, the panel status information may indicate the statuses of the N panels in a bitmap (bitmap) manner. That is, the panel status information may include N bits, the $i^{th}$ bit is used to indicate a status of the $i^{th}$ panel, and i={0, 1, 2, . . . , N}. In this manner, a status of a corresponding panel may be indicated by using a value of a bit. For example, when a value of the $i^{th}$ bit is 0, it may indicate that the $i^{th}$ panel is in an inactive state; when the value is 1, it may indicate that the $i^{th}$ panel is in an active state. Alternatively, when the value of the $i^{th}$ bit is 1, it may indicate that the $i^{th}$ panel is in the inactive state; when the value is 0, it may indicate that the $i^{th}$ panel is in the active state.

An example in which the terminal device reports statuses of four panels to the network device is used for description. The four panels are respectively panel #1, panel #2, panel #3, and panel #4. The terminal device may indicate the statuses of the four panels by using four bits, that is, the panel status information includes four bits. The four bits from the leftmost bit to the rightmost bit are respectively corresponding to panel #1, panel #2, panel #3, and panel #4. When the panel status information is 1100, the panel status information indicates that panel #1 and panel #2 are in the active state, and panel #3 and panel #4 are in the inactive state.

In another implementation, the panel status information may alternatively indicate the statuses of the N panels by using a status value. Specifically, the panel status information may indicate, by using a status value, switching of the N panels between the active state and the inactive state. For example, the panel status information may indicate, by using a status value, a panel in the N panels that changes from the active state to the inactive state. The panel status information uses different status values to indicate that different panels are deactivated. For another example, the panel status information may alternatively indicate, by using a status value, a panel in the N panels that changes from the inactive state to the active state. The panel status information uses different status values to indicate that different panels are activated. For another example, the panel status information may alternatively indicate, by using a status value, a panel in the N panels that changes from the active state to the inactive state and a panel in the N panels that changes from the inactive state to the active state. The panel status information uses different status values to indicate that different panels are deactivated or activated.

An example in which the panel status information indicates, by using a status value, a panel in four panels that changes from the inactive state to the active state is used for description. The four panels are respectively panel #1, panel #2, panel #3, and panel #4. The panel status information indicates, by using the status value, which panel is in the active state in the four panels. Table 1 describes an example of a specific manner in which the panel status information indicates statuses of the four panels by using a status value.

TABLE 1

| Panel status information | Panel in the active state |
| --- | --- |
| 0000 | None/Reserved (reserved) bits |
| 0001 | panel#1 |
| 0010 | panel#2 |
| 0011 | panel#3 |
| 0100 | panel#4 |
| 0101 | panel#1 and panel#2 |
| 0110 | panel#1 and panel#3 |
| 0111 | panel#1 and panel#4 |
| 1000 | panel#2 and panel#3 |
| 1001 | panel#2 and panel#4 |
| 1010 | panel#3 and panel#4 |
| 1011 | panel#1, panel#2, and panel#3 |
| 1100 | panel#1, panel#2, and panel#4 |
| 1101 | panel#1, panel#3, and panel#4 |
| 1110 | panel#2, panel#3, and panel#4 |
| 1111 | panel#1, panel#2, panel#3, and panel#4 |

In addition, the terminal device may indicate, to the network device, a maximum quantity of panels that are in an enabled state at the same time that is supported by the terminal device. When reporting the panel status information, the terminal device may limit a value of a status value of the panel status information, or may reduce a quantity of bits of the panel status information. For example, the terminal device supports a maximum of two panels being in the enabled state at the same time. In this case, when reporting the panel status information, the terminal device may limit a value of the panel status information to 0000 to 1010, or reduce the quantity of bits of the panel status information to 3 bits.

The following describes an implementation in which the first antenna panel status information indirectly indicates the status of the at least one panel. In a manner in which the first antenna panel status information indirectly indicates the status of the at least one panel, the first antenna panel status information may be used to request measurement of the panel. In this manner, the first antenna panel status information may also be referred to as antenna panel request (panel request) information. In other words, the antenna panel request message may indicate an antenna panel that is in the inactive state before activation. For ease of description, in the implementation in which the first antenna panel status information indirectly indicates the status of the at least one panel, the first antenna panel status information is referred to as panel request information.

In an example, the panel request information may be used only to request an RS resource from the network device to measure the panel, and does not indicate which panel is activated and which panel is deactivated. After the terminal device sends the panel request information, the network device may configure an uplink RS resource or a downlink RS resource. For example, the uplink RS resource may be a sounding RS (sounding reference signal, SRS), and especially an SRS resource set used for beam management. The downlink RS resource may be a CSI-RS, or may be a synchronization signal/physical broadcast channel block (SS/PBCH block, SSB), and especially an RS resource set used for beam management. A repetition (repetition) parameter may be configured for the RS resource set. The parameter may be "on" or "off".

In this implementation, the panel request information may be used by default to indicate that the terminal device activates a panel that is not activated before the panel request information is sent, or may be used by default to indicate that the terminal device activates all panels.

In this embodiment of this application, the panel request information may have the same format as a scheduling request (scheduling request, SR), or may be a dedicated SR.

S802: The network device sends response information of the first antenna panel status information to the terminal device. Correspondingly, the terminal device receives the response information.

In specific implementation, the network device may send the response information after a first preset time period after receiving the first antenna panel status information. The terminal device may start to detect the response information after a second preset time period after sending the first antenna panel status information.

In an implementation, a time length of the first preset time period (referred to as a first time length below) and a time length of the second preset time period (referred to as a second time length below) may be related to an interval between a time domain resource of a reference signal and a time domain resource for reporting the antenna panel status information. The time domain resource of the reference signal may be a time for transmitting (that is, sending or receiving) the reference signal, and the time domain resource for reporting the status information may be a time for transmitting (that is, sending or receiving) the first antenna panel status information. Specifically, the first time length may be related to a time interval between a time for sending the reference signal and a time for receiving the first antenna panel status information, and the second time length may be related to a time interval between a time for receiving the reference signal and a time for sending the first antenna panel status information.

In some embodiments, if the interval between the time domain resource of the reference signal and the time domain resource for reporting the status information is less than or equal to a threshold, the first time length may be T1, and the second time length may be P1. That is, the network device may send the response information after waiting for a period of T1 after receiving the first antenna panel status information. The terminal device may start to detect the response information after waiting for a period of P1 after sending the first antenna panel status information.

In some other embodiments, if the interval between the time domain resource of the reference signal and the time domain resource for reporting the status information is greater than a threshold, the first time length may be T2 (T2 is greater than T1), and the second time length may be P2 (P2 is greater than P1). That is, the network device may send the response information after waiting for a period of T2 after receiving the first antenna panel status information, and the terminal device may start to detect the response information after waiting for a period of P2 after sending the first antenna panel status information.

For example, if the interval between the time domain resource of the reference signal and the time domain resource for reporting the status information is less than or equal to the threshold, T1 and P1 may be equal to 0. In this case, the network device may send the response information after receiving the first antenna panel status information, and the terminal device may start to detect the response information after sending the first antenna panel status information.

If the interval between the time domain resource of the reference signal and the time domain resource for reporting the status information is greater than the threshold, T2 and P2 may be greater than 0. That is, the network device may send the response information after waiting for a period of T2 after receiving the first antenna panel status information, and the terminal device may start to detect the response information after waiting for a period of P2 after sending the first antenna panel status information.

Further, the first time length and the second time length may be related to a state change (or may be understood as switching) delay of a panel, and the state change delay of the panel refers to a time required for an activation process of the panel or a time required for a deactivation process of the panel. For example, the first time length or the second time length may be greater than or equal to k μs, and k may be a value reported by the terminal device based on a capability of the terminal device.

In another implementation, the time length of the first preset time period and the time length of the second preset time period may be related to a state change delay of a panel. For example, after receiving the first antenna panel status information, the network device may wait for $g_1$ μs to send the response information; and after reporting the first antenna panel status information, the terminal device may wait for $g_2$ μs to start to detect the response information.

Herein, $g_1$ and $g_2$ may be greater than or equal to the value k reported by the terminal device based on the capability of the terminal device.

In this embodiment of this application, the time length (that is, the first time length) of the first preset time period may be the same as or different from the time length (that is, the second time length) of the second preset time period. This is not specifically limited herein.

In an example, in the implementation in which the first antenna panel status information directly indicates the statuses of the N panels, the response information sent by the network device may be indication information indicating that the panel status information is successfully transmitted. Alternatively, the response information sent by the network device may be indication information indicating the terminal device to use a new activated panel in the panel status information to transmit a signal/channel (for example, to send an uplink signal or receive a downlink signal). The new activated panel is a panel that is originally in the inactive state and changes from the inactive state to the active state under the indication of the panel status information. For example, the response information may carry an index, an identifier, or the like of the new activated panel. Alternatively, the response information sent by the network device may be indication information indicating the terminal device to send an uplink signal/channel by using power information corresponding to the new activated panel in the panel status information. For example, the response information may carry the power information corresponding to the new activated panel.

In another example, in the implementation in which the first antenna panel status information indirectly indicates the status of the at least one panel, the response information sent by the network device may be indication information indicating that the panel request information is successfully transmitted. Alternatively, the response information sent by the network device may be control information indicating an RS. For example, the response information may be DCI configured with a reference signal used for beam management (for example, a CSI-RS resource set configured with a repetition parameter being "on" or "off").

S803: The terminal device determines, based on the response information, that the status indicated by the first antenna panel status information takes effect.

S804: After sending the response information, the network device determines that the status indicated by the first antenna panel status information takes effect.

In some embodiments, in the implementation in which the first antenna panel status information directly indicates the statuses of the N panels, that the terminal device and the network device determine that the status indicated by the first antenna panel status information takes effect may be specifically: A panel is already in the active state indicated by the panel status information, and the network device may schedule the activated panel to transmit a signal/channel with a low delay (or even without a delay); a panel is already in the inactive state indicated by the panel status information, and the network device cannot schedule the deactivated panel to transmit a signal/channel with a low delay (or even without a delay).

It should be understood that in this embodiment of this application, that a status of a panel takes effect may be understood as that the panel is already in the status indicated by the panel status information. For example, the panel status information indicates that panel #1 is in the active state, and that the panel status information takes effect means that the terminal device has completed a process of switching panel #1 from the inactive state to the active state. When the panel status information takes effect, panel #1 is in the active state, and the network device may schedule panel #1 to transmit a signal/channel with a low delay (or even without a delay). For another example, the panel status information indicates that panel #2 is in the inactive state, and that the panel status information takes effect means that the terminal device has completed a process of switching panel #2 from the active state to the inactive state. When the panel status information takes effect, panel #2 is in the inactive state, and the network device cannot schedule panel #2 to transmit an uplink signal with a low delay (or even without a delay).

In other embodiments, in the implementation in which the first antenna panel status information indirectly indicates the status of the at least one panel, that the terminal device and the network device determine that the status indicated by the first antenna panel status information takes effect may be specifically: The terminal device may perform downlink measurement on the antenna panel, that is, the terminal device is ready to receive a reference signal, and the network device may send a reference signal to the terminal device.

In the implementation in which the first antenna panel status information indirectly indicates the status of the at least one panel, the panel request information may be used by default to indicate that the terminal device activates a panel that is not activated before the panel request information is sent, or may be used by default to indicate that the terminal device activates all panels. Determining, based on the response information, that the status of the at least one panel takes effect may be determining, based on the response information, that the at least one panel changes from the inactive state to the active state. A specific panel in the inactive state to be activated is determined by the terminal device, that is, the terminal device may activate all the panels, or may choose to activate a part of the panels. This may depend on implementation of the terminal device.

In a possible implementation, the network device may not send the response information, and the terminal device may not receive the response information. That is, step S802 may not be performed. After the terminal device reports the active or inactive state of the current panel, the active or inactive state of the panel may take effect. Correspondingly, the active or inactive state of the panel may take effect after the network device receives the active or inactive state of the panel, so that the network device can schedule the active panel to transmit a signal/channel (for example, the terminal device sends an uplink signal or receives a downlink signal by using the active panel), and no longer schedules the inactive panel to transmit a signal/channel.

In Embodiment 1 of this application, after receiving the panel status information, the network device sends the response information to the terminal device and then determines that the status information takes effect. After receiving the response information of the panel status information, the terminal device determines that the status indicated by the status information takes effect. In this manner, the terminal device and the network device can be aligned in the status of the panel, so that the following problem can be avoided: A signal/channel cannot be transmitted or performance of signal/channel transmission is poor because the network device cannot receive the first antenna panel status information, the terminal device and the network device are not aligned in the status of the panel, and the network device still schedules signal/channel transmission based on previous antenna panel status information.

In addition, in the implementation in which the first antenna panel status information directly indicates the statuses of the N panels, before sending the panel status information, the terminal device may first measure the antenna panel to obtain the panel status information. Specifically, the network device may send K reference signals, where K is an integer greater than or equal to 1. The terminal device may receive the K RSs by using M panels, where M is an integer greater than or equal to 1. Then, the terminal device may obtain a measurement result based on the K RSs, and determine the panel status information based on the measurement result. In an implementation, the M antenna panels may include the N antenna panels indicated by the panel status information. Alternatively, M may be equal to N, and the M antenna panels are the N antenna panels indicated by the panel status information. In another implementation, the M antenna panels may include an antenna panel in the active state in the N antenna panels indicated by the panel status information. Alternatively, the M antenna panels are antenna panels in the active state in the N antenna panels indicated by the panel status information.

In specific implementation, before receiving the K RSs by using the M panels, the terminal device may first activate the M panels.

After determining the panel status information based on the measurement result, the terminal device may restore the M panels to states before the K RSs are received. The states of the M panels before the K RSs are received may be states indicated last time by the network device, or may be states reported last time by the terminal device, or may be states before activation. Therefore, restoring the M panels to states before the K RSs are received may be referred to as restoring the M antenna panels to the states indicated last time by the network device, or may be referred to as restoring the M antenna panels to the states reported last time by the terminal device, or may be referred to as restoring the M antenna panels to the states before activation.

Alternatively, after determining the panel status information based on the measurement result, the terminal device may keep, in the active state, a panel that is in the M panels and whose panel status is indicated as the active state. In other words, after determining the panel status information based on the measurement result, the terminal device may not disable the panel whose panel status is indicated as the active state, to enable the panel to be in the active state. For a panel whose panel status is indicated as the inactive state, the terminal device may keep the panel in the active state (that is, not disabled), or may deactivate (disable) the panel. This is not specifically limited herein.

In a possible implementation, when a time interval between a moment of receiving the RSs and a moment of sending the panel status information is greater than a threshold, the terminal device may restore the M panels to the states before the K RSs are received. When the time interval is less than or equal to the threshold, the terminal device keeps, in the active state, a panel in the M panels that is indicated to be in the active state by the panel status information.

In a possible implementation, after the terminal device directly indicates the statuses of the N panels by using the first antenna panel status information, the terminal device may send a plurality of reference signals to the network device by using all or a part of the N panels. The network device may receive all or a part of the reference signals, obtain new panel status information based on the received reference signals, and send the new panel status information to the terminal device. An antenna panel in the first state indicated by the new panel status information is a subset of the antenna panel in the first state indicated by the first antenna panel status information.

In the implementation in which the first antenna panel status information indirectly indicates the status of the at least one panel, after sending the panel request information, the terminal device may further measure the antenna panel. Specifically, the network device may send L reference signals, where L is an integer greater than or equal to 1. The terminal device receives the L RSs by using H panels, where H is an integer greater than or equal to 1. Then, the terminal device may obtain a measurement result based on the L RSs; determine status information of a panel (which may also be referred to as panel status information) based on the measurement result, where the panel status information includes status information of at least one panel; and report the panel status information to the network device. Specifically, for the panel status information, refer to related descriptions of the first antenna panel status information when the first antenna panel status information in step S801 directly indicates the status of the at least one panel. Details are not described herein again.

Further, after reporting the panel status information, the terminal device may immediately determine that the panel status information takes effect. Alternatively, the terminal device may determine that the panel status information takes effect after waiting for a time period. Certainly, the terminal device may determine that the panel status information takes effect after receiving response information that is for the panel status information and sent by the network device.

In a possible implementation, after the terminal device indirectly indicates the status of the at least one panel by using the first antenna panel status information, the network device indicates the terminal device to send an uplink reference signal. The terminal device may send a plurality of reference signals to the network device by using all or a part of the antenna panels. The network device may receive all or a part of the reference signals, obtain new panel status information based on the received reference signals, and send the new panel status information to the terminal device. The panel status information includes status information of at least one antenna panel.

To better understand the antenna panel status indication method provided in this embodiment of this application, the following describes an example of a process in which the terminal device reports an antenna panel status with reference to an indication manner of the first antenna panel status information.

It is assumed that before a moment t1, panel #1 (shown in the figure as antenna panel #1; other panels are similar) and panel #2 are in the active state, and panel #3 and panel #4 are in the inactive state. The states of panel #1 to 4 before the moment t1 may be states reported by the terminal device last time, or may be states indicated by the network device last time. That antenna panel #X is enabled may be understood as that panel #X is in the active state (or the enabled state or the powered on state), and that antenna panel #Y is disabled may be understood as that panel #Y is in the inactive state (or the disabled state or the powered off state).

Example 1: The first antenna panel status information may directly indicate statuses of N panels. As shown in FIG. 9, FIG. 10A and FIG. 10B, or FIG. 11A and FIG. 11B, a process in which the terminal device indicates the statuses of the antenna panels to the network device is as follows:

A1. The terminal device starts to receive, at a moment t2 by using panel #1 to 4, RSs used for beam training, for example, beam measurement (beam measurement, BM) RSs.

In specific implementation, before the moment t2, the UE may activate other panels (for example, panel #3 and panel #4), so that the terminal device selects a preferred panel in a BM process as far as possible. Herein, t2 may be the same as the moment t1, or t2 may be different from the moment t1.

A2. The terminal device determines panel status information of panel #1 to 4. Specifically, the terminal device determines, based on the received BM RSs, which panel in panel #1 to 4 has better performance, so as to determine which panel is to be enabled (or which panel is to be in the active state) and which panel is to be disabled (or which panel is to be in the inactive state), that is, determines the panel status information of panel #1 to 4. It is assumed that the terminal device determines to enable panel #1 and panel #3, and disables panel #2 and panel #4, that is, the panel status information indicates that panel #1 and panel #3 are in the active state, and panel #2 and panel #4 are in the inactive state.

Figure 9:
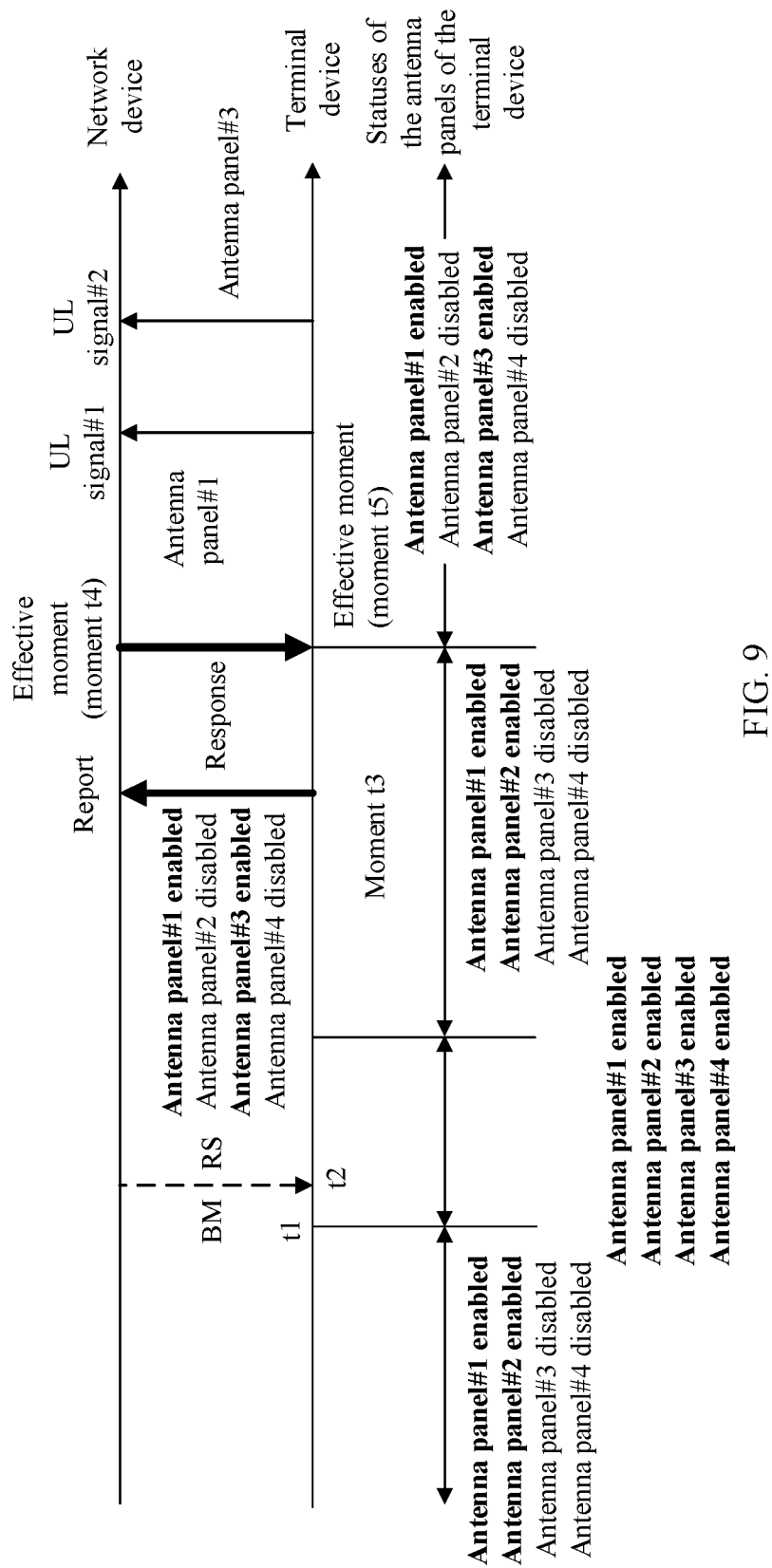
FIG. 9 is a schematic diagram of uplink transmission scheduling according to an embodiment of this application.
Figure 10A:
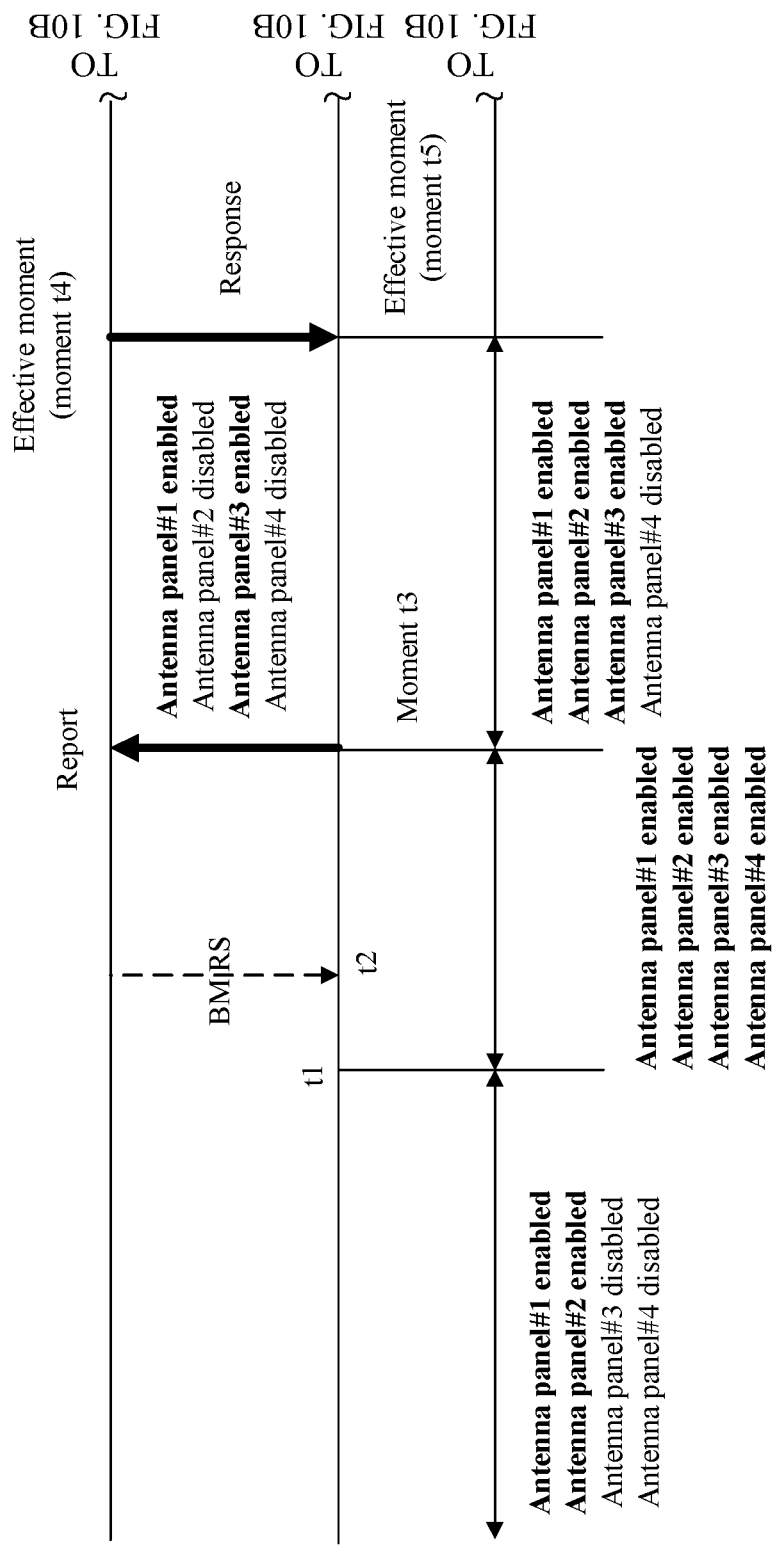
FIG. 10A and FIG. 10B are a schematic diagram of another uplink transmission scheduling according to an embodiment of this application.
Figure 10B:
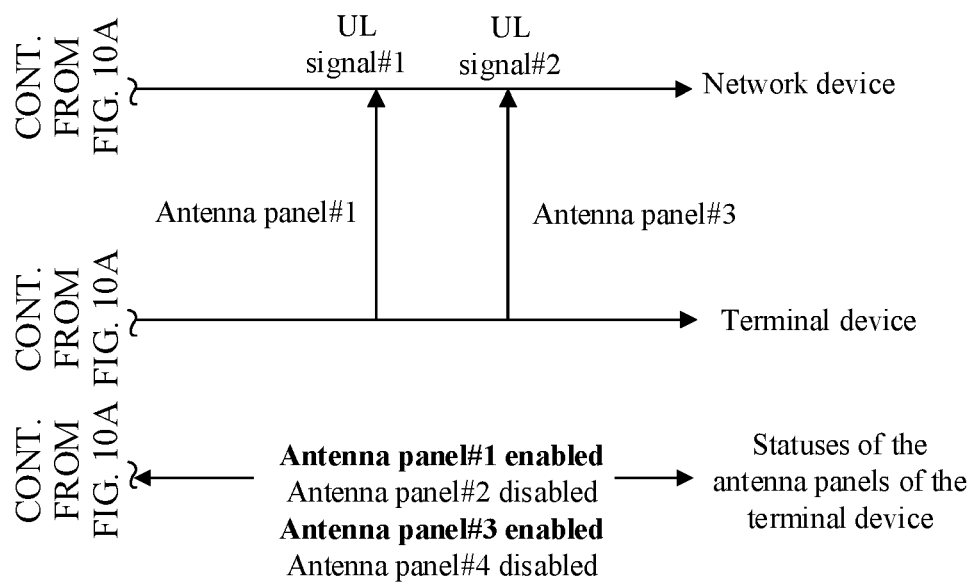
Figure 11A:
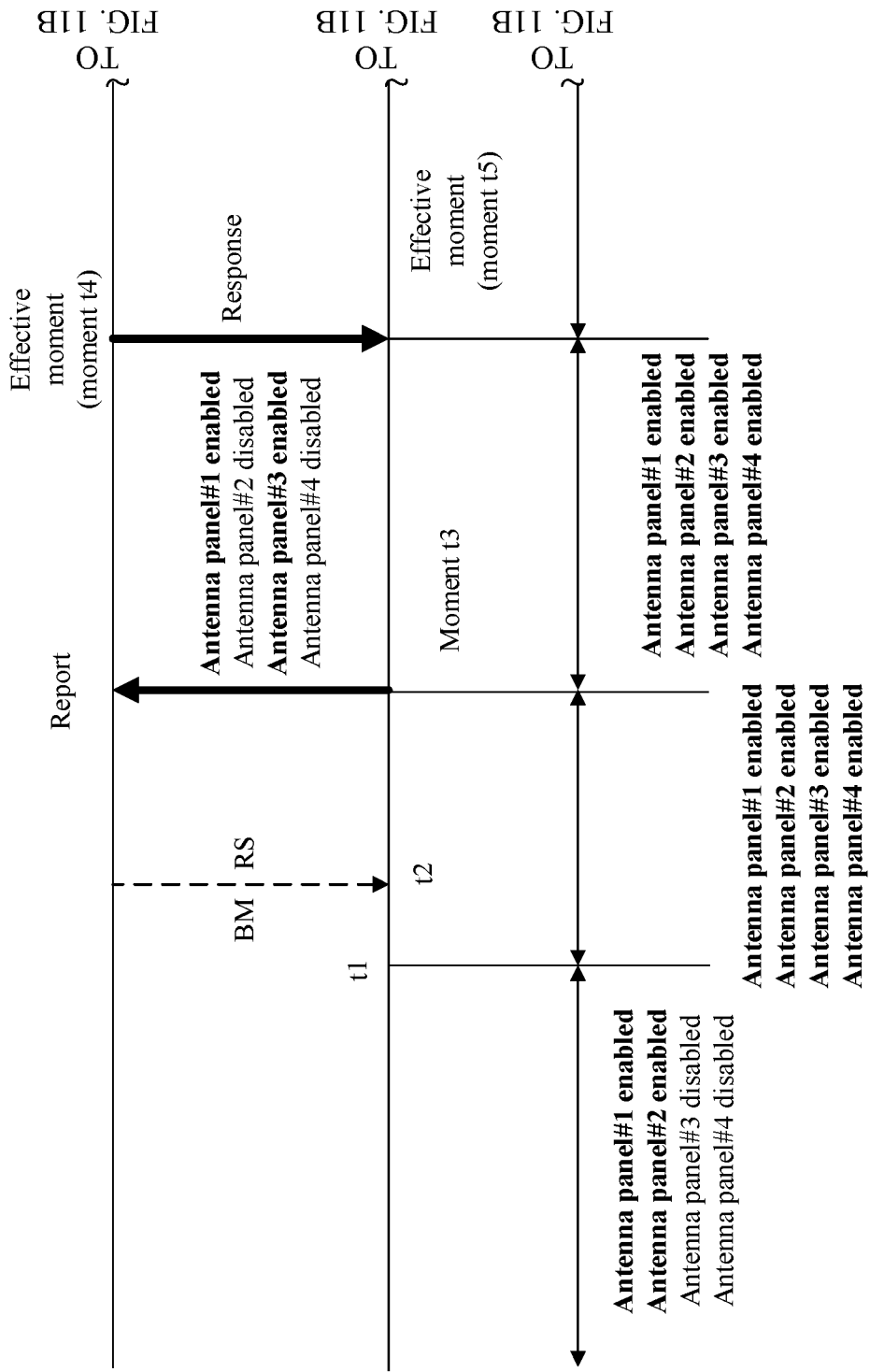
FIG. 11A and FIG. 11B are a schematic diagram of still another uplink transmission scheduling according to an embodiment of this application.
Figure 11B:
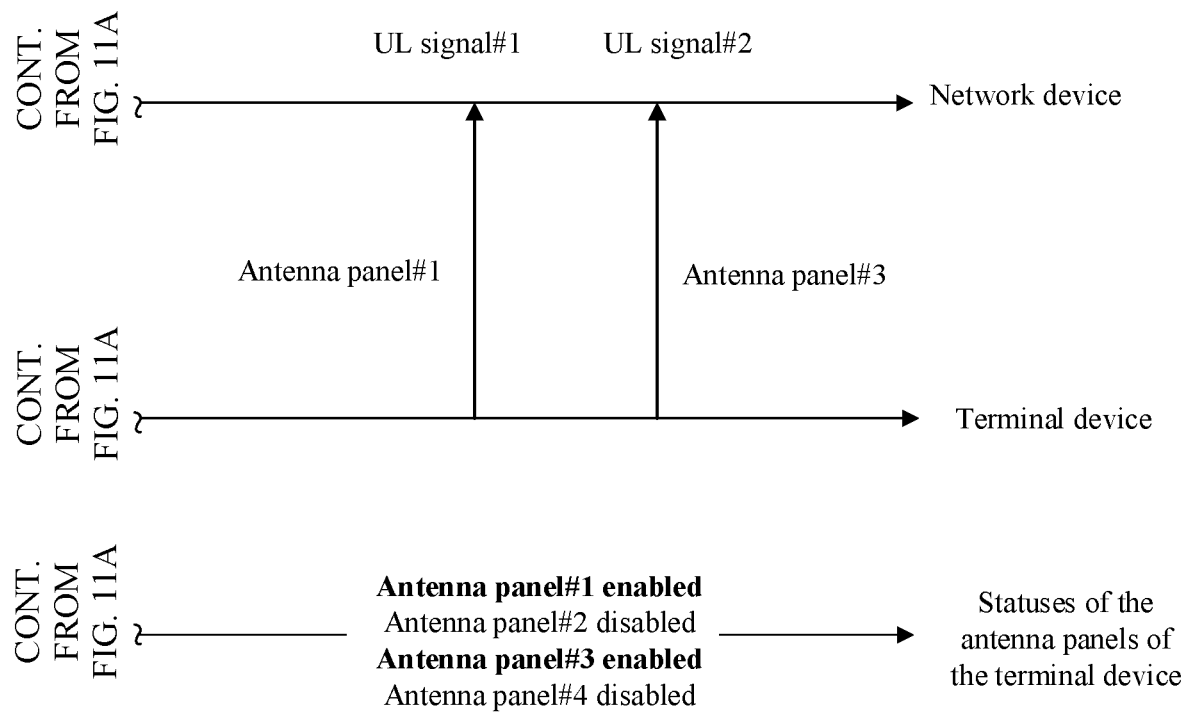

A3. If a spacing between a time domain resource of the BM RSs and a time domain resource for reporting the panel status information is relatively large, that is, a time interval between the moment of receiving the BM RSs and a moment of reporting the panel status information is greater than a threshold, after determining the panel status information, the terminal device may restore panel #1 to 4 to the states of panel #1 to 4 before the moment t1, that is, deactivate (or disable) panel #3 and panel #4, so that panel #1 and panel #2 are in the active state, and panel #3 and panel #4 are restored to the inactive state, as shown in FIG. 9. If the spacing between the time domain resource of the BM RSs and the time domain resource for reporting the panel status information is relatively small, that is, the time interval between the moment of receiving the BM RSs and the moment of reporting the panel status information is less than or equal to the threshold, after determining the panel status information, the terminal device may deactivate (or disable) only panel #4, as shown in FIG. 10A and FIG. 10B; or keep the current states of the panels (that is, panel #1 to 4 keep in the active state), as shown in FIG. 11A and FIG. 11B.

A4. The terminal device reports the panel status information to the network device at a moment t3, that is, indicates, to the network device, that panel #1 and panel #3 are in the active state, and panel #2 and panel #4 are in the inactive state.

A5. If the spacing between the time domain resource of the BM RSs and the time domain resource for reporting the panel status information is greater than a threshold, the network device sends response information after k1 μs after receiving the panel status information, and the terminal device starts to detect the response information after k2 μs after reporting the panel status information. Herein, k1 and k2 may be greater than or equal to the value reported by the terminal device based on the capability of the terminal device. If the spacing between the time domain resource of the BM RSs and the time domain resource for reporting the panel status information is less than or equal to the threshold, the network device sends the response information after receiving the panel status information, and the terminal device starts to detect the response information after reporting the panel status information. Alternatively, regardless of a value of the spacing between the time domain resource of the BM RSs and the time domain resource for reporting the panel status information, the network device may send the response information after k' μs after receiving the panel status information, and the terminal device may wait for k' μs to start to detect the response information after reporting the panel status information. Herein, k' is greater than k (that is, the value reported by the terminal device based on the capability of the terminal device).

In addition, optionally, if the terminal device restores panel #1 to 4 to the states of panel #1 to 4 before the moment t1 in step A3, after reporting the panel status information, the terminal device may deactivate a panel (that is, panel #2) indicated to be in the inactive state in the panel status information and activate a panel (that is, panel #3) indicated to be in the active state in the panel status information, as shown in FIG. 9. If the terminal device disables only panel #4 in step A3, after reporting the panel status information, the terminal device may deactivate a panel (that is, panel #2) that is indicated to be in the inactive state in the panel status information, as shown in FIG. 10A and FIG. 10B. If the terminal device does not disable panel #1 to 4 in step A3, after reporting the panel status information, the terminal device may deactivate panels (that is, panel #2 and panel #4) that are indicated to be in the inactive state in the panel status information, as shown in FIG. 11A and FIG. 11B.

A6. The network device sends the response information at a moment t4 and determines that the panel status information takes effect. The terminal device receives the response information from the network device at a moment t5, and determines that the panel status information takes effect. In a case in which there is no delay, t4 may be equal to t5. To be specific, both the network device and the terminal device determine that panel #1 and panel #3 are in the active state, and panel #2 and panel #4 are in the inactive state. After the panel status information takes effect, the network device can schedule panel #1 and panel #3 with a low delay (or even without a delay) to transmit a signal/channel, but cannot schedule panel #2 and panel #4 with a low delay (or even without a delay) to transmit a signal/channel.

For example, the terminal device may receive, at the moment t4, indication information used to indicate that the panel status information is successfully transmitted. For another example, the terminal device may receive, at the moment t4, indication information indicating that the network device schedules panel #3 to transmit a signal/channel. For another example, the terminal device may receive, from the network device at the moment t4, indication information indicating the terminal device to send an uplink signal/channel by using power information corresponding to panel #3.

A7. The network device schedules panel #1 to transmit a signal, and schedules panel #3 to transmit a signal.

In FIG. 9 to FIG. 11A and FIG. 11B, an example in which the network device schedules panel #1 to transmit uplink (uplink, UL) signal #1 and schedules panel #3 to transmit UL signal #2 is used.

Example 2: The first antenna panel status information may be used to request measurement on the antenna panel.

Figure 12A:
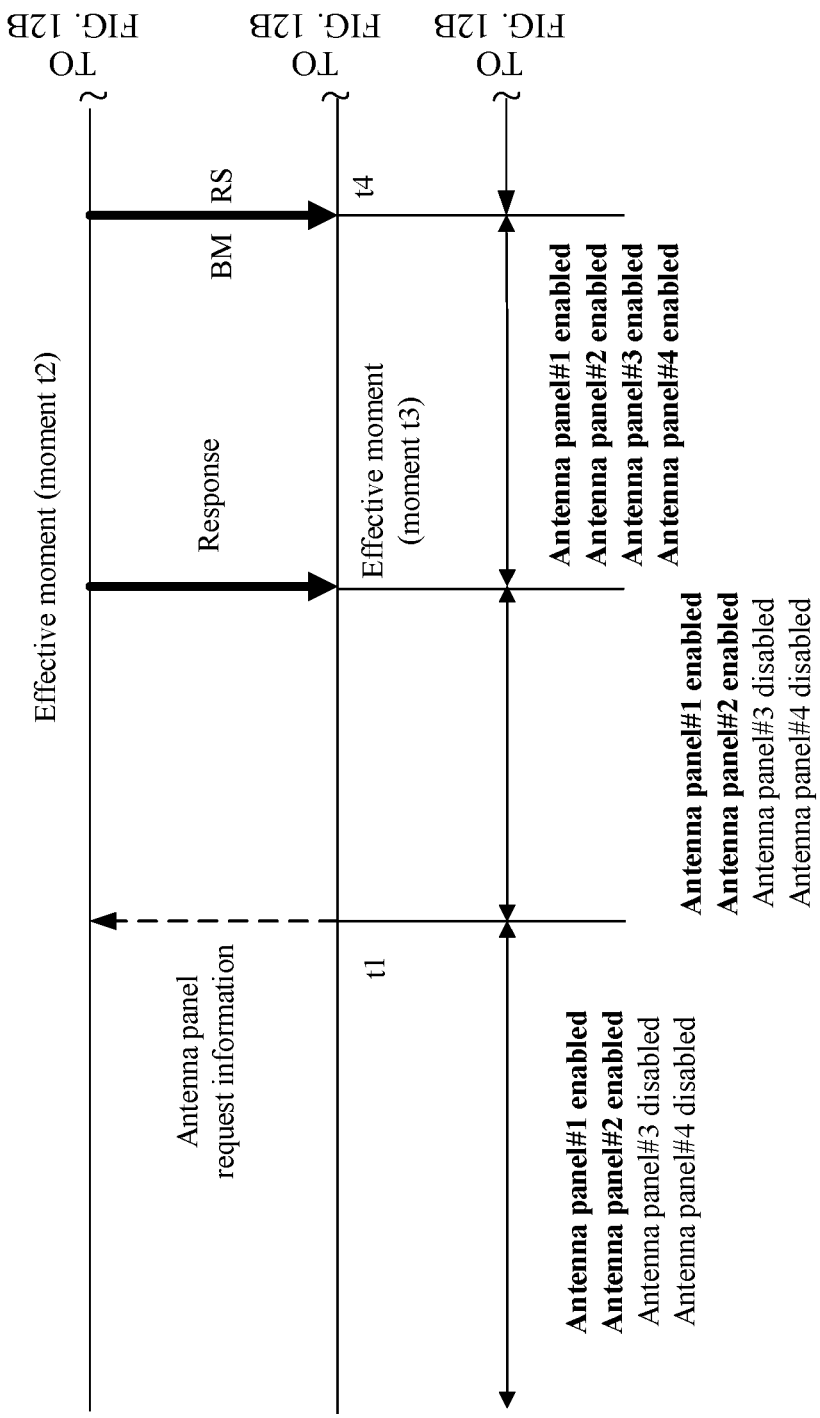
FIG. 12A and FIG. 12B are a schematic diagram of uplink transmission scheduling according to an embodiment of this application.
Figure 12B:
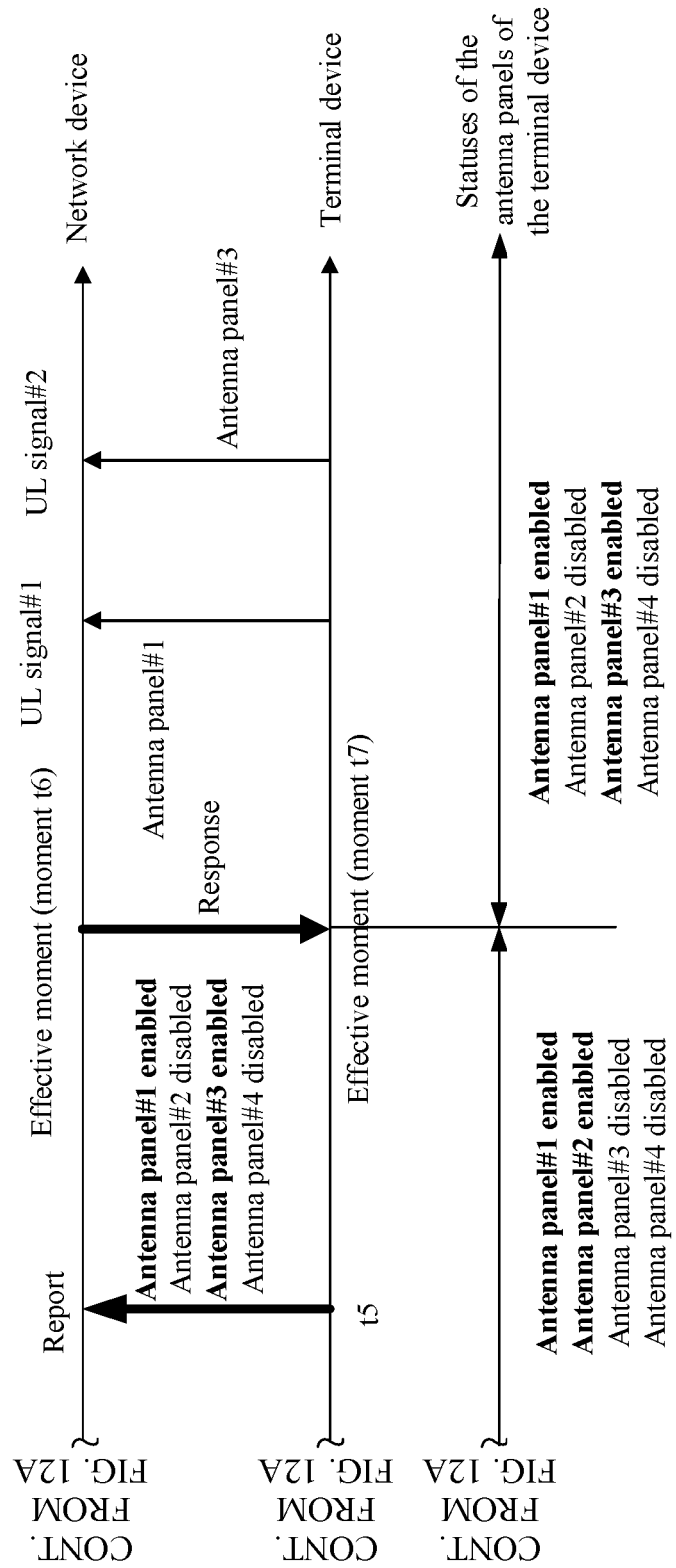

As shown in FIG. 12A and FIG. 12B, a process in which the terminal device indicates the status of the antenna panel to the network device is as follows:

B1. The terminal device sends panel request information to the network device at a moment t1. The panel request information is used to request to measure the antenna panel.

B2. If a spacing between a time domain resource of BM RSs and a time domain resource for reporting the panel status information is greater than a threshold, the network device sends response information after k1 μs after receiving the panel request information, and the terminal device starts to detect the response information after k2 μs after sending the panel request information. Herein, k1 and k2 may be greater than or equal to the value reported by the terminal device based on the capability of the terminal device. If the spacing between the time domain resource of the BM RSs and the time domain resource for reporting the panel status information is less than or equal to the threshold, the network device sends the response information after receiving the panel request information, and the terminal device starts to detect the response information after sending the panel request information. Alternatively, regardless of a value of the spacing between the time domain resource of the BM RSs and the time domain resource for reporting the panel status information, the network device may send the response information after k' μs after receiving the panel status information, and the terminal device may wait for k' μs to start to detect the response information after sending the panel request information. Herein, k' is greater than k (that is, the value reported by the terminal device based on the capability of the terminal device).

In addition, the terminal device may further activate (or enable) panel #1 to 4 (shown in the figure as antenna panel #1 to 4, where "disable" represents deactivation of a panel, and "enable" represents activation of a panel). Because panel #1 and panel #2 are already activated, the terminal device activates panel #3 and panel #4.

B3. The network device sends the response information at a moment t2, and determines that the panel request information takes effect. The terminal device receives the response information from the network device at a moment t3, and determines that the panel request information takes effect.

In a possible implementation, that the network device determines that the panel request information takes effect may be understood as that the network device may start to send a reference signal to the terminal device. That the terminal device determines that the panel request information takes effect may be understood as that the terminal device may receive the reference signal by using an activated panel (or a newly activated panel, or all panels).

For example, the terminal device may receive, at the moment t2, indication information used to indicate that the panel request information is successfully transmitted. For another example, the terminal device may alternatively receive, from the network device at the moment t2, control information indicating BM RSs.

B4. The terminal device receives BM RSs through panel #1 to 4 at a moment t4.

B5. The terminal device determines panel status information of panel #1 to 4. For a specific process, refer to related descriptions of step A2. Details are not described herein again.

After determining the panel status information of panel #1 to 4, the terminal device may adjust statuses of panel #1 to 4. For a specific process, refer to step A3. Details are not described herein again.

B6. The terminal device reports the panel status information to the network device at a moment t5, that is, indicates, to the network device, that panel #1 and panel #3 are in the active state, and panel #2 and panel #4 are in the inactive state.

B7. After reporting the panel status information of panel #1 to 4, the terminal device may detect response information. For a specific process, refer to step A5. Details are not described herein again.

B8. The network device sends response information at a moment t6, and the terminal device receives the response information from the network device at a moment t7, and determines that the panel status information takes effect. For details, refer to step A6. Details are not described herein again.

In a possible implementation, the terminal device may not perform steps B7 and B8. The terminal device may alternatively determine, after a period of time after reporting the panel status information, that the panel status information takes effect. Alternatively, the terminal device may determine, after reporting the panel status information, that the panel status information takes effect. This is not specifically limited in this embodiment of this application.

B9. The network device schedules panel #1 to transmit a signal, and schedules panel #3 to transmit a signal.

In FIG. 12A and FIG. 12B, an example in which the network device schedules panel #1 to transmit UL signal #1 and schedules panel #3 to transmit UL signal #2 is used.

Embodiment 2

Figure 13:
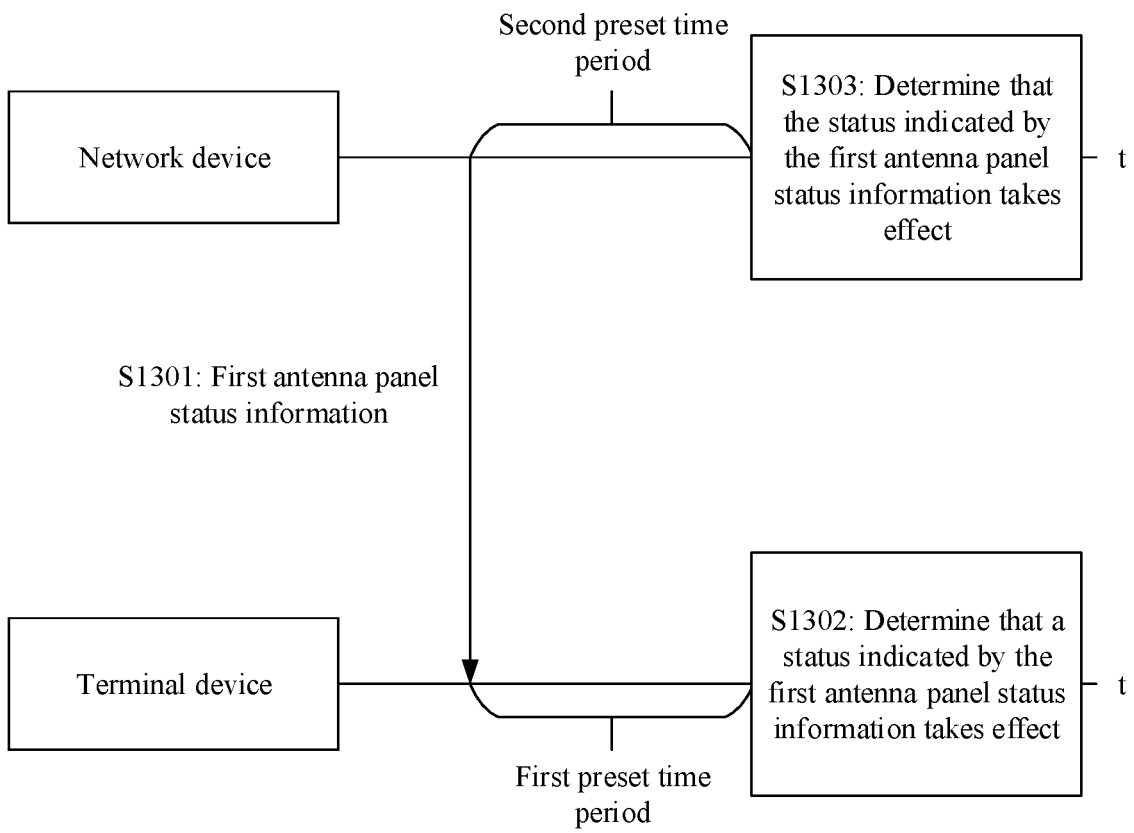
FIG. 13 is a schematic diagram of another antenna panel status indication method according to an embodiment of this application.

FIG. 13 shows another antenna panel status indication method according to an embodiment of this application. The method may be applied to the communications system shown in FIG. 1, FIG. 2, or FIG. 3. Specifically, the method may be applied to a communications device, or may be applied to a chip or a chipset of a communications device. The following uses a communications device as an example for description. The antenna panel status indication method may specifically include the following steps.

S1301: A network device sends first antenna panel status information of an antenna panel to a terminal device, where the first antenna panel status information indicates a status of at least one antenna panel. Correspondingly, the terminal device receives the first antenna panel status information.

Optionally, a quantity of antenna panels indicated by the first antenna panel status information may be less than or equal to a quantity of antenna panels that the terminal device has.

In addition, the antenna panel in this application may be an antenna panel used for sending, an antenna panel used for receiving, or an antenna panel used for sending and receiving.

It should be noted that when the antenna panel status indication method provided in this embodiment of this application may be further applied to a D2D scenario, an action performed by the network device in this embodiment of this application may be performed by the terminal device.

The first antenna panel status information may indicate the status of the at least one panel in a direct indication manner, or may indicate the status of the at least one panel in an indirect indication manner. For example, the first antenna panel status information indicates statuses of N panels, where N is an integer greater than 0. It should be understood that when the first antenna panel status information directly indicates a status of a panel, the first antenna panel status information may indicate only a status, but does not indicate the antenna panel. That is, a specific panel corresponding to the status is not specifically indicated. Alternatively, when the first antenna panel status information directly indicates a status of a panel, the first antenna panel status information may indicate the antenna panel and the status of the antenna panel. The indirect indication of the status of the at least one panel by the first antenna panel status information may be general indication, rather than specific indication of a status of a specific panel. Alternatively, the indirect indication of the status of the at least one panel by the first antenna panel status information may be indication of statuses of some default panels.

For ease of description, in the implementation in which the first antenna panel status information directly indicates the status of the at least one panel, the first antenna panel status information is referred to as panel status information. In the implementation in which the first antenna panel status information indirectly indicates the status of the at least one panel, the first antenna panel status information is referred to as panel request information.

In this embodiment of this application, a manner in which the panel status information indicates the statuses of the N panels may be similar to the manner in which the panel status information indicates the statuses of the N panels in Embodiment 1, and a manner in which the panel request information indicates the status of the at least one panel is similar to the manner in which the panel request information indicates the status of the at least one panel in Embodiment 1. Repeated content is not described again.

For example, the first antenna panel status information may be specifically DCI signaling, or may be MAC-CE signaling, or certainly, may be other signaling. This is not specifically limited herein.

In a specific implementation, if the first antenna panel status information indirectly indicates the status of the at least one panel, the first antenna panel status information may be DCI signaling; or if the first antenna panel status information directly indicates the status of the at least one panel, the first antenna panel status information may be MAC-CE signaling.

S1302: The terminal device determines, after a first preset time period, that the status indicated by the first antenna panel status information takes effect.

S1303: The network device determines, after a second preset time period, that the status indicated by the first antenna panel status information takes effect.

A time length of the first preset time period may be referred to as a first time length, and a time length of the second preset time period may be referred to as a second time length. A start moment of the first preset time period and the second preset time period may be a moment at which the first antenna panel status information is transmitted (sent or received). Specifically, a start moment of the first preset time period is a moment at which the first antenna panel status information is received, and a start moment of the second preset time period is a moment at which the first antenna panel status information is sent. Alternatively, the start moment of the first preset time period and the second preset time period may be a moment at which feedback information is transmitted. For example, the feedback information is a HARQ-ACK feedback of the first antenna panel status information. Specifically, the start moment of the first preset time period is a moment of sending the HARQ-ACK feedback, and the start moment of the second preset time period is a moment of receiving the HARQ-ACK feedback.

In specific implementation, after receiving the first antenna panel status information, the terminal device may send the HARQ-ACK feedback of the first antenna panel status information to the network device. Correspondingly, the network device receives the HARQ-ACK feedback of the first antenna panel status information.

Figure 14:
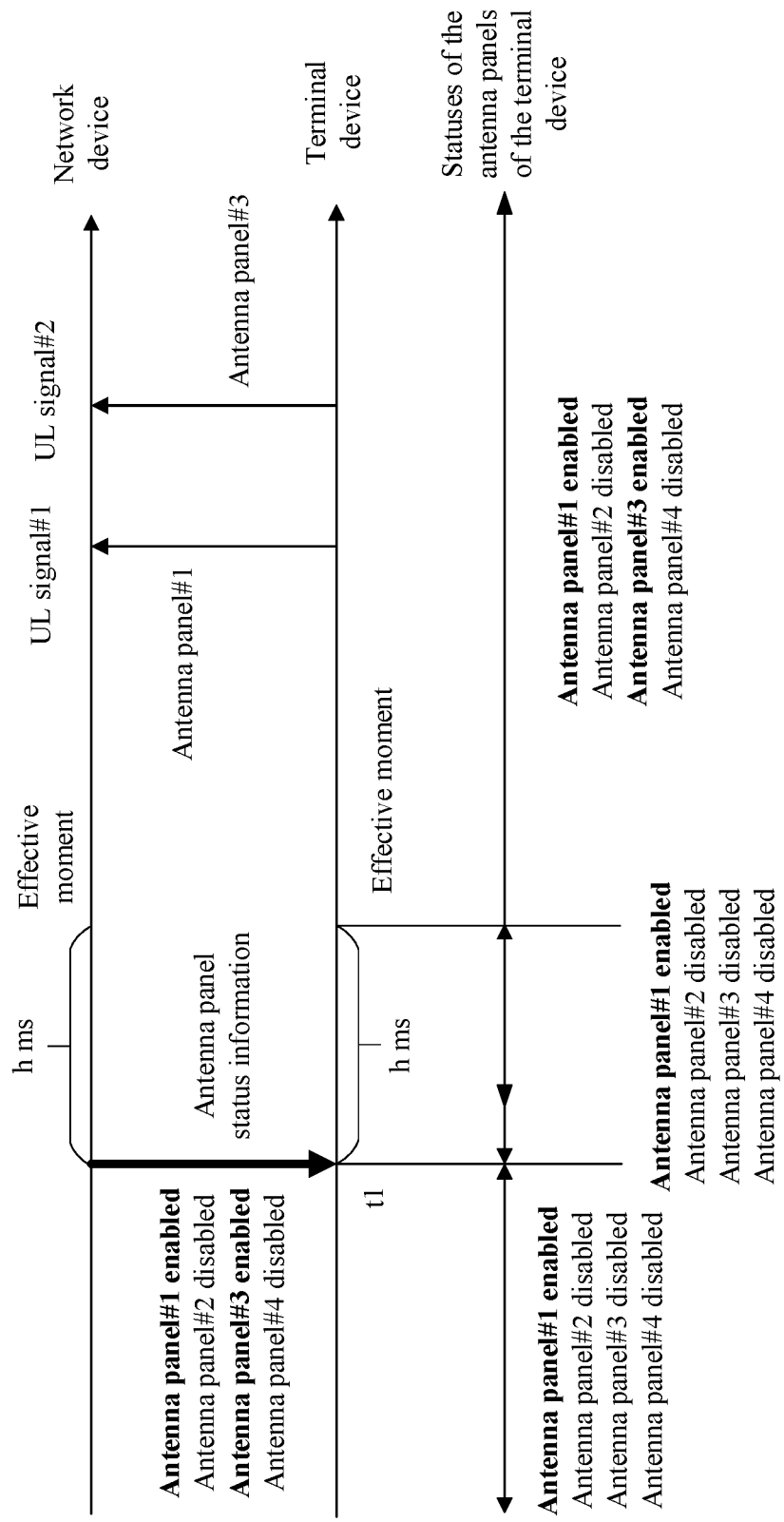
FIG. 14 is a schematic diagram of uplink transmission scheduling according to an embodiment of this application.
Figure 15:
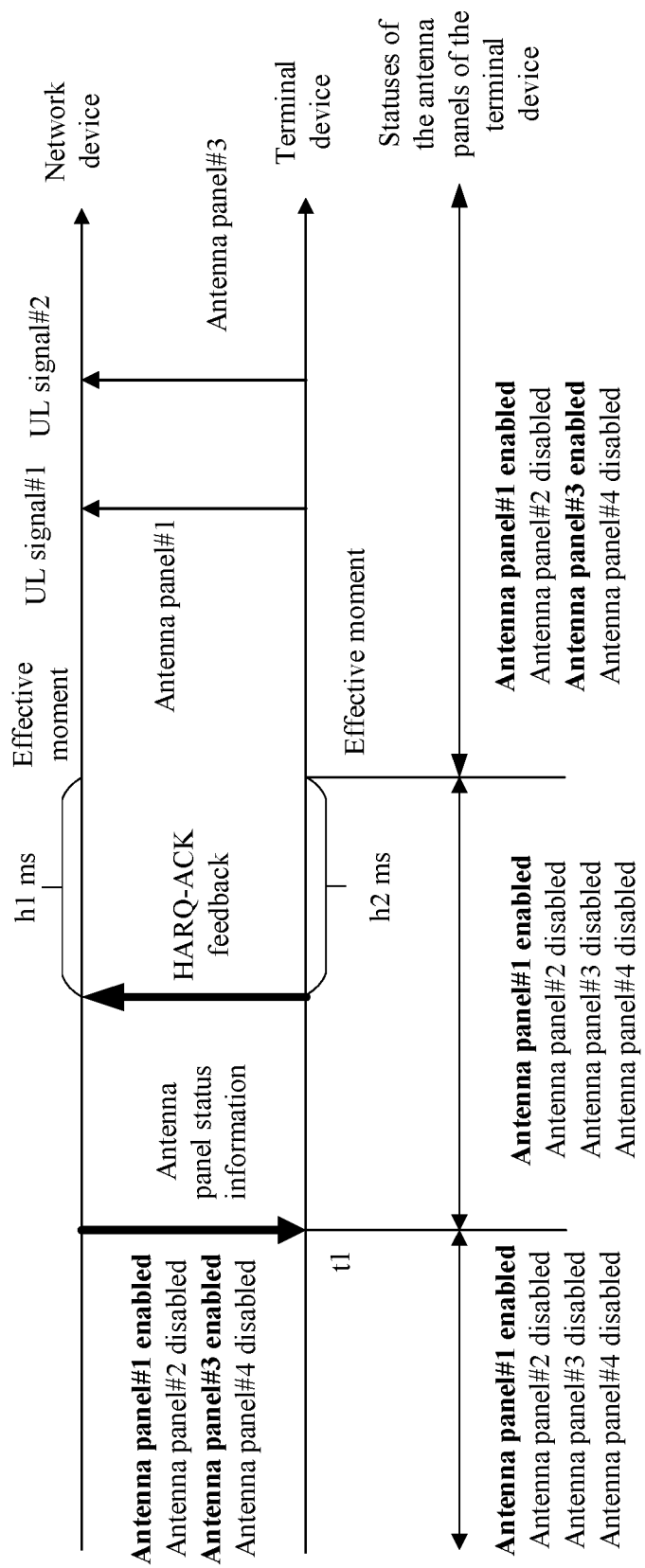
FIG. 15 is a schematic diagram of another uplink transmission scheduling according to an embodiment of this application.

In an implementation, if the first antenna panel status information is DCI signaling, the start moment of the first preset time period and the second preset time period may be the moment at which the first antenna panel status information is transmitted. That is, after the first time length after the terminal device receives the first antenna panel status information, the terminal device determines that the status indicated by the first antenna panel status information takes effect, and after the second time length after the network device sends the first antenna panel status information, the network device determines that the status indicated by the first antenna panel status information takes effect, for example, as shown in FIG. 14. If the first antenna panel status information is MAC-CE signaling, the start moment of the first preset time period and the second preset time period may be a moment at which a HARQ-ACK feedback of the first antenna panel status information is transmitted. That is, after receiving the first antenna panel status information, the terminal device sends the HARQ-ACK feedback of the first antenna panel status information to the network device, and after the first time length after the terminal device sends the HARQ-ACK feedback of the first antenna panel status information, the terminal device determines that the status indicated by the first antenna panel status information takes effect. After the second time length after the network device receives the HARQ-ACK feedback, the network device determines that the status indicated by the first antenna panel status information takes effect. An example is shown in FIG. 15.

Further, the first time length and the second time length may be related to a state change (or switching) delay of the antenna panel.

In an implementation in which the panel status information directly indicates the statuses of the N panels, a manner in which the network device and the terminal device determine that the statuses indicated by the panel status information take effect is similar to the manner in which the network device and the terminal device determine that the statuses indicated by the panel status information take effect in Embodiment 1. Details are not described again.

In an implementation in which the first antenna panel status information indirectly indicates the status of the at least one panel, that the terminal device and the network device determine that the status indicated by the first antenna panel status information takes effect may specifically refer to that the terminal device may perform measurement by using a corresponding antenna panel.

In Embodiment 2 of this application, after the network device sends the first antenna panel status information to the terminal device, the network device and the terminal device determine, after the preset time periods, that the status indicated by the first antenna panel status information takes effect. In this manner, the terminal device and the network device may be aligned in the status of the panel. In this way, the following problem can be avoided: Transmission cannot be performed or transmission performance is relatively poor because the terminal device does not have time to update the status of the panel, and the network device schedules signal/channel transmission based on the new antenna panel status.

Further, after determining that the status indicated by the first antenna panel status information takes effect, the network device and the terminal device may further measure the antenna panel of the terminal device.

In some embodiments, the terminal device may send L reference signals by using P antenna panels. L is a positive integer greater than or equal to 1, and P is an integer greater than 0. The network device receives the L reference signals, and obtains a measurement result based on the L reference signals. The network device determines second antenna panel status information based on the measurement result. The second antenna panel status information includes status information of at least one of the P antenna panels. The network device sends the second antenna panel status information to the terminal device. The network device may determine, after the second time length after sending the second antenna panel status information, that the status of the antenna panel included in the second antenna panel status information takes effect. The terminal device determines, after the first time length after receiving the second antenna panel status information, that the status of the antenna panel included in the second antenna panel status information takes effect. It may be understood that the foregoing embodiment may be applied to an uplink-downlink reciprocal scenario, or may be applied to an uplink-downlink non-reciprocal scenario. In a possible implementation, the P antenna panels may include an antenna panel in a first state in the at least one antenna panel indicated by the first antenna panel status information, or the P antenna panels are antenna panels in the first state in the at least one antenna panel indicated by the first antenna panel status information. In another possible implementation, the P antenna panels may be a subset of the antenna panels in the first state in the at least one antenna panel indicated by the first antenna panel status information.

In other embodiments, the network device may send K reference signals to the terminal device, where K is a positive integer greater than or equal to 1. Correspondingly, the terminal device receives the K reference signals by using Q antenna panels, where Q is an integer greater than 0; and obtains a measurement result based on the K reference signals. The terminal device determines third antenna panel status information based on the measurement result, and reports the third antenna panel status information to the network device. The third antenna panel status information includes status information of at least one of the Q antenna panels. Further, the terminal device and the network device may determine that a status included in the third antenna panel status information takes effect. For a specific process, refer to steps A1 to A7 in scenario 1 in Embodiment 1. Details are not described herein again. It may be understood that the foregoing embodiment may be applied to an uplink-downlink reciprocal scenario. In a possible implementation, the Q antenna panels may include an antenna panel in the first state in the at least one antenna panel indicated by the first antenna panel status information, or the Q antenna panels are antenna panels in the first state in the at least one antenna panel indicated by the first antenna panel status information. In another possible implementation, the Q antenna panels may be a subset of the antenna panels in the first state in the at least one antenna panel indicated by the first antenna panel status information.

To better understand the antenna panel status indication method provided in this embodiment of this application, a process in which the network device indicates the antenna panel status to the terminal device is described by using an example with reference to a specific scenario.

Scenario 1: Uplink-Downlink Reciprocal Scenario

It is assumed that before a moment t1, panel #1 (shown in the figure as antenna panel #1; other panels are similar) and panel #2 are in the active state, and panel #3 and panel #4 are in the inactive state. The states of panel #1 to 4 before the moment t1 may be states reported by the terminal device last time, or may be states indicated by the network device last time. That antenna panel #X is enabled may be understood as that panel #X is in the active state (or the enabled state or the powered on state), and that antenna panel #Y is disabled may be understood as that panel #Y is in the inactive state (or the disabled state or the powered off state).

Example 1: The first antenna panel status information indirectly indicates the status of the at least one panel, and the first antenna panel status information is DCI signaling. As shown in FIG. 16A(1) and FIG. 16A(2), a process in which the network device indicates the status of the antenna panel to the terminal device is as follows:

C1. The network device sends panel request information at a moment t1.

C2. After sending the panel request information, the network device waits for h1 μs to determine that the panel request information takes effect, that is, the network device sends reference signals, so that the terminal device can perform measurement by using the antenna panels. After receiving the panel request information, the terminal device waits for h2 μs to determine that the panel request information takes effect, that is, the terminal device enables panel #1, panel #2, panel #3, and panel #4, so as to measure panel #1, panel #2, panel #3, and panel #4. In an implementation, h1 and h2 may be related to a state change (or may be understood as state switching) delay, or may be related to a transmission delay. In another implementation, h1 and h2 may be preset values, for example, 0. Herein, h1 and h2 may be a same value, or may be different values.

C3. The network device sends BM RSs to the terminal device.

It should be understood that C2 and C3 may be one step. After sending the panel request information, the network device waits for h1 μs to send the BM RSs to the terminal device. After receiving the panel request information, the terminal device waits for h2 μs to receive the BM RSs by using corresponding panels of the terminal device. For example, the terminal device enables panel #1, panel #2, panel #3, and panel #4 to receive the reference signals, and learns performance of panel #1, panel #2, panel #3, and panel #4 through measurement of the BM RSs.

For C4 to C10, refer to steps A1 to A7. Details are not described herein again.

Example 2: The first antenna panel status information directly indicates the status of the at least one panel, and the first antenna panel status information is MAC CE signaling.

As shown in FIG. 16B(1) and FIG. 16B(2), a process in which the network device indicates the status of the antenna panel to the terminal device is as follows:

D1. The network device sends panel status information at a moment t1. The panel status information indicates that panel #1, panel #2, panel #3, and panel #4 are all in the active state.

D2. The terminal device sends a HARQ-ACK feedback to the network device.

D3. After receiving the HARQ-ACK feedback, the network device waits for h1 μs to determine that the panel status information takes effect, that is, the network device may send reference signals, so that the terminal device can perform measurement by using the antenna panels. After sending the HARQ-ACK feedback, the terminal device waits for h2 μs to determine that the panel status information takes effect, that is, the terminal device enables panel #1, panel #2, panel #3, and panel #4, and panel #1, panel #2, panel #3, and panel #4 are already in the active state. In an implementation, h1 and h2 may be related to a state change (or may be understood as state switching) delay, or may be related to a transmission delay. In another implementation, h1 and h2 may be preset values, for example, 0. Herein, h1 and h2 may be a same value, or may be different values.

D4. The network device sends BM RSs to the terminal device.

It should be understood that D3 and D4 may be one step. After receiving the HARQ-ACK feedback, the network device waits for h1 µs to send the BM RSs to the terminal device. After sending the HARQ-ACK feedback, the terminal device waits for h2 µs to receive the reference signals by using panel #1, panel #2, panel #3, and panel #4, and learns performance of panel #1, panel #2, panel #3, and panel #4 through measurement of the BM RSs.

For D5 to D11, refer to steps A1 to A7. Details are not described herein again.

Scenario 2: Uplink-Downlink Reciprocal or Uplink-Downlink Non-Reciprocal Scenario It is assumed that before the moment t1, panel #1 (shown in the figure as antenna panel #1; other panels are similar) and panel #2 are in the active state, panel #3 and panel #4 are in the inactive state. States of panel #1 to 4 before the moment t1 may be states reported by the terminal device last time, or may be states indicated by the network device last time. That antenna panel #X is enabled may be understood as that panel #X is in the active state (or the enabled state or the powered on state), and that antenna panel #Y is disabled may be understood as that panel #Y is in the inactive state (or the disabled state or the powered off state).

Example 1: The first antenna panel status information indirectly indicates the status of the at least one panel, and the first antenna panel status information is DCI signaling. As shown in FIG. 17A(1) and FIG. 17A(2), a process in which the network device indicates the status of the antenna panel to the terminal device is as follows:

E1. The network device sends panel request information at a moment t1.

E2. After sending the panel request, the network device waits for h1 µs to determine that the panel request information takes effect, that is, the network device may send reference signals, so that the terminal device can perform measurement by using the antenna panels. After receiving the panel request, the terminal device waits for h2 µs to determine that the panel request information takes effect, that is, the terminal device enables panel #1, panel #2, and panel #3, so that panel #1, panel #2, panel #3, and panel #4 can be measured. In an implementation, h1 and h2 may be related to a state change (or may be understood as state switching) delay, or may be related to a transmission delay. In another implementation, h1 and h2 may be preset values, for example, 0. Herein, h1 and h2 may be a same value, or may be different values.

E3. The terminal device sends BM RSs to the network device by using panel #1, panel #2, panel #3, and panel #4.

It should be understood that E2 and E3 may be one step. After sending a HARQ-ACK feedback, the terminal device waits for h2 µs to send the BM RSs by using corresponding panels of the terminal device. After receiving the HARQ-ACK feedback, the network device waits for h1 µs to receive the BM RSs. For example, the terminal device enables panel #1, panel #2, panel #3, and panel #4 to send the reference signals. The network device learns performance of panel #1, panel #2, panel #3, and panel #4 through measurement of the BM RSs.

E4. The network device determines panel status information of panel #1 to 4. Specifically, the network device determines, based on the received BM RSs, which panel in panel #1 to 4 has better performance, so as to determine to indicate, to the terminal device, which panel is to be enabled (or which panel is to be in the active state) and which panel is to be disabled (or which panel is to be in the inactive state), that is, determine the panel status information of panel #1 to 4. It is assumed that the network device determines to indicate the terminal device to enable panel #1 and panel #3, and disable panel #2 and panel #4. That is, the panel status information indicates that panel #1 and panel #3 are in the active state, and panel #2 and panel #4 are in the inactive state.

E5. The network device sends the panel status information to the terminal device.

E6. The terminal device sends a HARQ-ACK feedback to the network device.

E7. After receiving the HARQ-ACK feedback, the network device waits for h1 µs to determine that the panel status information takes effect, that is, the network device may schedule panel #1 and panel #3 with a low delay (or even without a delay), and cannot schedule panel #2 and panel #4 with a low delay (or even without a delay). After sending the HARQ-ACK feedback, the terminal device waits for h2 µs to determine that the panel status information takes effect. That is, the terminal device completes an activation process of panel #1 and panel #3, where panel #1 and panel #3 are in the active state; and the terminal device completes a deactivation process of panel #2 and panel #4, where panel #2 and panel #4 are in the inactive state.

In specific implementation, a process in which the panel status information takes effect may be different from steps E6 and E7, and a specific process in which the panel status information takes effect may be another process. This is not specifically limited herein.

E8. The network device schedules panel #1 to transmit a signal, and schedules panel #3 to transmit a signal.

In FIG. 17A(1) and FIG. 17A(2), an example in which the network device schedules panel #1 to transmit UL signal #1 and schedules panel #3 to transmit UL signal #2 is used.

Example 2: The first antenna panel status information directly indicates the status of the at least one panel, and the first antenna panel status information is MAC CE signaling. As shown in FIG. 17B(1) and FIG. 17B(2), a process in which the network device indicates the status of the antenna panel to the terminal device is as follows:

F1. The network device sends panel request information at a moment t1.

F2. The terminal device sends a HARQ-ACK feedback to the network device.

F3. After receiving the HARQ-ACK feedback, the network device waits for h1 µs to determine that the panel request information takes effect, that is, the network device may send a reference signal, so that the terminal device can perform measurement by using the antenna panel. After sending the HARQ-ACK feedback, the terminal device waits for h2 µs to determine that the panel request information takes effect, that is, the terminal device enables panel #1, panel #2, panel #3, and panel #4, and panel #1, panel #2, panel #3, and panel #4 are in the active state. In an implementation, h1 and h2 may be related to a state change (or may be understood as state switching) delay, or may be related to a transmission delay. In another implementation, h1 and h2 may be preset values, for example, 0. Herein, h1 and h2 may be a same value, or may be different values. For F4 to F9, refer to E3 to E8. Details are not described herein again.

Embodiment 3

Figure 18:
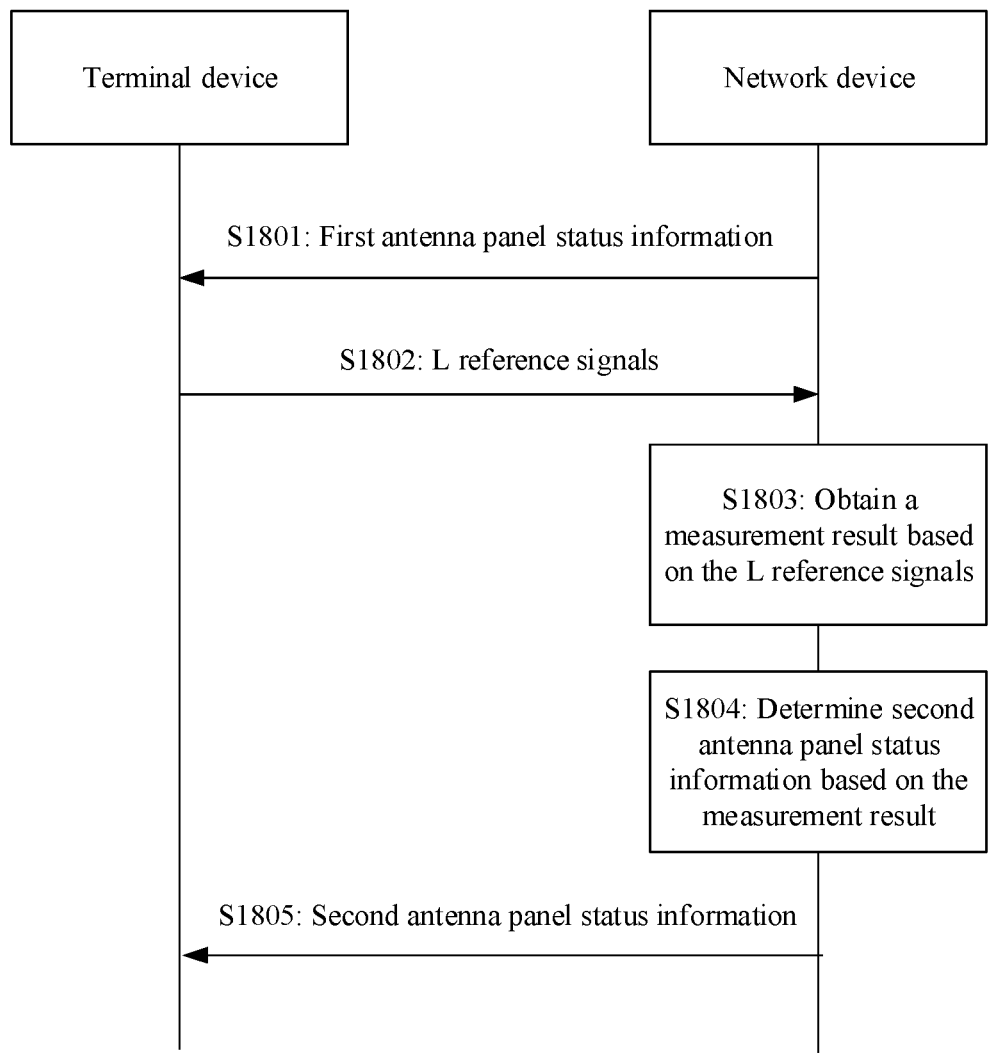
FIG. 18 is a schematic diagram of an antenna panel status indication method according to an embodiment of this application.

FIG. 18 shows another antenna panel status indication method according to an embodiment of this application. The method may be applied to the communications system shown in FIG. 1, FIG. 2, or FIG. 3. Specifically, the method may be applied to a communications device, or may be applied to a chip or a chipset of a communications device. The following uses a communications device as an example for description. The antenna panel status indication method may specifically include the following steps.

S1801: A network device sends first antenna panel status information to a terminal device, where the first antenna panel status information indicates a status of at least one antenna panel. Correspondingly, the terminal device receives the first antenna panel status information.

For details of the first antenna panel information, refer to related descriptions of the first antenna panel status information in step S1301. Details are not described herein again.

S1802: The terminal device may send L reference signals by using P antenna panels, where L is a positive integer greater than or equal to 1, and P is an integer greater than 0. Correspondingly, the network device receives the L reference signals. In a possible implementation, the P antenna panels may include an antenna panel in a first state in the at least one antenna panel indicated by the first antenna panel status information, or the P antenna panels are antenna panels in the first state in the at least one antenna panel indicated by the first antenna panel status information. In another possible implementation, the P antenna panels may be a subset of the antenna panels in the first state in the at least one antenna panel indicated by the first antenna panel status information.

S1803: The network device obtains a measurement result based on the L reference signals.

S1804: The network device determines second antenna panel status information based on the measurement result, where the second antenna panel status information includes status information of at least one antenna panel.

It should be noted that, when the first antenna panel status information indicates the status of the at least one antenna panel, a direct indication or indirect indication manner may be used. The direct indication means that the first antenna panel status information includes status information of the at least one antenna panel, and the indirect indication means that the first antenna panel status information is used to request measurement of the antenna panel. The second antenna panel status information uses a direct indication manner, that is, the second antenna panel status information includes the status information of the at least one antenna panel. S1805: The network device sends the second antenna panel status information to the terminal device.

Further, the network device may determine, after a second time length after sending the second antenna panel status information, that the status information of the antenna panel included in the second antenna panel status information takes effect. The terminal device may determine, after a first time length after receiving the second antenna panel status information, that the status information of the antenna panel included in the second antenna panel status information takes effect. For a specific process, refer to FIG. 14.

Alternatively, after receiving the second antenna panel status information, the terminal device sends a HARQ-ACK feedback to the network device. After the second time length after receiving the HARQ-ACK feedback, the network device determines that the status information of the antenna panel included in the second antenna panel status information takes effect. After the first time length after sending the HARQ-ACK feedback, the terminal device determines that the status information of the antenna panel included in the second antenna panel status information takes effect. For a specific process, refer to FIG. 15.

Embodiment 4

Figure 19:
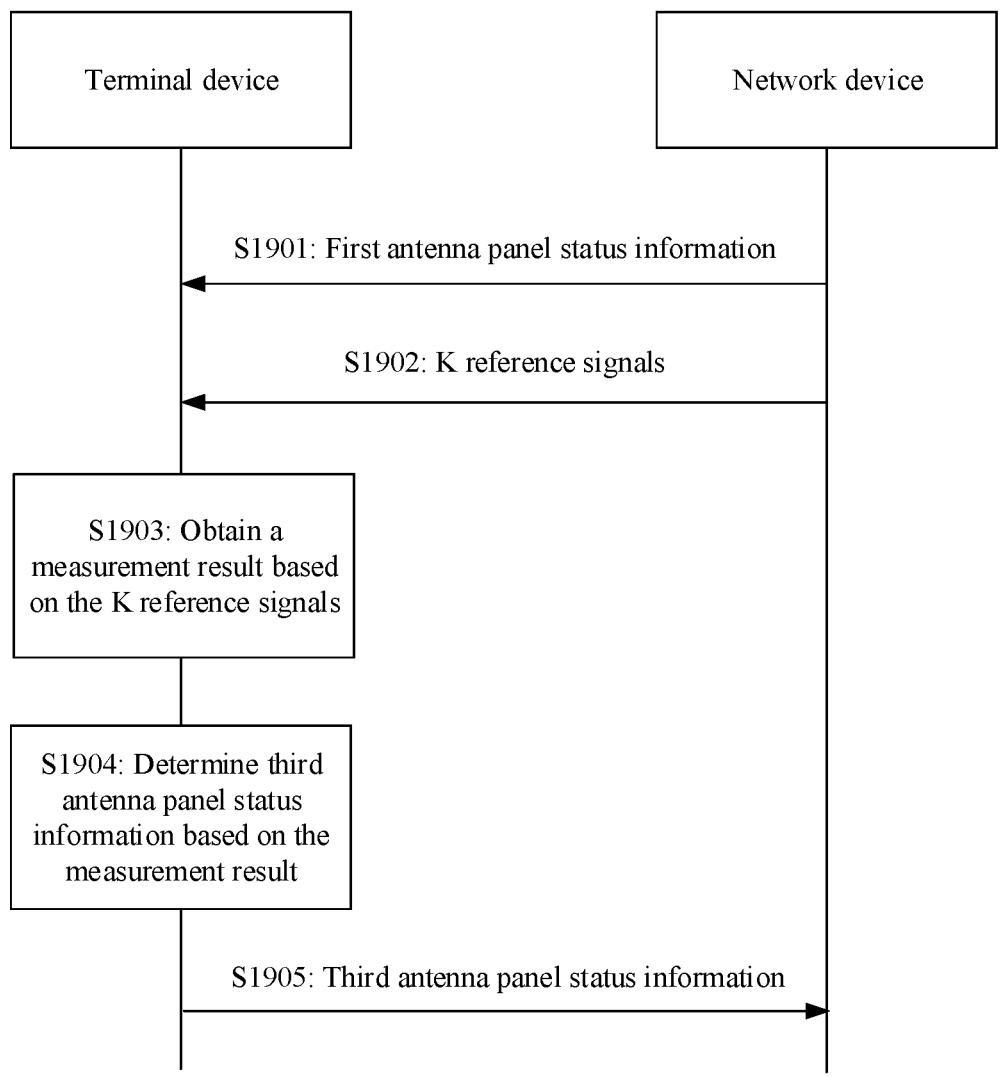
FIG. 19 is a schematic diagram of an antenna panel status indication method according to an embodiment of this application.

FIG. 19 shows another antenna panel status indication method according to an embodiment of this application. The method may be applied to the communications system shown in FIG. 1, FIG. 2, or FIG. 3. Specifically, the method may be applied to a communications device, or may be applied to a chip or a chipset of a communications device. The following uses a communications device as an example for description. The antenna panel status indication method may specifically include the following steps.

S1901: A network device sends first antenna panel status information of an antenna panel to a terminal device, where the first antenna panel status information indicates a status of at least one antenna panel. Correspondingly, the terminal device receives the first antenna panel status information.

For details of the first antenna panel information, refer to related descriptions of the first antenna panel status information in step S1301. Details are not described herein again.

S1902: The network device sends K reference signals to the terminal device, where K is a positive integer greater than or equal to 1. Correspondingly, the terminal device receives the K reference signals by using Q antenna panels, where Q is an integer greater than 0. In a possible implementation, the Q antenna panels may include an antenna panel in a first state in the at least one antenna panel indicated by the first antenna panel status information, or the Q antenna panels are antenna panels in the first state in the at least one antenna panel indicated by the first antenna panel status information. In another possible implementation, the Q antenna panels may be a subset of the antenna panels in the first state in the at least one antenna panel indicated by the first antenna panel status information.

S1903: The terminal device obtains a measurement result based on the K reference signals.

S1904: The terminal device determines third antenna panel status information based on the measurement result, where the third antenna panel status information includes status information of at least one antenna panel.

It should be noted that, when the first antenna panel status information indicates the status of the at least one antenna panel, a direct indication or indirect indication manner may be used. The direct indication means that the first antenna panel status information includes status information of the at least one antenna panel, and the indirect indication means that the first antenna panel status information is used to request measurement of the antenna panel. The third antenna panel status information uses a direct indication manner, that is, the third antenna panel status information includes the status information of the at least one antenna panel.

It should be understood that when the first antenna panel status information uses a direct indication manner, and the third antenna panel status information also uses a direct indication manner, antenna panels in the first state indicated by the third antenna panel status information may be a subset of the antenna panels in the first state indicated by the first antenna panel status information.

S1905: The terminal device reports the third antenna panel status information to the network device.

Further, the terminal device and the network device may determine that the status information included in the third antenna panel status information takes effect. For a specific process, refer to steps A1 to A7 in scenario 1 in Embodiment 1. Details are not described herein again.

It should be noted that, for the foregoing Embodiment 1 to Embodiment 4, when the terminal device and the network device encounter two or more indications of antenna panel status information, the terminal device and the network device may only determine that the last antenna panel status information takes effect. For example, after the terminal device reports antenna panel status information 1 to the network device, the terminal device obtains antenna panel status information 2 based on reference signals sent by the network device, and reports the antenna panel status information 2 to the network device. The terminal device and the network device may only determine that the antenna panel status information 2 takes effect. For another example, after the network device sends antenna panel status information 3 to the terminal device, the terminal device obtains antenna panel status information 4 based on reference signals sent by the network device, and reports the antenna panel status information 4 to the network device. The terminal device and the network device may only determine that the antenna panel status information 4 takes effect.

Figure 20:
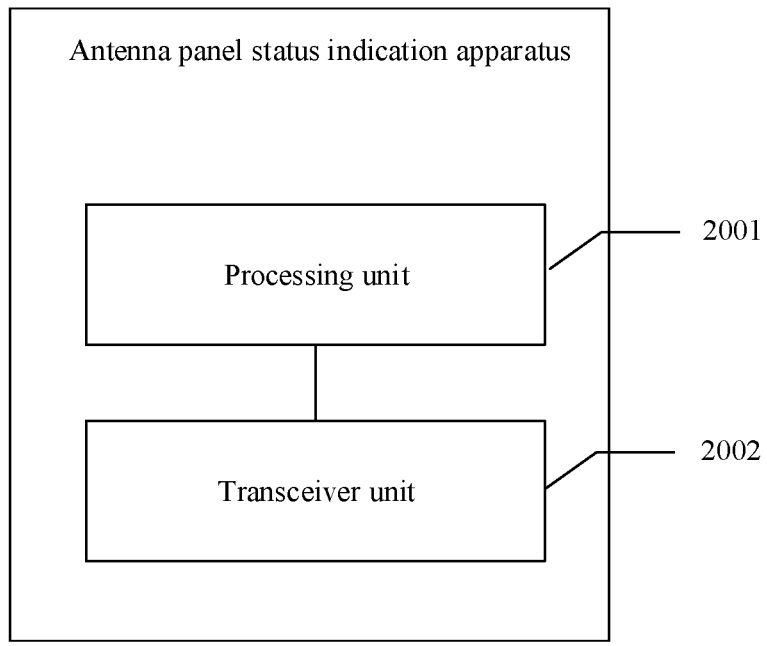
FIG. 20 is a schematic diagram of a structure of an antenna panel status indication apparatus according to an embodiment of this application.

Based on the same technical concept as the method embodiment, an embodiment of this application provides an antenna panel status indication apparatus. A structure of the apparatus may be shown in FIG. 20, including a processing unit 2001 and a transceiver unit 2002.

In an implementation, the antenna panel status indication apparatus may be specifically configured to implement the method executed by the terminal device in the embodiments shown in FIG. 8 to FIG. 12A and FIG. 12B. The apparatus may be the terminal device, or may be a chip in the terminal device, a chipset, or a part that is of the chip and that is used to execute a related method function. The transceiver unit 2002 is configured to: send first antenna panel status information, where the first antenna panel status information indicates a status of at least one antenna panel; and receive response information of the first antenna panel status information. The processing unit 2001 is configured to determine, based on the response information received by the transceiver unit 2002, that the status of the antenna panel takes effect.

For example, the status of the antenna panel may include at least one of a first state and a second state. The first state is an active state, and the second state is an inactive state; the first state is an enabled state, and the second state is a disabled state; the first state is a power-on state, and the second state is a power-off state; or the first state is a state that can be used for transmission, and the second state is a state that cannot be used for transmission.

In an implementation, the first antenna panel status information may include N bits, N is a quantity of the at least one antenna panel, the $i^{th}$ bit is used to indicate a status of the $i^{th}$ antenna panel in the at least one antenna panel, and i={0, 1, 2, . . . , N}.

In another implementation, the first antenna panel status information may indicate statuses of N antenna panels by using status values, where N is a quantity of the at least one antenna panel.

Further, the first antenna panel status information may indicate, by using the status values, switching of the N antenna panels between the first state and the second state.

For example, the response information may be indication information indicating that the first antenna panel status information is successfully transmitted.

Alternatively, the response information may be indication information indicating the terminal device to transmit a signal by using an antenna panel, and the antenna panel is an antenna panel that is indicated by the first antenna panel status information and changes from the second state to the first state.

Alternatively, the response information may be indication information indicating the terminal device to transmit a signal by using power information of an antenna panel, and the antenna panel is an antenna panel that is indicated by the first antenna panel status information and changes from the second state to the first state.

The processing unit 2001 may be specifically configured to determine, based on the response information, that an antenna panel in the first state is in the first state; or determine, based on the response information, that an antenna panel in the second state is in the second state; or determine, based on the response information, that an antenna panel in the first state is in the first state, and an antenna panel in the second state is in the second state.

In some embodiments, before sending the first antenna panel status information, the transceiver unit 2002 may be further configured to: receive K reference signals by using M antenna panels, where K is an integer greater than or equal to 1, and M is an integer greater than or equal to 1. The processing unit 2001 may be further configured to obtain a measurement result based on the K reference signals, and determine the first antenna panel status information based on the measurement result.

Further, after determining the first antenna panel status information based on the measurement result, the processing unit 2001 may be further configured to restore the M antenna panels to states before the K reference signals are received; or keep an antenna panel in the first state in the M antenna panels in the first state.

In still another implementation, the first antenna panel status information may be used to request measurement on the antenna panel.

For example, the response information may be indication information indicating that the first antenna panel status information is successfully transmitted; or the response information is control information indicating a reference signal.

The processing unit may be specifically configured to determine, based on the response information, that at least one antenna panel changes from the second state to the first state.

In other embodiments, after sending the first antenna panel status information of the antenna panel, the transceiver unit 2002 is further configured to: receive L reference signals by using H antenna panels, where L is an integer greater than or equal to 1, and H is an integer greater than or equal to 1. The processing unit 2001 is further configured to obtain a measurement result based on the L reference signals, and determine second antenna panel status information based on the measurement result, where the second antenna panel status information includes status information of at least one antenna panel. The transceiver unit 2002 is further configured to send the second antenna panel status information.

After sending the first antenna panel status information, the transceiver unit 2002 may be further configured to start to detect the response information after a preset time period.

A time length of the preset time period may be related to a time interval between a moment of receiving reference signals and a moment of sending the first antenna panel status information.

The time length of the preset time period may further be related to a state change delay of an antenna panel.

In an implementation, the antenna panel status indication apparatus may be specifically configured to implement the method executed by the network device in the embodiments shown in FIG. 8 to FIG. 12A and FIG. 12B. The apparatus may be the network device, or may be a chip in the network device, a chipset, or a part that is of the chip and that is used to execute a related method function. The transceiver unit 2002 is configured to receive first antenna panel status information, where the first antenna panel status information indicates a status of at least one antenna panel; and send response information of the first antenna panel status information. The processing unit 2001 is configured to determine that the status indicated by the first antenna panel status information takes effect.

For example, the status of the antenna panel may include at least one of a first state and a second state. The first state is an active state, and the second state is an inactive state; the first state is an enabled state, and the second state is a disabled state; the first state is a power-on state, and the second state is a power-off state; or the first state is a state that can be used for transmission, and the second state is a state that cannot be used for transmission.

In an implementation, the first antenna panel status information may include N bits, N is a quantity of the at least one antenna panel, the $i^{th}$ bit is used to indicate a status of the $i^{th}$ antenna panel in the at least one antenna panel, and i={0, 1, 2, . . . , N}.

In another implementation, the first antenna panel status information may indicate statuses of N antenna panels by using status values, where N is a quantity of the at least one antenna panel.

Specifically, the first antenna panel status information may indicate, by using the status values, switching of the N antenna panels between the first state and the second state.

In an example, the response information may be indication information indicating that the first antenna panel status information is successfully transmitted; or the response information may be indication information indicating a terminal device to transmit a signal by using an antenna panel, and the antenna panel is an antenna panel that is indicated by the first antenna panel status information and changes from the second state to the first state; or the response information may be indication information indicating the terminal device to transmit a signal by using power information of an antenna panel, and the antenna panel is an antenna panel that is indicated by the first antenna panel status information and changes from the second state to the first state.

In some embodiments, before receiving the first antenna panel status information, the transceiver unit 2002 may be further configured to send K reference signals, where K is an integer greater than or equal to 1.

In still another implementation, the first antenna panel status information may be used to request measurement on the antenna panel.

For example, the response information may be indication information indicating that the first antenna panel status information is successfully transmitted; or the response information may be control information indicating a reference signal.

In other embodiments, after receiving the first antenna panel status information, the transceiver unit 2002 may be further configured to: send L reference signals, where L is an integer greater than or equal to 1; and receive second antenna panel status information, where the second antenna panel status information includes status information of at least one antenna panel.

When sending the response information of the first antenna panel status information, the transceiver unit 2002 may be specifically configured to send the response information after a preset time period.

A time length of the preset time period may be related to a time interval between a moment of sending the reference signals and a moment of receiving the first antenna panel status information.

The time length of the preset time period may further be related to a state change delay of an antenna panel.

In still another implementation, the antenna panel status indication apparatus may be specifically configured to implement the method executed by the terminal device in the embodiments shown in FIG. 13 to FIG. 17B(2). The apparatus may be the terminal device, or may be a chip in the terminal device, a chipset, or a part that is of the chip and that is used to execute a related method function. The transceiver unit 2002 is configured to receive first antenna panel status information, where the first antenna panel status information indicates a status of at least one antenna panel. The processing unit 2001 is configured to determine, after a preset time period, that the status of the antenna panel takes effect.

A start moment of the preset time period may be a moment at which the first antenna panel status information is received, or a start moment of the preset time period may be a moment at which feedback information is sent, where the feedback information is a HARQ-ACK feedback of the first antenna panel status information.

In an implementation, a time length of the preset time period may be related to a state change delay of the antenna panel.

In some embodiments, the transceiver unit 2002 may be further configured to: after the processing unit 2001 determines that the status of the antenna panel takes effect, send L reference signals by using P antenna panels, where L is a positive integer greater than or equal to 1, and P is an integer greater than 0; and receive second antenna panel status information, where the second antenna panel status information includes status information of at least one antenna panel.

The transceiver unit 2002 may be further configured to: after the processing unit determines that the status of the antenna panel takes effect, receive K reference signals by using Q antenna panels, where K is a positive integer greater than or equal to 1, and Q is an integer greater than 0. The processing unit 2001 is further configured to: obtain a measurement result based on the K reference signals; and determine third antenna panel status information based on the measurement result, where the third antenna panel status information includes status information of at least one antenna panel. The transceiver unit 2002 is further configured to send the third antenna panel status information.

In still another implementation, the antenna panel status indication apparatus may be specifically configured to implement the method executed by the network device in the embodiments shown in FIG. 13 to FIG. 17B(2). The apparatus may be the network device, or may be a chip in the network device, a chipset, or a part that is of the chip and that is used to execute a related method function. The transceiver unit 2002 is configured to send first antenna panel status information, where the first antenna panel status information indicates a status of at least one antenna panel. The processing unit 2001 is configured to determine, after a preset time period, that the status of the antenna panel takes effect.

A start moment of the preset time period may be a moment at which the first antenna panel status information is sent, or a start moment of the preset time period may be a moment at which feedback information is received, where the feedback information is a HARQ-ACK feedback of the first antenna panel status information.

In an implementation, a time length of the preset time period may be related to a state change delay of the antenna panel.

In some embodiments, the transceiver unit 2002 may be further configured to: after the processing unit 2001 determines that the status of the antenna panel takes effect, receive L reference signals, where L is a positive integer greater than or equal to 1. The processing unit is further configured to: obtain a measurement result based on the L reference signals; and determine second antenna panel status information based on the measurement result, where the second antenna panel status information includes status information of at least one antenna panel. The transceiver unit 2002 is further configured to send the second antenna panel status information.

In other embodiments, the transceiver unit 2002 may be further configured to: after the processing unit 2001 determines that the status of the antenna panel takes effect, send K reference signals, where K is a positive integer greater than or equal to 1; and receive third antenna panel status information, where the third antenna panel status information includes status information of at least one antenna panel.

Division into modules in the embodiments of this application is an example, is merely logical function division, and may be other division during actual implementation. In addition, functional modules in the embodiments of this application may be integrated into one processor, or each of the modules may exist alone physically, or two or more modules may be integrated into one module. The integrated module may be implemented in a form of hardware, or may be implemented in a form of a software functional module. It may be understood that, for functions or implementations of the modules in the embodiments of this application, further refer to related descriptions in the method embodiments.

Figure 21:
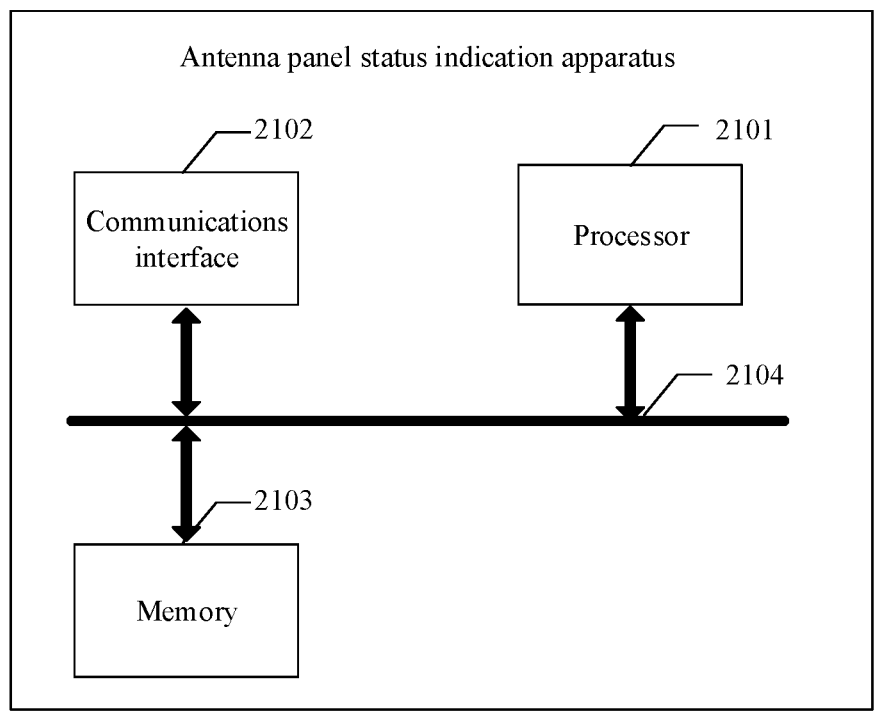
FIG. 21 is a schematic diagram of a structure of another antenna panel status indication apparatus according to an embodiment of this application.

In a possible manner, the antenna panel status indication apparatus may be shown in FIG. 21. The apparatus may be a communications device or a chip in the communications device. The communications device may be a terminal device or may be a network device. The apparatus may include a processor 2101, a communications interface 2102, and a memory 2103. The processing unit 2001 may be the processor 2101. The transceiver unit 2002 may be the communications interface 2102.

The processor 2101 may be a central processing unit (central processing unit, CPU), a digital processing unit, or the like. The communications interface 2102 may be a transceiver, an interface circuit such as a transceiver circuit, a transceiver chip, or the like. The apparatus further includes the memory 2103, configured to store a program executed by the processor 2101. The memory 2103 may be a nonvolatile memory, for example, a hard disk drive (hard disk drive, HDD) or a solid-state drive (solid-state drive, SSD), or may be a volatile memory (volatile memory), for example, a random access memory (random access memory, RAM). The memory 2103 is any other medium that can be configured to carry or store expected program code in an instruction form or a data structure form and that can be accessed by a computer, but is not limited thereto.

The processor 2101 is configured to execute the program code stored in the memory 2103, and is specifically configured to execute the actions of the processing unit 2001. Details are not described herein again in this application. The communications interface 2102 is specifically configured to execute the actions of the foregoing transceiver unit 2002. Details are not described herein again in this application.

A specific connection medium between the communications interface 2102, the processor 2101, and the memory 2103 is not limited in this embodiment of this application. In this embodiment of this application, the memory 2103, the processor 2101, and the communications interface 2102 are connected by using a bus 2104 in FIG. 21. The bus is represented by a bold line in FIG. 21. A connection manner between other components is merely an example for description, and is not limited thereto. The bus may be classified into an address bus, a data bus, a control bus, and the like. For ease of representation, only one thick line is used to represent the bus in FIG. 21, but this does not mean that there is only one bus or only one type of bus.

An embodiment of the present invention further provides a computer-readable storage medium, configured to store computer software instructions that need to be executed for execution of the foregoing processor, and the computer-readable storage medium includes a program that needs to be executed for execution of the foregoing processor.

All or some of the foregoing embodiments may be implemented by using software, hardware, firmware, or any combination thereof. When the software is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, an SSD), or the like.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specified function in one or more processes in the flowcharts and/or in one or more blocks in the block diagrams.

These computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specified function in one or more processes in the flowcharts and/or in one or more blocks in the block diagrams.

These computer program instructions may alternatively be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specified function in one or more processes in the flowcharts and/or in one or more blocks in the block diagrams.

It is clear that a person skilled in the art can make various modifications and variations to this application without departing from the spirit and scope of this application. This application is intended to cover these modifications and variations of this application provided that they fall within the scope of protection defined by the claims of this application and equivalent technologies thereof.

The invention claimed is:

1. An antenna panel status indication method, wherein the method comprises:
    sending first antenna panel status information at a first moment, wherein the first antenna panel status information indicates a status of at least one antenna panel at a second moment different from a status of the at least one antenna panel at the first moment;
    receiving response information of the first antenna panel status information; and
    determining, based on the response information, that the status of the at least one antenna panel takes effect.

2. The method according to claim 1, wherein the status of the at least one antenna panel comprises at least one of a first state or a second state, wherein:
    the first state is an active state, and the second state is an inactive state;
    the first state is an enabled state, and the second state is a disabled state;
    the first state is a power-on state, and the second state is a power-off state; or
    the first state is a state that can be used for transmission, and the second state is a state that cannot be used for transmission.

3. The method according to claim 2, wherein:
    the first antenna panel status information comprises N bits, N is a quantity of the at least one antenna panel, $i^{th}$ bit is used to indicate a status of $i^{th}$ antenna panel in the at least one antenna panel, and i={0, 1, 2, ..., N}; or
    the first antenna panel status information indicates the status of the at least one antenna panel by using a status value.

4. The method according to claim 3, wherein that the first antenna panel status information indicates the status of the at least one antenna panel by using a status value comprises:
    the first antenna panel status information indicates, by using the status value, switching of the at least one antenna panel between the first state and the second state.

5. The method according to claim 2, wherein:
    the response information is indication information indicating that the first antenna panel status information is successfully transmitted;
    the response information is indication information indicating a terminal device to transmit a signal by using an antenna panel, and the antenna panel is indicated by the first antenna panel status information and changes from the second state to the first state; or
    the response information is indication information indicating the terminal device to send an uplink signal/channel by using power information of an antenna panel, and the antenna panel is indicated by the first antenna panel status information and changes from the second state to the first state.

6. The method according to claim 2, wherein determining, based on the response information, that the status of the at least one antenna panel takes effect comprises:
    determining, based on the response information, that an antenna panel in the first state is in the first state;
    determining, based on the response information, that an antenna panel in the second state is in the second state; or
    determining, based on the response information, that an antenna panel in the first state is in the first state, and that an antenna panel in the second state is in the second state.

7. A communication apparatus, comprising:
    at least one processor;
    a communication interface; and
    one or more memories coupled to the at least one processor and storing programming instructions for execution by the at least one processor to perform operations comprising:
        sending, by the communication interface, first antenna panel status information at a first moment, wherein the first antenna panel status information indicates a status of at least one antenna panel at a second moment different from a status of the at least one antenna panel at the first moment;
        receiving, by the communication interface, response information of the first antenna panel status information; and
        determining, based on the response information, that the status of the at least one antenna panel takes effect.

8. The communication apparatus according to claim 7, wherein the status of the at least one antenna panel comprises at least one of a first state or a second state, wherein:
    the first state is an active state, and the second state is an inactive state;
    the first state is an enabled state, and the second state is a disabled state;

the first state is a power-on state, and the second state is a power-off state; or the first state is a state that can be used for transmission, and the second state is a state that cannot be used for transmission.

9. The communication apparatus according to claim 8, wherein:

the first antenna panel status information comprises N bits, N is a quantity of the at least one antenna panel, $i^{th}$ bit is used to indicate a status of $i^{th}$ antenna panel in the at least one antenna panel, and i={0, 1, 2, ..., N}; or the first antenna panel status information indicates the status of the at least one antenna panel by using a status value.

10. The communication apparatus according to claim 8, wherein that the first antenna panel status information indicates the status of the at least one antenna panel by using a status value comprises:

the first antenna panel status information indicates, by using the status value, switching of the at least one antenna panel between the first state and the second state.

11. The communication apparatus according to claim 8, wherein:

the response information is indication information indicating that the first antenna panel status information is successfully transmitted;

the response information is indication information indicating a terminal device to transmit a signal by using an antenna panel, and the antenna panel is indicated by the first antenna panel status information and changes from the second state to the first state; or the response information is indication information indicating the terminal device to send an uplink signal/channel by using power information of an antenna panel, and the antenna panel is indicated by the first antenna panel status information and changes from the second state to the first state.

12. The communication apparatus according to claim 8, wherein determining, based on the response information, that the status of the at least one antenna panel takes effect comprises:

determining, based on the response information, that an antenna panel in the first state is in the first state;

determining, based on the response information, that an antenna panel in the second state is in the second state; or determining, based on the response information, that an antenna panel in the first state is in the first state, and that an antenna panel in the second state is in the second state.

13. The communication apparatus according to claim 7, wherein the communication apparatus is a terminal device or a chip.

14. A communication apparatus, comprising:

at least one processor;

a communication interface; and one or more memories coupled to the at least one processor and storing programming instructions for execution by the at least one processor to perform operations comprising:

receiving, by the communication interface, first antenna panel status information at a first moment, wherein the first antenna panel status information indicates a status of at least one antenna panel at a second moment different from a status of the at least one antenna panel at the first moment;

sending, by the communication interface, response information of the first antenna panel status information; and determining that the status indicated by the first antenna panel status information takes effect.

15. The communication apparatus according to claim 14, wherein the status of the at least one antenna panel comprises at least one of a first state or a second state, wherein:

the first state is an active state, and the second state is an inactive state;

the first state is an enabled state, and the second state is a disabled state;

the first state is a power-on state, and the second state is a power-off state; or the first state is a state that can be used for transmission, and the second state is a state that cannot be used for transmission.

16. The communication apparatus according to claim 15, wherein:

the first antenna panel status information comprises N bits, N is a quantity of the at least one antenna panel, $i^{th}$ bit is used to indicate a status of $i^{th}$ antenna panel in the at least one antenna panel, and i={0, 1, 2, ..., N}; or the first antenna panel status information indicates the status of the at least one antenna panel by using a status value.

17. The communication apparatus according to claim 15, wherein that the first antenna panel status information indicates the status of the at least one antenna panel by using a status value comprises:

the first antenna panel status information indicates, by using the status value, switching of the at least one antenna panel between the first state and the second state.

18. The communication apparatus according to claim 15, wherein:

the response information is indication information indicating that the first antenna panel status information is successfully transmitted;

the response information is indication information indicating a terminal device to transmit a signal by using an antenna panel, and the antenna panel is indicated by the first antenna panel status information and changes from the second state to the first state; or the response information is indication information indicating the terminal device to send an uplink signal/channel by using power information of an antenna panel, and the antenna panel is indicated by the first antenna panel status information and changes from the second state to the first state.

19. The communication apparatus according to claim 14, wherein the communication apparatus is a network device or a chip.

* * * * *